US012487833B2

(12) United States Patent
Peterson et al.

(10) Patent No.: US 12,487,833 B2
(45) Date of Patent: Dec. 2, 2025

(54) TRACKING DATA CENTER BUILD HEALTH

(71) Applicant: Oracle International Corporation, Redwood Shores, CA (US)

(72) Inventors: Eric Raymond Peterson, Vashon, WA (US); William Nickolas Moran, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 63 days.

(21) Appl. No.: 18/537,902

(22) Filed: Dec. 13, 2023

(65) Prior Publication Data

US 2024/0385845 A1 Nov. 21, 2024

Related U.S. Application Data

(60) Provisional application No. 63/503,143, filed on May 18, 2023.

(51) Int. Cl.
G06F 15/177 (2006.01)
G06F 8/41 (2018.01)
(Continued)

(52) U.S. Cl.
CPC ............ *G06F 9/4401* (2013.01); *G06F 8/433* (2013.01); *G06F 9/45558* (2013.01);
(Continued)

(58) Field of Classification Search
CPC .... G06F 9/4401; G06F 8/433; G06F 9/45558; G06F 9/4881; G06F 9/5072; G06F 9/5077; G06F 9/52
(Continued)

(56) References Cited

U.S. PATENT DOCUMENTS 9,876,703 B1 * 1/2018 Arllen ................ H04L 43/55
10,511,675 B1 * 12/2019 Chud ................. H04L 67/52
(Continued)

FOREIGN PATENT DOCUMENTS

CN 114091725 A 2/2022
CN 118312629 A 7/2024
(Continued)

OTHER PUBLICATIONS

"Developing System Services in Oracle Solaris 11.3", Oracle, Available Online at: https://docs.oracle.com/cd/E53394_01/pdf/E60814.pdf, Sep. 1, 2018, 76 pages.
(Continued)

Primary Examiner — Volvick Derose
(74) Attorney, Agent, or Firm — Kilpatrick Townsend & Stockton LLP

(57) ABSTRACT

Skills and skills metadata may be used to define a process for building a data center. Skills of one service may depend on skills corresponding to the same or different service. A dependency graph may be generated based on these dependencies. The graph may specify an order by which orchestration operations are to be performed to build the services, thereby building the data center. During execution of the process for building the data center, health states corresponding to the skills may be tracked (based at least in part on alarms and/or namespaces associated with the skills). When an unhealthy skill is identified, the system may traverse the dependency graph to identify a root cause (e.g., failed operations corresponding to a skill on which the unhealthy skill directly/indirectly depends). A notification and/or various options may be provided to address the unhealthy state of one or both skills.

20 Claims, 24 Drawing Sheets

(51) Int. Cl.
*G06F 9/4401* (2018.01)
*G06F 9/455* (2018.01)
*G06F 9/48* (2006.01)
*G06F 9/50* (2006.01)
*G06F 9/52* (2006.01)

(52) U.S. Cl.
CPC .......... *G06F 9/4881* (2013.01); *G06F 9/5072* (2013.01); *G06F 9/5077* (2013.01); *G06F 9/52* (2013.01); *G06F 9/4411* (2013.01)

(58) Field of Classification Search
USPC .......................................................... 713/2
See application file for complete search history.

(56) References Cited

U.S. PATENT DOCUMENTS

| | | | |
|---|---|---|---|
| 11,321,137 | B2 | 5/2022 | Barsalou et al. |
| 11,379,353 | B1 | 7/2022 | Marchetti et al. |
| 11,593,251 | B2 | 2/2023 | Chirkin et al. |
| 11,604,672 | B2* | 3/2023 | Subramanian ...... G06F 9/45558 |
| 2005/0198331 | A1 | 9/2005 | Okajima et al. |
| 2010/0106678 | A1* | 4/2010 | Pietrek ................ G06F 11/3495 707/E17.014 |
| 2015/0372938 | A1* | 12/2015 | Patel .................... G06F 9/5077 709/226 |
| 2019/0114335 | A1 | 4/2019 | Koenig et al. |
| 2020/0004569 | A1* | 1/2020 | Gupta .................. G06F 9/5072 |
| 2020/0244527 | A1* | 7/2020 | Sharma ............... H04L 41/5045 |
| 2021/0224076 | A1* | 7/2021 | Dockter ................ G06F 9/4881 |
| 2021/0224132 | A1* | 7/2021 | Barsalou ............. G06F 3/04847 |
| 2021/0382725 | A1* | 12/2021 | Vemula ................. G06F 9/4494 |
| 2022/0353133 | A1* | 11/2022 | Shrestha ............. H04L 41/0609 |
| 2022/0365835 | A1 | 11/2022 | Kandasamy et al. |
| 2022/0398078 | A1 | 12/2022 | Segler |
| 2023/0011628 | A1 | 1/2023 | Hurley et al. |
| 2023/0105901 | A1 | 4/2023 | Adogla et al. |
| 2023/0108661 | A1 | 4/2023 | Adogla et al. |
| 2023/0367654 | A1* | 11/2023 | Kurian .................. G06F 9/5083 |
| 2024/0330069 | A1* | 10/2024 | Atur ...................... G06F 9/4881 |

FOREIGN PATENT DOCUMENTS

| | | |
|---|---|---|
| WO | 2021150306 A1 | 7/2021 |
| WO | 2021150366 A1 | 7/2021 |
| WO | 2021150435 A1 | 7/2021 |
| WO | 2022104395 A1 | 5/2022 |

OTHER PUBLICATIONS

Girola et al., "IBM Data Center Networking; Planning for Virtualization and Cloud Computing", Redbooks, May 9, 2011, 258 pages.

International Application No. PCT/US2024/028767, "International Search Report and Written Opinion", mailed Sep. 10, 2024, 13 pages.

International Application No. PCT/US2024/029210, "International Search Report and Written Opinion", mailed Sep. 16, 2024, 12 pages.

International Application No. PCT/US2024/029417, "International Search Report and Written Opinion", mailed Sep. 16, 2024, 12 pages.

International Application No. PCT/US2024/030201, "International Search Report and Written Opinion", mailed Sep. 16, 2024, 12 pages.

International Application No. PCT/US2024/030208, "International Search Report and Written Opinion", mailed Sep. 16, 2024, 13 pages.

International Application No. PCT/US2024/030212, "International Search Report and Written Opinion", mailed Sep. 16, 2024, 12 pages.

International Application No. PCT/US2024/028744, International Search Report and Written Opinion mailed on Jul. 23, 2024, 16 pages.

International Application No. PCT/US2024/028788, International Search Report and Written Opinion mailed on Jul. 23, 2024, 16 pages.

U.S. Appl. No. 18/498,964, Non-Final Office Action, mailed on Jul. 29, 2025, 23 pages.

* cited by examiner

≡ DevOps Portal          [Search]

Build & Deploy / Skills Catalog / BSCP Control Plane

Skills Catalog – Block Storage Control Plane Skill 2                                    [Actions ▶]

Created: 2023-02-17 12:00 UTC          Impact Ring Level: Level 2          Publishing Service: serviceName
Updated: 223-02-17 12:10 UTC           Namespace: public                   Contact: serviceContact
Compartment ID: ocid.12345.example     Health alarm labels: skill_alarm1, skill_alarm_2... view all
OCID: ocid.bscp_example                Description: block storage control plane example skill Region type        Region state        Region              Skill Version
[All ▶]            [All ▶]             [All ▶]             [V.1.0.0 ▶]    [Update]

Aggregated Health and State across Regions

| Region | Fleet | Type | Version | Health | State | Consumers | Dependencies | Last Updated |
|---|---|---|---|---|---|---|---|---|
| Region 1 | Production | Comm. | 1.0.0 | Unhealthy | Installed | 30 | 2 | 1 min ago 2023-04-29 12:00 UTC ⋯ |
| Region 2 | Production | Dedicated | 1.0.0 | Unhealthy | Installed | 30 | 2 | 1 min ago 2023-04-29 12:00 UTC ⋯ |
| Region 3 | Production | Dedicated | 1.0.0 | Unhealthy | Installed | 30 | 2 | 1 min ago 2023-04-29 12:00 UTC ⋯ |

TRACKING DATA CENTER BUILD HEALTH

CROSS-REFERENCE TO RELATED APPLICATIONS

This non-provisional application claims priority to U.S. Provisional Patent Application No. 63/503,143, filed on May 18, 2023, entitled "Techniques for Validating and Tracking Region Build Skills," the disclosure of which is herein incorporated by reference in its entirety for all purposes.

BACKGROUND

Today, cloud infrastructure services utilize many individual services to build a data center (e.g., to bootstrap various resources in a data center of a particular geographic region). In some examples, a region is a logical abstraction corresponding to a localized geographical area in which one or more data centers are (or are to be) located. Building a data center (also referred to as "bootstrapping a data center" or performing a "region build") may include provisioning and configuring infrastructure resources and deploying code to those resources (e.g., for a variety of services). Any suitable number of data centers may be included in a region and therefore a region build may include operations for building multiple data centers. Bootstrapping operations for one service may depend on the availability of other functionality and/or services of the region. As the number of service teams and regions grows, the tasks performed for orchestrating provisioning and deployment drastically increase. Conventional tools for building a region require significant manual effort or automated techniques present drawbacks with respect to overhead, accuracy, and ease of use. Improvements can be made.

BRIEF SUMMARY

Embodiments of the present disclosure relate to techniques for managing operations of a region build based on different constructs. Conventional systems may rely on "capabilities" as a mechanism to drive bootstrapping operations. A "capability" refers to a flag or other notification that indicates that a resource or particular functionality is available. These capabilities have been used to determine when dependencies are met in order to determine when to initiate additional bootstrapping operations. The limited nature of capabilities presents a number of drawbacks with respect to tracking the progress of a region build, identifying potential blockages, and/or identifying when to initiate bootstrapping operations. A new construct, "skills," may be used to address these drawbacks.

At least one embodiment is directed to a computer-implemented method. The method may include managing, by a computing system, a plurality of skills corresponding to a plurality of services to be deployed by a cloud infrastructure orchestration system during a process of building a data center. In some embodiments, the plurality of skills may be associated with corresponding skill metadata that indicates an execution order for orchestration tasks associated with the process of building the data center. The method may include generating, by the computing system, a dependency graph based at least in part on the corresponding skill metadata associated with the plurality of skills. The method may include monitoring, by the computing system, health status corresponding to the plurality of skills during the process of building the data center. The method may include determining, by the computing system during the monitoring, that a first skill of the plurality of skills is associated with a particular health state of a plurality of health states. The method may include identifying, by the computing system, a second skill of the plurality of skills as the cause of the particular health state of the first skill. In some embodiments, the second skill may be identified as the cause based at least in part on traversing the dependency graph. The method may include presenting, by the computing system via a user interface, a notification that the second skill has been identified as the cause of the particular health state of the first skill.

In some embodiments, the skill metadata indicates interdependencies between the plurality of skills. The interdependencies may indicate the execution order for the orchestration tasks associated with the process of building the data center.

In some embodiments, monitoring the health status corresponding to the plurality of skills may comprise identifying, by the computing system, a set of alarms corresponding to the first skill, identifying, by the computing system, a status for each alarm of the set of alarms corresponding to the first skill, and identifying, by the computing system, the particular health state for the first skill based at least in part on the status for each alarm of the set of alarms corresponding to the first skill.

In some embodiments, the particular health state for the first skill is identified based at least in part on determining that at least one of the set of alarms corresponding to the first skill is associated with a respective status that indicates the at least one alarm has been triggered.

In some embodiments, the set of alarms for the first skill is identified by the corresponding skill metadata that is associated with the first skill.

In some embodiments, the method may further comprise providing, by the computing system, an override option for overriding the particular health state of the first skill, and overriding, by the computing system, the particular health state of the first skill with an override value provided via the override option. In some embodiments, the override value is utilized in lieu of the particular health state of the skill for a time period specified by user input provided as part of the override option.

Another embodiment is directed to a cloud-computing service comprising one or more processors and memory storing instructions that, when executed by the one or more processors, cause the cloud-computing service to perform the method(s) disclosed herein.

Still another embodiment is directed to a non-transitory computer-readable medium storing computer-executable instructions that, when executed by one or more processors of a cloud-computing service, cause the cloud-computing service to perform the method(s) disclosed herein.

BRIEF DESCRIPTION OF THE DRAWINGS

To easily identify the discussion of any particular element or act, the most significant digit or digits in a reference number refer to the figure number in which that element is first introduced.

FIG. 11 is a schematic depicting an example user interface presenting skill health information corresponding to a skill version as utilized within multiple regions, in accordance with at least one embodiment.

DETAILED DESCRIPTION

Figure 1:
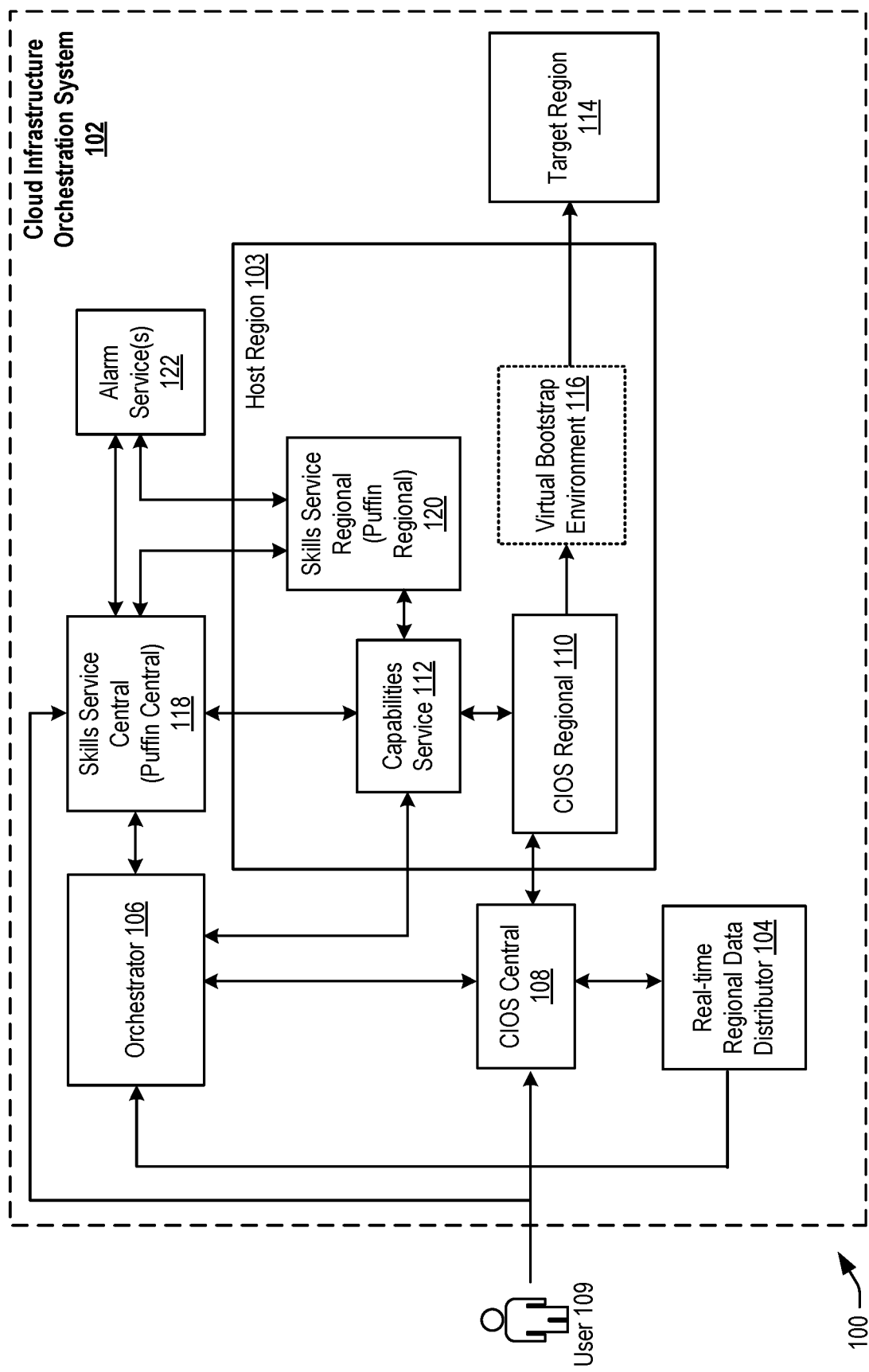
FIG. 1 is a block diagram of an environment in which a Cloud Infrastructure Orchestration System (CIOS), including multiple components of a Skills Service (e.g., Puffin Central and Puffin Regional), may operate to dynamically provide bootstrap services in a region, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

Embodiments of the present disclosure relate to techniques for tracking the health of skills related to various services. By way of example, the disclosed techniques may be utilized during bootstrapping (e.g., provisioning and/or deploying resources (e.g., infrastructure component, artifacts, etc.) any suitable number of services within a region (e.g., a geographical location associated with one or more data centers). Bootstrapping operations can be coordinated and orchestrated by an orchestrator (e.g., a Multi-Flock Orchestrator, an orchestration service, etc.). In previous implementations, the orchestrator attempted to automatically detect dependencies between operations. The orchestrator maintained various versions of configuration files and/or software artifacts and attempted to intelligently and automatically identify a particular version set with which a region build is to be performed. As a region (e.g., a data center) was built, the orchestrator utilized capabilities (e.g., tags that could be toggled on or off to indicate availability of a resource or functionality) to drive these operations. However, both the automatic detection techniques and the use of capabilities included drawbacks. Embodiments of the present disclosure provide improvements over the previous implementations.

Today, during Large Scale Events (LSEs) (e.g., events in which a substantial error, blockage, or delay is experienced in a region build), incident management and region build operators frequently incur wide-spread overhead and sometimes delays, e.g., in collecting status, attribution of the issue, assessment of impacts, and the recovery of services, due to the heavily human-based and non-systemic approach of conventional approaches. Due to the complexity of the various dependencies between services, it can be extremely difficult and time intensive for operators to identify the contributing cause of the event. This causes delays in remediation as well as the ability to assess when an event has concluded. Similarly, building a region includes challenges in which human involvement may be utilized to troubleshoot and/or detect of failures or blocking situations. Conventionally, it is difficult for service teams to determine what dependencies exist for their service. Both the dependencies the service may have on other services, and vice versa. Additionally, service teams have incomplete indicators ahead of an actual region build as to whether their region build design will have critical issues (such as cyclic dependencies) that prevent or delay the build of their service.

The techniques discussed herein include utilizing a new construct (e.g., "skills") which may be used with, or in lieu of, previously utilized capabilities and enables improvements over previous capabilities-based implementations. In contrast with capabilities, skills may be scoped (e.g., controllable through access and authorization policies), versioned, and attributed to a particular service and/or contact. Skills may be associated with a lifecycle and may be monitored for health and are designed to be more highly visible/accessible than capabilities. A skills service (e.g., referred to as "Puffin") may provide authoritative registry for services. Various user interfaces managed by the service may be utilized to define, maintain, and manage skills that each service offers, as well as their dependency relationships with other services. Puffin may be utilized to declare and persist strongly defined metadata of services in a versioned manner. This metadata may be used to generate a blueprint for build-time and run-time dependencies. These blueprints can be used to validate build plans, to drive orchestration decisions during region build, and to improve time-to-engage and time-to-diagnose measures during region build and/or Large-Scale Events (LSEs).

In some embodiments, Puffin may maintain compatibility between skills and capabilities, such that any suitable combination of the two may be utilized to define a process by which a service is to be built. Based on maintaining a mapping between skills and/or capabilities a service publishes, Puffin may ensure that a skill may be transitioned based on capabilities and/or a capability may be published due to a state change of a corresponding skill. In some embodiments, Puffin may generate "shadow skills" (e.g., system-generated skills that represent corresponding capabilities) and/or shadow capabilities (e.g., system-generated capabilities that publish when a corresponding skill is transitioned to an installed state). These features, provided by Puffin, enable the orchestrator to use any suitable combination of skills and/or capabilities to drive orchestration during a region build (e.g., during a process for building a data center).

Skills may be associated with alarms and/or namespaces such that the health of these skills may be tracked over time. As a non-limiting example, a skill may be associated with an alarm label. The system may include a telemetry service that may be configured to receive and process time series data associated with a service. The telemetry service may evaluate predefined expressions on the time series data to determine when and whether to trigger an alarm. Puffin may periodically obtain alarm data from the telemetry service to identify which alarms, if any, have been triggered/fired. By utilizing this alarm data and the skill metadata discussed herein, Puffin may ascertain the health of a skill, as well as the potential impact of the health of that skill on other skills, the service with which the skill is associated, and/or other services. In some embodiments, Puffin may utilize a sentinel service for health tracking of various skills. The sentinel service may be a service configured to receive skill health updates based on a namespace associated with each skill. The skill health updates may include a binary indicator that the skill is healthy or unhealthy. In some embodiments, Puffin may utilize one or both the telemetry service and/or the sentinel service to track skill health. By way of example, Puffin may be configured to utilize the telemetry service, but transition to utilizing data provided by the sentinel service if the telemetry service is unavailable. In some embodiments, should the telemetry service become available once more, Puffin may be configured to transition back to utilizing the alarm data provided by the telemetry service for skill health tracking.

Puffin is designed to remove operational overhead, improve information accuracy, surface critical data including the ability to present interconnected service skills dependencies in a visual graph. Tracking skill health via alarms and/or namespaces enables Puffin to perform a root cause analysis to automatically identify potential errors and/or blockages. The disclosed techniques improve error detection and contributing cause analysis process, improve understanding of the service, build, and/or event, reduce risk of error and/or recovery time, among other benefits.

Certain Definitions

A "region" is a logical abstraction corresponding to a geographical location. A region can include any suitable number of one or more execution targets. In some embodiments, an execution target could correspond to a data center.

An "execution target" refers to a unit of change for executing a release. A "release" refers to a representation of an intent to orchestrate a specific change to a service (e.g., deploy version 8, "add an internal DNS record," etc.). For most services, an execution target represents an "instance" of a service. A single service can be bootstrapped to each of one or more execution targets. An execution target may be associated with a set of devices (e.g., a data center).

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component (e.g., a physical or virtual host) or a Kubernetes engine cluster, this may include, but is not limited to, software (e.g., an application), configuration information (e.g., a configuration file) for an infrastructure component, or the like.

A "flock config" refers to a configuration file that describes a set of resources (e.g., infrastructure components and artifacts, also referred to as a "flock") associated with a single service. A flock config may correspond to a single release (e.g., provisioning and/or deployment tasks that are to be performed as a unit). A service may be built using any suitable number of releases and corresponding flock configs. A flock config may include declarative statements that specify one or more aspects corresponding to a desired state of the resources of the service for that release.

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPsec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A "host region" refers to a region that hosts a virtual bootstrap environment (ViBE). A host region may be used to bootstrap a ViBE.

A "target region" refers to a region under build.

A "capability" identifies is a resource used during region build that signals that another resource, service, or feature is available, or that an event has occurred. By way of example, a capability can be published indicating that a resource is available for authorization/authentication processing (e.g., a subset of the functionality to be provided by a service). As another example, a capability can be published indicating the full functionality of the service is available. Capabilities may be used to identify functionality on which a resource or service depends and/or functionality of a resource or service that is available for use. A capability may be associated with an alphanumeric identifier and may be used to indicate the capability is available or unavailable.

"Publishing a capability" refers to "publishing" as used in a "publisher-subscriber" computing design or otherwise providing an indication that a particular capability is available (or unavailable). The capabilities are "published" (e.g., collected by a Capabilities Service, provided to a Capabilities Service, pushed, pulled, etc.) to provide an indication that functionality of a resource/service is available or that an event has occurred. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a Capabilities Service.

A "Capabilities Service" may be a service configured to monitor and maintain capabilities data that indicates which capabilities are current available in a region. A Capabilities Service may be provided within a Cloud Infrastructure Orchestration System and may be used to identify what capabilities, services, features have been made available in a region, or which events have occurred within the region. The described Capabilities Service may service as a central repository/authority of all capabilities that have been published in the region (e.g., during a region build).

An "Orchestrator" is intended to refer to a service or system that initiates tasks involved in bootstrapping one or more services during a region build. A Multi-Flock Orchestrator (MFO), an example of an orchestrator, may be a computing component (e.g., a service) configured to coordinate events between components of the CIOS to provision and deploy services to a target region (e.g., a new region). An orchestrator may track relevant events (e.g., indicated through capabilities and/or skills as described herein) for each service of the region build and takes actions in response to those events (e.g., based on determining upstream dependencies have been met for a given release/skill, etc.).

A "Real-time Regional Data Distributor" (RRDD) may be a service or system configured to manage region data. This region data can be injected into flock configs to dynamically create execution targets for new regions.

A "Skills Service" (also referred to as "Puffin") may be a service or system that is configured to store planned and/or actual dependency relationships between services, resources, or units of functionality (also referred to as "service functionality"). It should be appreciated that the unit of functionality may relate to functionality provided by a computing component other than a service.

A "Telemetry Service" may be a service or system that is configured to manage/monitor time series data associated with one or more services/resources and trigger (e.g., publish, store, etc.) various alarms and/or corresponding alarm states based at least in part on analyzing the time series data.

A "Service Plan and Manifest" (SPAM) refers to a deterministic specification of the process for building a service. In some embodiments, a SPAM details a combination and order of releases needed to build the service. A manifest of the SPAM may define all resources to be used, while the service plan specifies a plan of execution based on dependencies (expressed via skills).

A "skill" may represent a functional unit that a service exposes and offers to consumers (e.g., other services). This functional unit (also referred to as "service functionality") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. Skills are intended to replace (some or all) capabilities and enable enhanced and more accurate progress tracking of a region build as well as improved root cause analysis functionality when errors or unexpected events occur in the build. In some embodiments, a skill may be associated with one or more previously defined capabilities to provide backward compatibility with previous capabilities-based region build implementations. A skill may be monitored for health and may be configured to maintain health data. A "skill" may collectively refer to any suitable number of data structures (e.g., the skill metadata 404 of FIG. 4) in which data defining the skill may be maintained.

A "fleet" refers to a logical environment (e.g., preproduction, production, etc.) to which a skill can be scoped. By way of example, a skill associated with a production fleet may be separate from a skill of the same name utilized with a preproduction fleet. A "project" may be similarly utilized to scope skills. In some embodiments, a skill may be scoped/applied to a particular environment based at least in part on any suitable combination of attributes such as skillID, skillversionID, compartmentID, namespaceID, producerServiceID, skillName, fleet, project, or the like, that collectively identify a particular application of a skill.

A "skill consumer" refers to a planned or actual consumer of a skill (e.g., a downstream skill that depends on the skill).

A "skill version" refers to an implementation of the skill (e.g., feature). A skill may be associated with any suitable number of skill versions, each referencing a different implementation of the skill.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional, both of which will be described in further detail below) that may be configured to manage bootstrapping tasks (provisioning and deployment) for a given service and an Orchestrator (e.g., a multi-flock orchestrator, also described in further detail below) configured to initiate/manage region builds (e.g., bootstrapping operations corresponding to multiple services in a region).

CIOS enables region building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS also supports automated discovery of flocks (e.g., service resources such as flock config(s) corresponding to any suitable number of services), artifacts, resources, and dependencies. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

FIG. 1 is a block diagram of an environment 100 in which a Cloud Infrastructure Orchestration System (CIOS) 102, including multiple components of a Skills Service (e.g., Skill Service Central (Puffin Central) 118 and Skills Service Regional (Puffin Regional) 120), may operate to dynamically provide bootstrap services in a region, according to at least one embodiment. CIOS 102 can include, but is not limited to, the following components: Real-time Regional Data Distributor (RRDD) 104, Orchestrator 106, CIOS Central 108, CIOS Regional 110, Capabilities Service 112, Puffin Central 118, and Puffin Regional 120. Specific functionality provided by CIOS Central 108 and CIOS Regional 110 is described in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail in U.S. application Ser. No. 17/016,754 and below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building,"

"production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 (also referred to as a "provisioning and deployment manager") may be configured to manage region data, either directly or indirectly (e.g., via RRDD 104). CIOS Central 108 may be configured to compile flock configs to inject region data as variables within the flock configs.

Each instance of CIOS Regional 110 may correspond to a module configured to execute bootstrapping tasks that are associated with a single service of a region. CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes are needed to one or more resources. For example, CIOS Regional 110 can determine that one or more infrastructure components need to be provisioned, one or more artifacts deployed, or any suitable change needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use. In some embodiments, CIOS Regional 110 may transmit data indicating a state transition of a skill. By way of example, in some embodiments, CIOS Regional 110 performs bootstrapping operations which result in publishing a skill (e.g., transmitting skill metadata including a skill state value indicating the skill is installed). The skill metadata may be transmitted to Puffin and used to update the skill state of the corresponding skill.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to Orchestrator 106, CIOS Regional 110 (e.g., each instance of CIOS Regional 110), Puffin Regional 120, and/or Puffin Central 118. In some embodiments, Capabilities Service 112 may store capabilities data in a data store that is accessible to one or more components of CIOS 102. Orchestrator 106, CIOS Regional 110 (e.g., each instance of CIOS Regional 110), Puffin Regional 120, and/or Puffin Central 118, and/or any suitable component or module of CIOS Regional 110 may be configured to request capabilities data from Capabilities Service 112 or otherwise obtain capabilities data (e.g., from a data store configured to store capabilities data generated by the Capabilities Service 112). Although the Capabilities Service 112 is depicted as being a separate component of CIOS 102, it should be appreciated that, in some embodiments, the functionality provided by Capabilities Service 112 may be provided, in whole or in part, as part of the Skills Service via any suitable combination of Puffin Central 118 and Puffin Regional 120.

In some embodiments, each regional component such as CIOS Regional 110, Capabilities Service 112, Puffin Regional 120, and/or Virtual Bootstrap Environment 116 may be one of many regional components. Each regional component may be specific to a given region (e.g., as depicted in FIG. 1, Host Region 103). Therefore, another region may include similar, but separate, components that are specific to that region. In some embodiments, central components (e.g., Orchestrator 106, CIOS Central 108, RRDD 104, and Puffin Central 118) may include one or more components that are configured to manage build operations corresponding to one or more regions. By way of example only, a single orchestrator (orchestrator 106) may be utilized to manage bootstrapping operations for building any suitable number of data centers, or multiple instances of orchestrator 106 may be utilized, each driving the bootstrapping operations for a subset of those data centers or a single data center.

In some embodiments, Orchestrator 106 (an example of which may be a multi-flock orchestrator) may be configured to drive region build efforts. In some embodiments, Orchestrator 106 can manage information that describes what flock/flock config versions and/or artifact versions are to be utilized to bootstrap a given service within a region (or to make a unit of change to a target region). In some embodiments, Orchestrator 106 may be configured to monitor (or be otherwise notified of) changes to the region data managed by Real-time Regional Data Distributor 104. In some embodiments, receiving an indication that region data has been changed may cause a region build to be triggered by Orchestrator 106. In some embodiments, Orchestrator 106 may collect various flock configs and artifacts to be used for a region build. Some, or all, of the flock configs may be configured to be region agnostic. That is, the flock configs may not explicitly identify what regions to which the flock is to be bootstrapped. In some embodiments, Orchestrator 106 may trigger a data injection process through which the collected flock configs are recompiled (e.g., by CIOS Central 108). During recompilation, operations may be executed (e.g., by CIOS Central 108) to cause the region data maintained by Real-time Regional Data Distributor 104 to be injected into the config files. Flock configs can reference region data through variables/parameters without requiring hard-coded identification of region data. The flock configs can be dynamically modified at run time using this data injection rather than having the region data be hardcoded, and therefore, and more difficult to change.

In some embodiments, orchestrator 106 can perform a static flock analysis in which the flock configs are parsed to identify dependencies between resources, execution targets, phases, and flocks, and in particular to identify circular dependencies that need to be removed. In some embodiments, Orchestrator 106 can generate any suitable number of data structures based on the dependencies identified. These data structures (e.g., directed acyclic graph(s), linked lists, etc.) may be utilized by CIOS 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, Orchestrator 106 may be configured to notify any suitable service teams that changes are required to the corresponding flock config to correct these circular dependencies. Orchestrator 106 can be configured to traverse one or more data structures to manage an order by which services are bootstrapped to a region. Orchestrator 106 can identify (e.g., using data obtained from Capabilities Service 112) capabilities available within a given region at any given time. Orchestrator 106 may utilize this data to identify when it can bootstrap a service, when bootstrapping is blocked, and/or when bootstrapping operations associated with a previously blocked service can resume. Based on this traversal, Orchestrator 106 can perform a variety of releases in which instructions are transmitted by Orchestrator 106 to CIOS Central 108 to perform bootstrapping operations corresponding to any suitable number of flock configs. 1n some examples, Orchestrator 106 may be configured to identify that one or more flock configs may require multiple releases due to circular dependencies found within the graph. As a result, Orchestrator 106 may transmit multiple instruction sets to CIOS Central 108 for a given flock config to break the circular dependencies identified in the graph.

In some embodiments, a service plan and manifest (SPAM) may be utilized. A service plan and manifest may provide a more deterministic specification of a build description for a service than previously provided by a single flock config. While flock configs specify aspects of a single release associated with a single service, a service plan may provide a single specification of the order and conditional requirements for executing all of the releases needed to build a given service. Previous implementations of flock configs included optional dependencies which allowed for a degree of indeterministic behavior with respect to the order of operations performed during a region build. The inclusion of optional dependencies may require the orchestrator 106 to perform multiple passes of the build dependency graph, resulting in wasteful processing. These types of dependencies make it difficult, if not impossible, for the system to track region build progress, identify remaining operations yet to be performed, and/or identify build completion. Service plans and manifests (SPAMs) may be utilized to eliminate at least some of the drawbacks to previous indeterministic approaches.

SPAMs (one corresponding to each service to be deployed in the region) allow service teams to describe the corresponding operations needed to build their service and may allow for separation between internal coordination (e.g., coordination of operations internal to the service) and external coordination (e.g., coordination of operations between components of different services). A number of visualizations may be provided (e.g., via orchestrator 106 or any suitable component of CIOS 102) via one or more user interfaces. One visualization may depict a directed acyclic graph describing the build operations internal to a given service, and a separate visualization may depict a directed acyclic graph describing the order of build operations corresponding to multiple services. As a specific example, one or more visualization can present a region-level DAG including only external coordination (e.g., an order of operations corresponding to all of the services to be deployed in the region) while omitting operations that are internal with respect to each service. This graph, for example, may depict nodes corresponding to one service's capabilities or skills on which other services depend, while excluding nodes corresponding to capability/skill dependencies between service components/functional units of the same service.

A SPAM may include an external interaction interface that includes a service build definition that includes a number of build milestones. Each build milestone may be associated with a set of capabilities (and/or skills) that the service is expected to publish upon reaching a given milestone. To transition between build milestones, the SPAM may include execution units that encapsulate a directed acyclic graph (DAG) of one or more releases, each release being equivalent to operations previously defined with a single flock config. Each execution unit may define a set of build time dependencies that identify one or more capabilities (and/or skills) that are required by at least one of the releases of the execution unit.

A SPAM may include a service build implementation. An execution unit of the SPAM may describe one or more releases (previously defined by one or more corresponding flock configs) that are needed to build a service, with potentially multiple execution units being defined. Each release may be associated with a set of execution target checkpoints (e.g., one execution target checkpoint for each execution target in a phase), each of which may be used to specify the expected capabilities (and/or skills) that should be available before the time of the release and the capabilities (and/or skills) that should be published as the result of performing the release.

In some embodiments, the orchestrator 106 may be configured to aggregate SPAMs corresponding to each service to be deployed in a region to compose a larger acyclic graph (e.g., the Build Dependency Graph 338 of FIG. 3) which may capture all of the operations necessary to build a region/data center. The collection of SPAMs identified from this aggregation may be referred to as a "SPAM set." In some embodiments, the orchestrator 106 may utilize the DAG generated from a SPAM set to validate a DAG and/or operations performed using flock configs, while the DAG generated from flock configs is used to drive build operations/release execution. Alternatively, the orchestrator 106 may utilize the DAG generated from the SPAM set to drive build operations/release execution. The utilization of a SPAM/SPAM set may be utilized by the system to generate a deterministic execution plan with which the region build may be executed.

In some embodiments, Puffin Central 118 may provide a number of user interfaces with which one or more skills can be defined. Puffin Central 118 may be configured to serve as a source of truth for services and may maintain metadata including each service's upstream and downstream dependencies and service team contact information and methods for each service across regions and realms (e.g., a set of regions). Each skill may represent a function unit that a service exposes and offers to consumers (e.g., other services). In some embodiments, skills may be scoped where access is controlled based on access and/or authorization policies and/or based on an association with a particular namespace. A skill may be associated with multiple versions in which one or more aspects of the skill differs from previous versions, where each skill version represents a specific implementation of the skill. Each skill version may be identifiable using a unique skill identifier. In some embodiments, Puffin Central 118 may be configured to generate a skill corresponding to a previously defined capability in order to provide backward compatibility with previous capabilities-based region build implementations.

In some embodiments, a skill may be mapped to one or more capabilities. Puffin Regional 120 may be configured to publish and/or store skills metadata based on capabilities data published (or stored) by the Capabilities Service 112. In some embodiments, Puffin Regional 120 may publish capabilities data to the Capabilities Service 112 and/or store such data based at least in part on publishing a skill or identifying a skill has transitioned to or is otherwise associated with a particular state. In some embodiments, some services may utilize flock configurations that express progress using capabilities, while other services may utilize a service plan and manifest that defines a deterministic build process in which progress is expressed with capabilities and/or skills. Using the mapping between skills and capabilities, Puffin Regional 120 may enable a region build to be performed using any suitable combination of capabilities and/or skills to indicate that 1) service or resource functionality is available, 2) a particular event has transpired, 3) a particular fact is true, 4) a condition has been met, or any suitable combination of the above.

In some embodiments, any suitable computing component of the Puffin Service (e.g., Puffin Central 118 and/or Puffin Regional 120) may be configured to monitor the health and/or lifecycle of a skill according to a predefined skill lifecycle. Health monitoring may be performed using one or more alarms that are associated with a given skill. In some embodiments, a telemetry service (e.g., an example of alarm service(s) 122) may utilize an application programming interface provided by the Puffin Service (including Puffin Central 118 and/or Puffin Regional 120) when an alarm is triggered. As another example, the Puffin Service (e.g., Puffin Regional 120) may request alarm data from the alarm service(s) 122 and/or from storage locations at which the alarm service(s) 122 store the alarm data. The Puffin Service may present, via one or more user interfaces, information related to the health of a skill based on the alarms corresponding to the alarm data obtained and their corresponding association to a given skill.

In some embodiments, the Puffin Service (e.g., Puffin Central 118 and/or Puffin Regional 120) may expose one or more application programming interfaces (APIs) with which validation operations may be performed. By way of example, a SPAM describing the build process with respect to one or more services may be provided via a given API (e.g., by the orchestrator 106). The Puffin Service (e.g., Puffin Central 118) may execute any suitable operations for validating that all services and skills identified in the SPAM have been previously registered with the Puffin Service and that the build process defined in the SPAM does not violate previously defined dependency relationships maintained by the Puffin Service.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment (e.g., Virtual Bootstrap Environment (ViBE) 116. ViBE 116 may be an overlay network that is hosted by host region 103 (a preexisting region that has previously been configured with a core set of services and which is communicatively available and secure). Orchestrator 106 can leverage resources of the host region 103 to bootstrap resources to the VIBE 116 (generally referred to as "building the ViBE"). By way of example, Orchestrator 106 can provide instructions through CIOS Central 108 that cause an instance of CIOS Regional 110 within a host region (e.g., host region 103) to bootstrap another instance of CIOS Regional within the VIBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided. In some embodiments, any suitable combination of the components depicted as part of CIOS 102 may individually be examples of the cloud services of FIGS. 20-24 (e.g., 2056 of FIG. 20) and may be configured to operate in any suitable infrastructure pattern such as the examples described below in connection with FIGS. 20-24.

Figure 2:
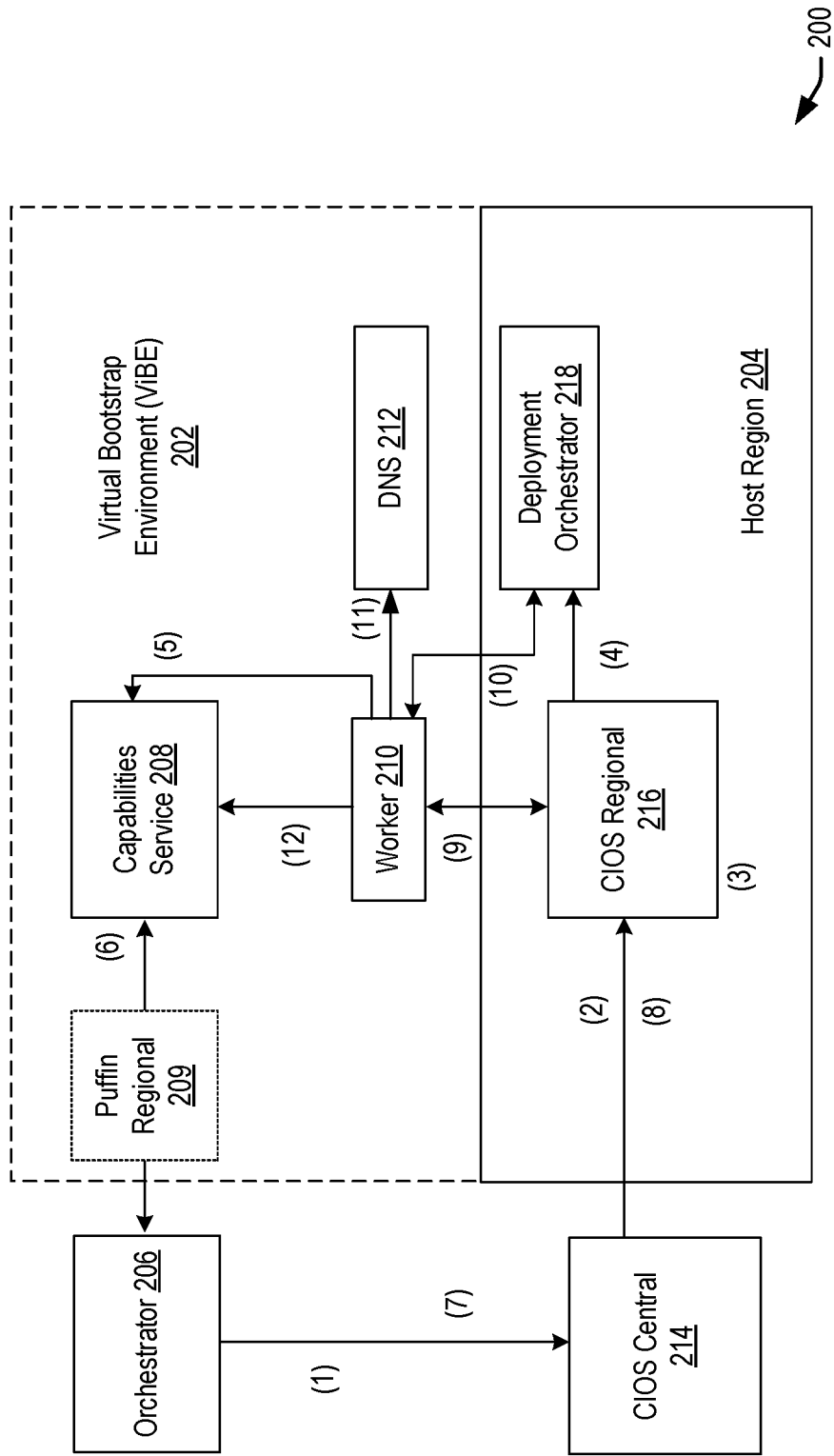
FIG. 2 is a block diagram for illustrating an environment and method for building a virtual bootstrap environment (ViBE), in accordance with at least one embodiment.

FIG. 2 is a block diagram for illustrating an environment and method 200 for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services into a region. The VIBE 202 may be a tenancy that is deployed in a host region 204. It can be thought of as a virtual region.

When the target region is available to provide bootstrapping operations, the VIBE 202 can be connected to the target region so that services in the ViBE can interact with the services and/or infrastructure components of the target region. This will enable deployment of production level services, instead of self-contained seed services as in previous systems, and may be connected over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the ViBE 202 and connected to the service enclave of a region (e.g., host region 204) in order to provision (reserve and/or configure) hardware and deploy services until the target region is self-sufficient and can be communicated with directly. Utilizing the ViBE 202 allows for meeting the dependencies and providing the services needed to be able to provision/prepare infrastructure and deploy software while making use of the host region's resources in order to break circular dependencies of core services.

Orchestrator 206 (an example of orchestrator 106 of FIG. 1) may be configured to perform operations to build (e.g., configure) ViBE 202. Orchestrator 206 can obtain applicable flock configs and/or SPAMs corresponding to various resources to be bootstrapped to the new region (in this case, a ViBE region, ViBE 202). By way of example, Orchestrator 206 may obtain a flock config (e.g., a "ViBE flock config") that identifies aspects of bootstrapping Capabilities Service 208 (e.g., an example of Capabilities Service 112) and/or Worker 210. In some embodiments, Orchestrator 206 may additionally obtain a flock configuration identifying aspects of bootstrapping any suitable portion of a skills service (e.g., Puffin Regional 120 of FIG. 1). In some embodiments, one or more service plan and manifests (SPAMs) may be used to identify these aspects (e.g., specifying operations previously defined in one or more flock configuration files and/or the resources/artifacts needed to bootstrap a service from start to finish) for bootstrapping any suitable combination of Capabilities Service 208, Worker 210, and/or Puffin Regional 209. As another example, Orchestrator 206 may obtain another flock config and/or SPAM corresponding to bootstrapping Domain Name Service (DNS) 212 to ViBE 202.

The method 200 may begin at step 1, where Orchestrator 206 may instruct CIOS Central 214 (e.g., an example of CIOS Central 108 and CIOS Central 214 of FIGS. 1 and 2, respectively). For example, Orchestrator 206 may transmit a request (e.g., including the ViBE flock config) to request bootstrapping of the Capabilities Service 208 and Worker 210 (and in some embodiments, Puffin Regional 209) that, at this time do not yet exist in the VIBE 202. In some embodiments, a corresponding SPAM for the Capabilities Service 208, Worker 210, and/or Puffing Regional 209 may be utilized in lieu of or in addition to the ViBE flock config. In some embodiments, CIOS Central 214 may have access to all flock configs and/or SPAMs. Therefore, in some examples, Orchestrator 206 may transmit an identifier for the ViBE flock config and/or SPAM(s) and CIOS Central 214 may independently obtain the ViBE flock config and/or SPAM from storage (e.g., from database (DB) 308 or DB 312 of FIG. 3).

At step 2, CIOS Central 214 may provide the ViBE flock config and/or SPAMs via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208, Worker 210, and in some embodiments Puffin Regional 209, to be bootstrapped within ViBE 202.

At step 5, capabilities data may be transmitted to the Capabilities Service 208 (from the CIOS Regional 216, Deployment Orchestrator 218 via the Worker 210 or otherwise) indicating that resources corresponding to the ViBE flock and/or SPAMs are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 (and in some embodiments, Puffin Regional 209) are available for processing. In some embodiments, skills metadata may be transmitted to Puffin Regional 209 indicating that any suitable combination of functionality corresponding to the Capabilities Service 208, Worker 210, and/or Puffin Regional 209 is available.

At step 6, Orchestrator 206 may identify that the Capabilities Service 208, Worker 210, and/or Puffin Regional 209 are available based on receiving or obtaining data (an identifier corresponding to a capability and/or skill) from the Capabilities Service 208 and/or Puffin Regional 209.

In some embodiments, published capabilities may be processed by Puffin Regional 209 (e.g., Puffin Regional 120 of FIG. 1) prior to processing by Orchestrator 206. In some embodiments, Puffin Regional 209 may be configured to provide forward and backward compatibility between skills and capabilities. By way of example, in some embodiments, if a capability is published to Puffin Regional 209, Puffin Regional 209 may query known skills (e.g., via a skills table or other suitable record of registered/previously generated skills) to check if any skill is associated with the capability. If no skill is associated with the capability, Puffin Regional 209 may be configured to create a skill (referred to as a "shadow skill) to represent the capability using the skill construct (e.g., including the data structures discussed below in connection with FIG. 4). When orchestrator 206 publishes skills (or updates skill state) during the process of performing a region build, Puffin Regional 209 may receive this data and identify one or more capabilities that are associated with the corresponding skill(s). Puffin Regional 209 may publish any or all capabilities associated with the skill that have not yet been published. In some embodiments, publishing such data may include storing an indication that these capabilities are available. In this manner, Puffin Regional 209 may support full compatibility between capabilities and skills such that any suitable combination of the two may be utilized to drive the operations performed during a region build.

Although some embodiments describe shadow skill generation being conducted at build time, it should be appreciated that the Puffin Service may generate shadow skills at any suitable time and according of a variety of methods. By way of example, historical capabilities data (e.g., capabilities data historically published during one or more previous region builds) may be obtained by the Puffin Service (e.g., Puffin Central 118 and/or Puffin Regional 120 of FIG. 1, and/or Puffin Regional 209 of FIG. 2, etc.) at any suitable time (e.g., prior to initiation of a region build, prior to deployment within the region, upon completion of region build, etc.). In some embodiments, the historical capabilities data may be stored (e.g., by an instance of Capabilities Service 112 of FIG. 1) in a data store that is accessible the Puffin Service. The Puffin Service may process the historical capabilities data (e.g., one or more files, records, tables, data structures, etc.) to identify one or more capabilities for which no corresponding skill currently exists. Identifying a corresponding skill may include matching any suitable portion of a tag or label of a capability with any suitable attribute and/or portion of an attribute (e.g., one or more tokens/words of a service name and/or identifier) associated with a service. A shadow skill may be generated by the Puffin Service for each historically published capability that fails to match any known skills. As described above, these shadow skills may be configured to represent a corresponding historically published capability and may be used to maintain compatibility between skills and capabilities, and between skill-based service build definitions (e.g., a SPAM) and capability-based service build definitions (e.g., a flock, a SPAM, etc.).

At step 7, as a result of receiving/obtaining the data at step 6, the Orchestrator 206 may instruct CIOS Central 214 to bootstrap a DNS service (e.g., DNS 212) to the VIBE 202. The instructions may identify or include a particular flock config and/or SPAM corresponding to the DNS service.

At step 8, the CIOS Central 214 may instruct the CIOS Regional 216 to deploy DNS 212 to the ViBE 202. In some embodiments, the DNS flock config and/or SPAM for the DNS 212 may be provided by the CIOS Central 214.

At step 9, Worker 210, now that it is deployed in the ViBE 202, may be assigned by CIOS Regional 216 to the task of deploying DNS 212. Worker may execute a declarative infrastructure provisioner in the manner described above in connection with FIG. 3 to identify a set of operations that are needed to deploy DNS 212. These operations may be identified based at least in part on from comparing the flock config (the desired state), or corresponding portion of a SPAM, to a current state of the (currently non-existing) resources associated with DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 may notify Capabilities Service 208 (via a capability) or Puffin Regional 209 (directly, or via Capabilities Service 208 and using a skill) that DNS 212 is available in ViBE 202. Orchestrator 206 may subsequently identify that the resources associated with the ViBE flock config and the DNS flock config are available any may proceed to bootstrap any suitable number of additional resources to the ViBE.

Figure 20:
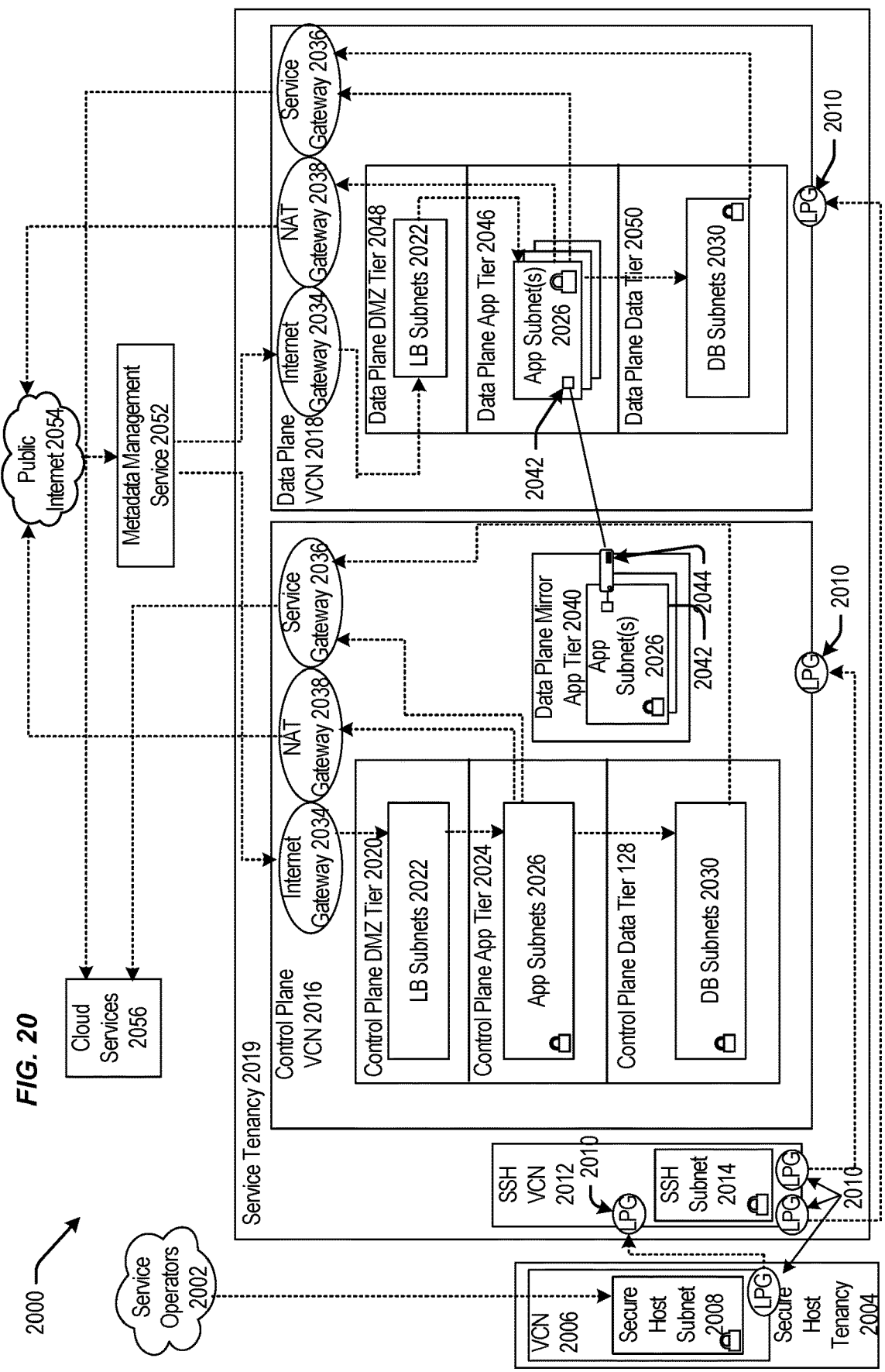
FIG. 20 is a block diagram illustrating one pattern for implementing a cloud infrastructure as a service system, according to at least one embodiment.

After steps 1-12 are concluded, the process for building the VIBE 202 may be considered complete and the VIBE 202 may be considered built and ready for additional bootstrapping (e.g., the bootstrapping of various cloud services such as cloud services 2056 of FIG. 20). At any suitable time during steps 1-12, Puffin Regional 209 may receive and/or obtain alarm data from one or more alarm services (e.g., the alarm service(s) 122 of FIG. 1). In some embodiments, the alarm data may be processed by Puffin Regional 209 (or Puffin Regional 209 may communicate the alarm data or data derived from the alarm data to Puffin Central 118 of FIG. 1). In some embodiments, Puffin Regional 209 (and/or Puffin Central 118) may communicate skill health information to Orchestrator 206 indicating corresponding health states associated with one or more skills. In some embodiments, Puffin Regional 209, Puffin Central 118, and/or Orchestrator 206 may be configured to execute operations that may pause (partially or fully) any suitable portion of the operations discussed above in connection with the method 200. In some embodiments, this may cause a regions state associated with the region within which method 200 is executed, to be updated to a state that indicates the build of the region is paused. In some embodiments, Puffin Regional 209, Puffin Central 118, and/or Orchestrator 206 may be configured to resume the operations of method 200 (and update the region state accordingly) based at least in part on user input, on subsequent alarm data indicating an update to a health state of one or more skills, on a skill health override value, or the like.

Figure 3:
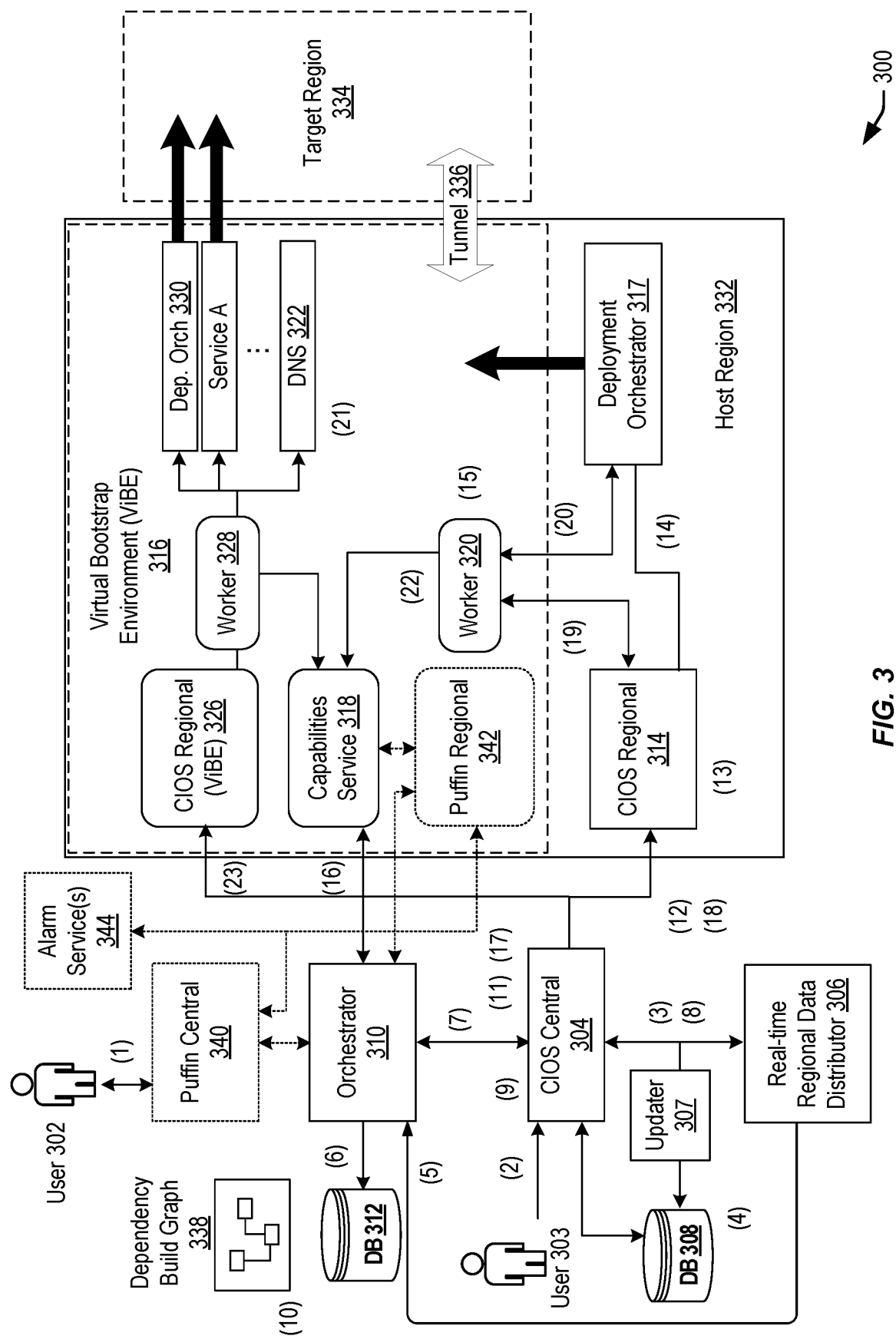
FIG. 3 is a block diagram for illustrating an environment and method for bootstrapping services to a target region utilizing the ViBE, in accordance with at least one embodiment.

FIG. 3 is a block diagram for illustrating an environment and method 300 for bootstrapping services to a target region utilizing the ViBE, according to at least one embodiment.

The method 300 may begin at step 1, where user 302 (e.g., a service team member) may interact with any suitable number of user interfaces managed by Puffin Central 340 (e.g., Puffin Central 118 of FIG. 1). Examples of some of these user interfaces are discussed below with respect to FIGS. 5, 6, and 11. Puffin Central 340 may be configured to read service and/or skill metadata from predefined files or the user 302 may enter service metadata and/or skill metadata at one or more of the provided user interfaces. In some embodiments, Puffin Central 340 may store all service and skill metadata and serve as a centralized authority for the same. At any suitable time, any suitable user may view the service and/or skill metadata such as prior to and/or during performance of the region build.

At step 2, user 303 may utilize any suitable user interface provided by CIOS Central 304 (an example of CIOS Central 108 and CIOS Central 214 of FIGS. 1 and 2, respectively) to modify region data. By way of example, user 303 may create a new region to which a number of services are to be bootstrapped.

At step 3, CIOS Central 304 may execute operations to send the change to RRDD 306 (e.g., an example of RRDD 104 of FIG. 1). At step 4, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 5, Orchestrator 310 (an example of the Orchestrator 106 and 206 of FIGS. 1 and 2, respectively) may detect the change in region data. In some embodiments, Orchestrator 310 may be configured to poll RRDD 306 for changes in region data. In some embodiments, RRDD 306 may be configured to publish or otherwise notify Orchestrator 310 of region data changes.

At step 6, detecting the change in region data may trigger Orchestrator 310 to obtain a version set (e.g., a version set associated with a particular identifier such as a "golden version set" identifier) identifying a particular version for each flock config and a particular version for each artifact to be used to build the region. The version set may be obtained from DB 312. As flock configs and/or artifacts evolve and change over time, multiple versions of each may be maintained, and certain versions of each may be for a region build. The version set may be persisted in DB 312 such that Orchestrator 310 may identify which versions of flock configs and artifacts to use for building a region (e.g., a ViBE region, a Target Region/non-ViBE Region, etc. The flock configs (e.g., all versions of the flock configs) and/or artifacts (e.g., all versions of the artifacts) may be stored in DB 308, DB 312, or any suitable data store accessible to the CIOS Central 304 and/or Orchestrator 310.

In some embodiments, Orchestrator 310 may identify any suitable number of SPAMs (collectively referred to as a "SPAM set") corresponding to the infrastructure to be provisioned and artifacts to be deployed as part of a region build. In some embodiments, each SPAM may identify versions corresponding to one or more flock configs and/or one or more artifacts needed to build a single service. In embodiments in which one or more SPAMs are utilized, the SPAM(s) may be stored within DB 312 and utilized to identify the particular flock config and/or artifact versions to be utilized for building the region.

At step 7, Orchestrator 310 may request CIOS Central 304 to recompile each of the flock configs associated with the version set or identified by a SPAM of the SPAM set with the current region data. In some embodiments, the request may indicate a version for each flock config and/or artifact.

At step 8, CIOS Central 304 may obtain current region data from the DB 308 (e.g., directly, or via Real-time Regional Data Distributor 306) and retrieve any suitable flock config and artifact in accordance with the versions requested by Orchestrator 310.

At step 9, CIOS Central 304 may recompile the obtained flock configs with the region data obtained at step 8 to inject those flock configs with current region data. CIOS Central 304 may return the compiled flock configs to Orchestrator 310. In some embodiments, CIOS Central 304 may simply indicate compilation is done, and Orchestrator 310 may access the recompiled flock configs via RRDD 306.

In some embodiments, at step 10, Orchestrator 310 may perform a static analysis of the recompiled flock configs. As part of the static analysis, Orchestrator 310 may parse the flock configs (e.g., using a library associated with a declarative infrastructure provisioner (e.g., Terraform, or the like)) to identify dependencies between flocks. From the analysis and the dependencies identified, Orchestrator 310 can generate Build Dependency Graph 338. Build Dependency Graph 338 may be an acyclic directed graph that identifies an order by which flocks are to be bootstrapped (and/or changes indicated in flock configs are to be applied) to the new region. Each node in the graph may correspond to bootstrapping any suitable portion of a particular flock. The specific bootstrapping order may be identified based at least in part on the dependencies. In some embodiments, the dependencies may be expressed as an attribute of the node and/or indicated via edges of the graph that connect the nodes. Orchestrator 310 may traverse the graph (e.g., beginning at a starting node) to drive the operations of the region build.

In some embodiments, Orchestrator 310 may utilize a cycle detection algorithm to detect the presence of a cycle (e.g., service A depends on service B and vice versa). Orchestrator 310 can identify orphaned capabilities dependencies. For example, Orchestrator 310 can identify orphaned nodes of the Build Dependency Graph 338 that do not connect to any other nodes. Orchestrator 310 may identify falsely published capabilities (e.g., when a capability was prematurely published, and the corresponding functionality is not actually yet available). Orchestrator 310 can detect from the graph that one or more instances of publishing the same capability exist. In some embodiments, any suitable number of these errors may be detected and Orchestrator 310 (or another suitable component such as CIOS Central 304) may be configured to notify or otherwise present this information to users (e.g., via an electronic notification, a user interface, or the like). In some embodiments, Orchestrator 310 may be configured to force delete/recreate resources to break circular dependencies and may once again provide instructions to CIOS Central 304 to perform bootstrapping operations for those resources and/or corresponding flock configs.

In some embodiments, the Orchestrator 310 may generate build dependency graph 338 from a set of one or more SPAMs (e.g., SPAMs of the SPAM set). Each of the SPAMs may identify a deterministic process for building a single service, including upstream and downstream dependencies on one or more other resources, services, or features being available, or based on an event (each of which may be expressed through publishing a capability and/or skill). Accordingly, in some embodiments, the build dependency graph 338 is generated through a static flock analysis of one or more flock configs to infer at least some dependencies while, in other embodiments, the build dependency graph 338 is generated in accordance with the build process explicitly defined within a SPAM set.

A starting node may correspond to building the VIBE 316 (or individual services within the ViBE), a second node may correspond to bootstrapping DNS. The steps 11-16 may correspond to deploying (via deployment orchestrator 317, an example of the deployment orchestrator 218 of FIG. 2) the resources and/or artifacts identified in a corresponding VIBE flock config or SPAM to ViBE 316 (e.g., an example of ViBE 116 and 202 of FIGS. 1, and 2, respectively). That is, steps 11-16 of FIG. 3 generally correspond to steps 1-6 of FIG. 2. Once notified that capabilities (or skills) exist (e.g., indicating that Capabilities Service 318, Worker 320, and/or Puffin Regional 342, corresponding to Capabilities Service 208, Worker 210, and Puffin Regional 209 of FIG. 2, respectively, are deployed/available) the Orchestrator 310 may recommence traversal of the Build Dependency Graph 338 to identify which operations/releases to be executed next.

Orchestrator 310 may continue traversing the Build Dependency Graph 338 to identify that one or more releases corresponding to deploying DNS 322 are to be executed. Steps 17-22 may be executed to deploy DNS 322 (an example of the DNS 212 of FIG. 2). These operations may generally correspond to steps 7-12 of FIG. 2.

At step 22, a capability (or skill) may be published and/or stored indicating that DNS 322 is available. In some embodiments, CIOS Regional 314 and/or Deployment Orchestrator 317 may initially communicate the availability of the capability or skill (e.g., to Capabilities Service 318 or Puffin Regional 342, respectively). Upon detecting this capability (e.g., via data provided by Capabilities Service 318) or skill (e.g., via data provided by Puffin Regional 342) is available, Orchestrator 310 may recommence traversal of the Build Dependency Graph 338. On this traversal, the Orchestrator 310 may identify that any suitable portion of an instance of CIOS Regional (e.g., an example of CIOS Regional 314) is to be deployed to the VIBE 316. In some embodiments, steps 17-22 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available.

Upon detecting the CIOS Regional (ViBE) 326 is available, Orchestrator 310 may recommence traversal of the Build Dependency Graph 338. On this traversal, the Orchestrator 310 may identify that a deployment orchestrator (e.g., Deployment Orchestrator 330, an example of the Deployment Orchestrator 317) is to be deployed to the ViBE 316.

In some embodiments, steps 16-21 may be substantially repeated with respect to deploying Deployment Orchestrator 330. Information that identifies a capability may be transmitted to the Capabilities Service 318, indicating that Deployment Orchestrator 330 is available.

After Deployment Orchestrator 330 is deployed, ViBE 316 may be considered available for processing subsequent requests. Upon detecting Deployment Orchestrator 330 is available, Orchestrator 310 may instruct subsequent bootstrapping requests to be routed to ViBE components rather than utilizing host region components (components of host region 332). Thus, Orchestrator 310 can continue traversing the Build Dependency Graph 338, at each node instructing release execution to the VIBE 316 via CIOS Central 304. CIOS Central 304 may transmit release requests CIOS Regional (ViBE) 326 to effectuate release execution as instructed by Orchestrator 310.

At any suitable point during this process, Target Region 334 may become available. Indication that the Target Region is available may be identifiable from region data for the Target Region 334 being provided by the user 303 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the VIBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the VIBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the VIBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to Capabilities Service 318, CIOS Regional (ViBE) 326 can orchestrate the deployment of instances of core services from the VIBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave (e.g., CIOS Regional 314 and Deployment Orchestrator 317). The deployment operations may generally correspond to steps 17-22 described above.

As a service is deployed from the VIBE 316 to the Target Region 334, the DNS record associated with that service may correspond to the instance of the service in the VIBE 316. The DNS record associated with the service may be updated at any suitable time to complete deployment of the service to the Target Region 334. Said another way, the instance of the service in the ViBE 316 may continue to receive traffic (e.g., requests) until the DNS record is updated. A service may deploy partially into the Target Region 334 and publish information indicating a capability (e.g., to Capabilities Service 318) that the service is partially deployed. For example, a service running in the VIBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the VIBE 316 may no longer receive traffic for the service.

At any suitable time during method 300, Puffin Regional 209 may receive and/or obtain alarm data from one or more alarm services (e.g., the alarm service(s) 344, an example of the alarm service(s) 122 of FIG. 1). In some embodiments, the alarm data may be processed by Puffin Regional 342 (or Puffin Regional 342 may communicate the alarm data or data derived from the alarm data to Puffin Central 340). In some embodiments, Puffin Regional 342 and/or Puffin Central 340 may communicate skill health information to Orchestrator 310 indicating corresponding health states associated with one or more skills. In some embodiments, Puffin Regional 342, Puffin Central 340, and/or Orchestrator 310 may be configured to execute operations that pause or otherwise halt any suitable portion of the operations discussed above in connection with the method 300. In some embodiments, Puffin Regional 342, Puffin Central 340, and/or Orchestrator 310 may be configured to resume and/or execute any suitable portion of the operations of method 300 (e.g., based at least in part on user input, subsequent alarm data indicating an update to a health state associated with one or more skills, based at least in part on a skill health override value, or the like).

Skills Management and Health Tracking

Figure 4:
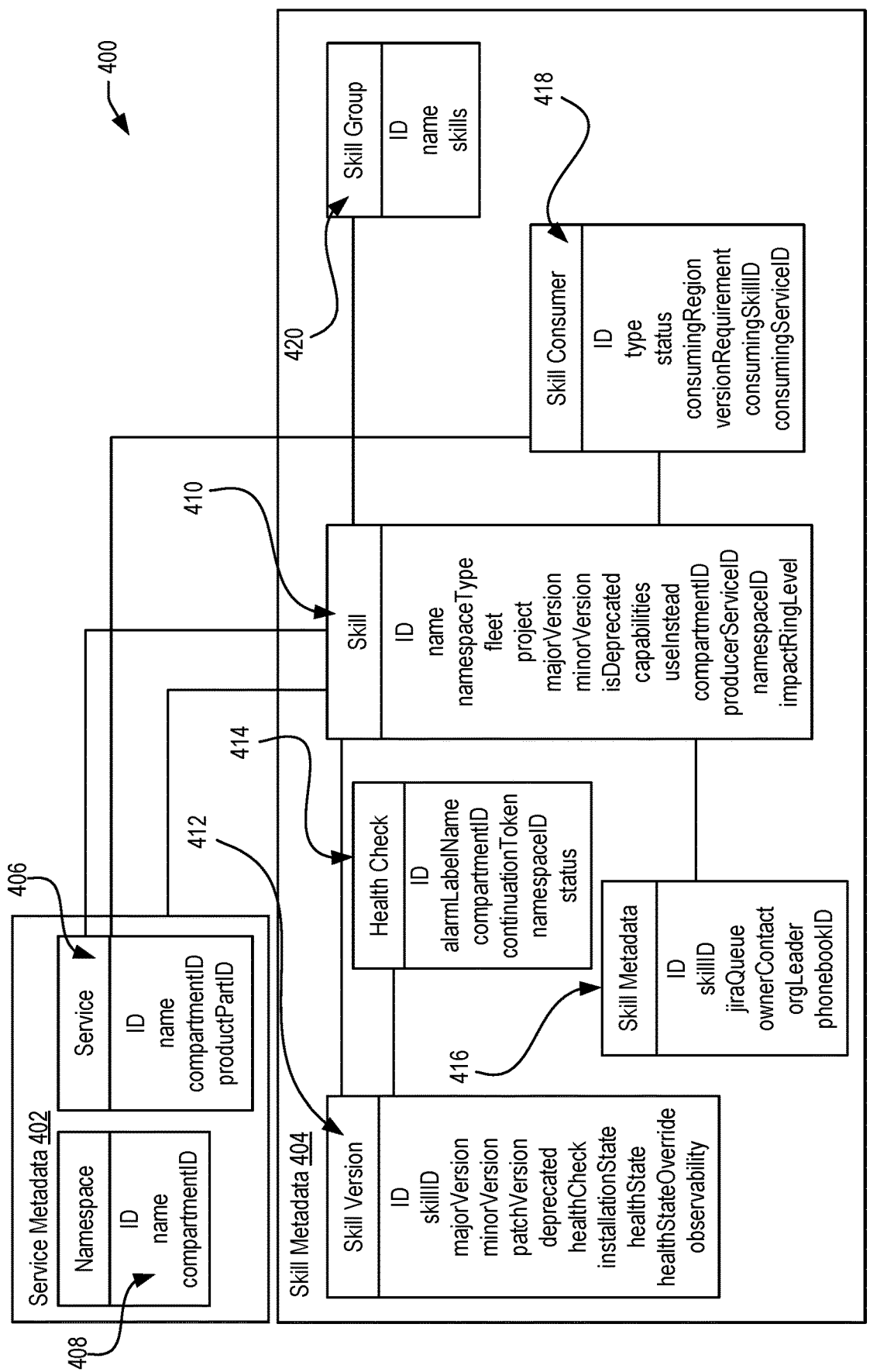
FIG. 4 is a block diagram depicting a data model representing various metadata related to a skill, in accordance with at least one embodiment.

FIG. 4 is a block diagram depicting a data model 400 representing metadata related to a skill, in accordance with at least one embodiment. Each of the data structures depicted in FIG. 4 may include an ID (e.g., an identifier) that uniquely identifies the data structure. This ID may be used to refer to a particular instance of a particular data structure.

In some embodiments, service metadata 402 may include any suitable data corresponding to a service. Service metadata 402 may include any suitable attribute and corresponding value of a service, while skill metadata 404 may similarly include any suitable attribute and corresponding value of a skill. An association between service metadata 402 and skill metadata 404 may indicate a relationship between a service and a skill (e.g., that the service is expected to publish the skill during build or run time). As depicted in FIG. 4, service metadata 402 may be stored in multiple data structures (e.g., namespace data structure 408 and service data structure 406), although any suitable number or type of data structures may be utilized. The service metadata may include, but is not limited to, and suitable combination of ID, a service name (corresponding to a name of the service), a compartment ID (corresponding to an identifier for a compartment to which the service is to be deployed), a product part ID, a namespace ID (an identifier of a namespace associated with the service), a namespace name (a name associated with the namespace associated with the service), and/or a compartment ID corresponding to the namespace. In some embodiments, service metadata 402 may be curated (read from memory, uploaded to Puffin Central 118 of FIG. 1, or the like). In some embodiments, service metadata 402 may be obtained by Puffin Central 118 from another system or, generally, using a process that does not include user input of that information through any of the user interfaces provided by Puffin Central.

Skill metadata 404 may include any suitable number of data structures (e.g., data structures 410-420). In some embodiments, skill data structure 410 may include attributes and values corresponding to any suitable combination of a skill ID, a skill name, a skill fleet, a major version, an isDeprecated indicator, one or more capabilities (e.g., a set of capability identifiers), a useInstead indicator, a compartment ID, a producer ID, a namespace ID, and a recovery ring level. In some embodiments, the values stored for compartment ID, producer ID, and/or namespace ID in the skill data structure 410 may match the compartment ID, service name, or namespace name of service metadata 402, respectively. A match between one or more of the values of these attributes may be used as an association between skill metadata 404 and service metadata 402 (indicating that the corresponding service is expected to publish the skill at some point).

Skill version data structure 412 may be associated with skill data structure 410 based at least in part on matching values of skill ID of skill version data structure 412 and ID of skill data structure 410. Skill version data structure 412 may include attributes and values corresponding to any suitable combination of an ID (for a skill version), a skill ID (e.g., a unique identifier of the skill), a major version and/or a minor version that individually or collectively identify a particular implementation of the skill, a patch version (e.g., a version identifier that identifies a skill to be used to correct a previously erroneous skill version), a deprecated indicator (indicating whether the skill is deprecated or not), a health check attribute (that references one or more instances of alarm data of one or more instances of health check data structure 414), an installation state (indicating a state of installation such as declared, selected, installing, installed, embargoed, retired, uninstalling), a health state (e.g., indicating the health of the skill such as unknown, healthy, unhealthy, etc.), and an observability attribute. The observability attribute may be used to store any suitable data identifying operations or datapoints required to gather telemetry, alarm, and/or log data for the skill version. Skill version data structure 412 may be associated with health check data structure 414 which may be configured to maintain any suitable number of alarm labels that is/are associated with the skill. By way of example, the healthCheck attribute of skill version data structure 412 may reference any suitable number of health check data structures corresponding to one or more instances of health check data structure 414.

In some embodiments, the health check data structure 414 may include any suitable combination of an alarm identifier (alarm ID, indicating a unique identifier for the alarm), an alarm label name (a name of the alarm), a compartment identifier (compartment ID, indicating a compartment to which the alarm is scoped), a continuation token (a token with which alarm transition history may be obtained), namespace identifier (namespace ID, indicating a particular namespace to which the alarm is scoped), and a status value (indicating a health status corresponding to the alarm). Alarm data corresponding to multiple alarms may be maintained in the health check data structure 414. By way of example, alarm ID may include a list of multiple alarm IDs corresponding to a list of alarm label names stored within the alarm label name attribute. The compartment ID attribute may also be a list of compartment IDs corresponding to the alarms and labels of the alarm ID and alarm label name ID attributes of the health check data structure 414. In some embodiments, multiple sets of attributes alarmID, alarmLabelName, compartmentID, continuation Token, and status may be stored, with each set of attributes corresponding to a single alarm.

In some embodiments, health check data structure 414 may store data corresponding to one or more alarm service(s) (e.g., the alarm service(s) 344 of FIG. 3, the alarm service(s) 122 of FIG. 1). By way of example, the namespace identifier of health check data structure may store a namespace corresponding to a skill (e.g., corresponding to an instance of skill data structure 410). In some embodiments, an association between a skill and an alarm may be maintained based at least in part on storing the same namespace identifier within the namespace ID attribute of an instance of the health check data structure 414 and the namespace ID attribute of an instance of the skill data structure 410. In some embodiments, the status attribute may store a value indicating the health of a skill and/or a status of an alarm (e.g., an alarm identified by alarmID, an alarm identified by namespaceID, etc.). In embodiments, in which status from multiple alarm services are utilized, multiple status attributes may be employed to maintain the status of each corresponding alarm (e.g., one status for an alarmID, another for a namespaceID, etc.).

Skill data structure 410 may be associated with skill metadata data structure 416. Skill metadata data structure 416 may include attributes and values for any suitable combination of an ID (for an instance of the skill metadata data structure 416), a jira queue, an owner contact, an org leader, and a phonebook ID. A phonebook ID may be an identifier corresponding to a separate system that is configured to store contact data. Skill metadata data structure 416 may be used to store any suitable contact data (e.g., name, email, address, phone number, etc.) for an entity (e.g., a service team member) that is associated with the skill and the service with which the skill is associated.

Skill data structure 410 may be associated with skill consumer data structure 418. Skill consumer data structure 418 may include attributes and values for any suitable combination of an ID (for the skill consumer), a type, a status, a consuming region, a version requirement, a consuming skill ID, a consuming service ID. Skill consumer data structure 418 may be configured to store any suitable information on services and/or skills which depend on the skill defined by skill metadata 404.

Skill data structure 410 may be associated with skill group data structure 420. Skill group data structure may include attributes and values for any suitable combination of an ID (for the skill group), a skill group name, and a set of one or more skill IDs associated with the skill group.

Each of the data structures 406-420 may be stored in one or more data stores and a data structure may be identified and obtained (e.g., via a lookup and/or query operation) based at least in part on a value stored in another data structure through the associations discussed above. By way of example, all skills associated with a service may be identified through a query of the data store(s) for all skill data structures that are associated with a producer ID matching the ID from service data structure 406 of service metadata 402.

Although a number and particular combination of data structures are presented in FIG. 4, any suitable number or type of attributes and/or values and/or data structures may be utilized. In some embodiments, data of any data structure depicted in FIG. 4 may be separated into multiple data structures or combined and stored in fewer data structures than those depicted in FIG. 4. The associations indicated between those data structures may be similar to those shown in FIG. 4, or the associations may differ. As a non-limiting example, the data depicted with data structures 410-420 may be similarly stored in more or fewer data structures. By way of example, the data depicted within data structures 410-420 may be provided in a single data structure in some embodiments.

Each data structure of FIG. 4 may be associated with other data structures of FIG. 4 based at least in part on referencing an identifier of one or more other data structures. By way of example, an instance of skill version data structure 412 may be associated with a particular instance of skill data structure 410 based at least in part on having a value for the skillID attribute of the skill version data structure 412 that matches the value of the ID attribute of the particular instance of the skill data structure 410. As another example, a skill consumer data structure 418 may be associated with a skill based on referencing the ID of the skill data structure 410 within its consumingSkillID attribute. As another example, an instance of skill group data structure 420 may be associated with one or more instances of the skill data structure 410 based on referencing the IDs of those skills with its skills attribute. As yet another example, skill version data structure 412 may reference one or more instances of health check data structure 414 based at least in part on references the IDs of those health check data structures within its healthCheck attribute. An instance of the skill data structure 410 may be associated with a particular service based at least in part on referencing the ID of the service data structure 406 corresponding to the service via its producerServiceID attribute.

Any suitable number of instances of skill metadata 404 (corresponding to individual skills) may be associated with a single instance of service metadata 402 and may be used to represent a process of deploying the service in which the order of deployment tasks is represented via the instances of skill metadata 404. Each skill corresponding to an instance of skill metadata 404 for a service may be tracked, updated, or otherwise analyzed to present information regarding the deployment process for the service, to drive deployment of the service, to validate a build plan or the build dependency graph 338 of FIG. 3, or the like.

Figure 5:
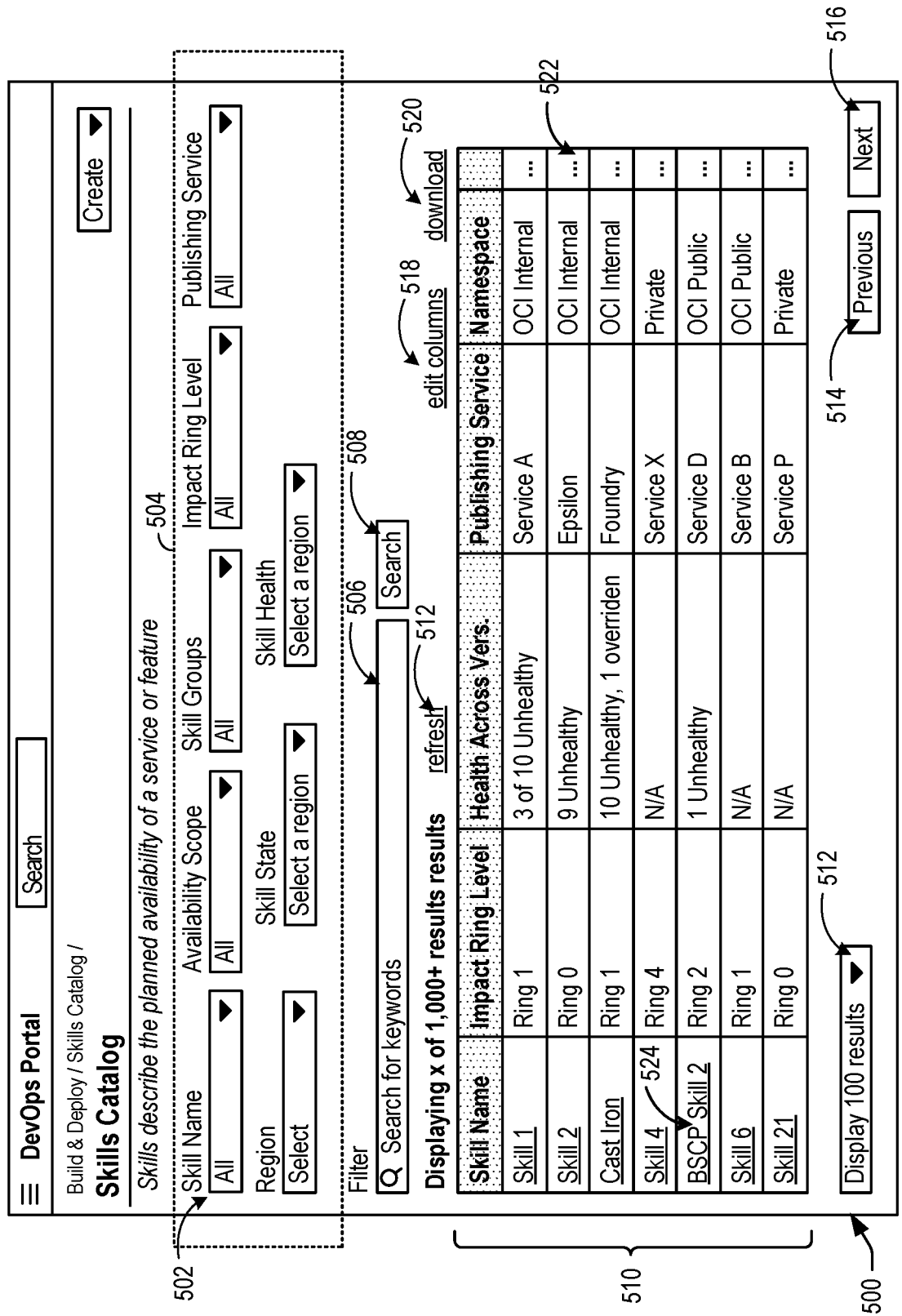
FIG. 5 is a schematic depicting an example user interface presenting a skills catalog, in accordance with at least one embodiment.

FIG. 5 is a block diagram depicting an example user interface 500 related to a skills catalog, in accordance with at least one embodiment. User interface 500 may be configured to present a skills catalog. The term "skills catalog" is intended to refer to a registry/collection of skills metadata corresponding to all previously defined skills. In some embodiments, instances of skills metadata (e.g., any suitable part of skills metadata 404 of FIG. 4) may be provided via a user interface prepared/managed by Puffin Central 118. Examples of these user interfaces are discussed in more detail with respect to U.S. Non-Provisional patent application Ser. No. 18/498,964, filed on Oct. 31, 2023, entitled "A Skills Service configured to manage aspects of a Building a Data Center," the disclosure of which is herein incorporated by reference in its entirety for all purposes.

As depicted, user interface 500 may include user interface element 502 (e.g., depicted as a drop-down menu, however, other user interface elements are contemplated). User interface element 502 may be prepopulated with any suitable number of skills names obtained from any suitable number of predefined instances of skills metadata 404. Each entry selectable from user interface element 502 may correspond to a different instance of skill metadata 404. By default, user interface element 502 may present a selection of "all" indicating an option to present service names (or any suitable portion of skill metadata 404) corresponding to every unique instance of skill metadata 404. Each instance of skill metadata 404 may correspond to every previously defined skill. User interface element 502 may be one of a set of user interface elements (e.g., user interface elements 504, which include user interface elements corresponding to availability scope, skill groups, impact region level, publishing service, region, skill state, and skill health). It should be appreciated that selections available via one user interface element of the user interface elements 504 may depend on values selected via one or more other user interface element(s) of the user interface elements 504. In some embodiments, some user interface elements may be disabled or enabled depending on values selected via one or more other user interface elements. As a non-limiting example, values for skill state and skill health may not be entered via the corresponding user interface elements depicted unless a value has been selected via the user interface element corresponding to the region. User interface 500 may include any suitable filtering options for filtering the entries within area 510. By way of example, one or more keywords may be provided via search box 506. Upon selecting search button 508, the entries within area 510 may be updated to include entries that relate, match, or otherwise correspond to the keywords provided via search box 506.

As skill metadata may be added or changed over time, user interface 500 may include refresh option 512. Upon selecting refresh option 512, Puffin Central 118 may be configured to read, parse, or otherwise update skill metadata presented via user interface 500. Any suitable previous selections provided via user interface element 504, search box 506, and/or user interface element 508 may be applied to the updated skill metadata and corresponding entries may be provided anew via area 510. Area 510 may be scrollable and/or the user interface 500 may include presentation options (e.g., presentation option 512) for configuring paging options in which a particular number (e.g., up to 100 entries) may be initially presented within area 510. Navigational options 514 and 516 may be provided to navigate to a next or previous page, respectively.

The particular data presented via area 510 may be customizable via user interface element 518. Selection of user interface element 518 may cause a window or pop up to be presented with which columns corresponding to particular skills metadata attributes may be selected or deselected for display. In some embodiment, user interface 500 may include user interface option 520. Upon selecting user interface option 520, the data presented via area 510 may be formatted according to a predefined format and saved to a file. In some embodiments, the data may be downloaded (e.g., saved locally at the user's device) in any suitable format. The user may be presented an additional window or interface for selecting a storage location and/or format for the downloaded data.

Figure 6:
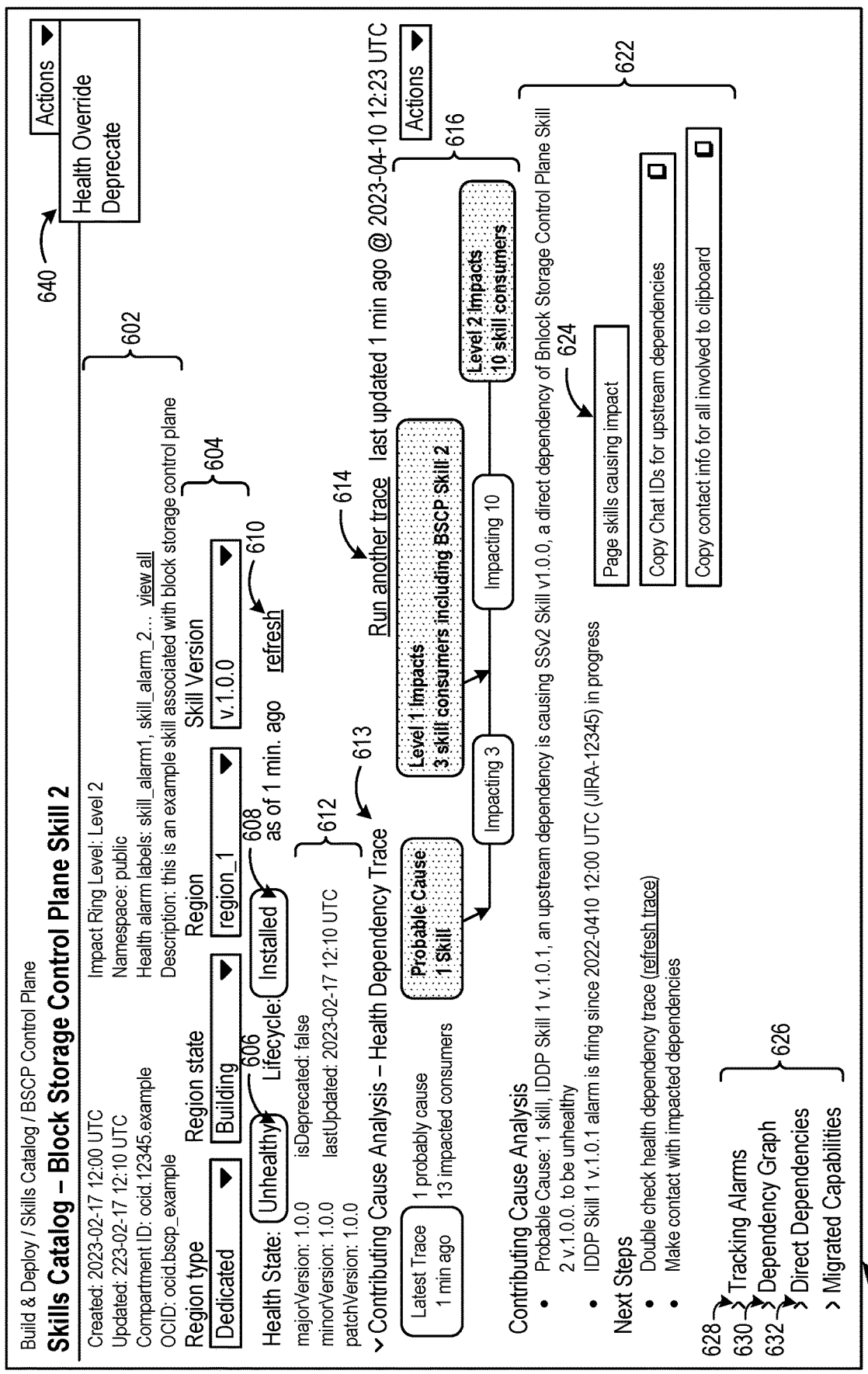
FIG. 6 is a schematic depicting an example user interface presenting skill metadata, in accordance with at least one embodiment.

In some embodiments, selecting option 524 (e.g., a navigational link) may navigate the user interface 600 of FIG. 6. Likewise, selecting any link corresponding to one a given skill depicted with area 510 may navigate the user to a user interface similar to user interface 600 and specific to the corresponding skill.

FIG. 6 is a block diagram depicting an example user interface 600 presenting information associated with a selected skill, in accordance with at least one embodiment. In some embodiments, user interface 600 may be presented based at least in part on selecting option 524 of FIG. 5 from a skills catalog user interface (e.g., user interface 500) managed/prepared by Puffin Central 118 of FIG. 1. Generally, user interface 600 may be configured to present any suitable skill metadata 404 of FIG. 4 corresponding to a selected skill (e.g., Block Storage Control Plane Skill 2, in this example). The data presented via user interface 600 may be differently presented or formatted that the example depicted in FIG. 6.

Area 602 may present any suitable combination of attributes and corresponding values according to a predefined format. As a non-limiting example, area 602 includes a created date, an updated data, a compartment identifier, a unique system identifier (e.g., OCID), an impact ring level, a namespace type, one or more health alarm labels associated with the selected skill, and a description.

Area 604 may provide one or more user interface elements corresponding to selecting filtering options. Values selected via the user interface elements of area 604 may be used to update or modify user interface 600 to include the attribute and values associated with the version and/or region associated with the selected skill. User interface 600 may include user interface element 606, which may be configured to display an indication of the health state associated with the skill (e.g., a health state stored in skill version data structure 412 of FIG. 4. Similarly, user interface element 608 may be utilized to present an indication of the lifecycle state (e.g., "Installed") associated with the skill (e.g., the installation state stored in skill version data structure 412 and associated with the selected skill). The lifecycle state presented may correspond to one of the lifecycle states discussed in connection with FIG. 12 below.

User interface 600 may include refresh option 610. Selection of this option may cause Puffin Central 118 to obtain and present anew values corresponding to the attributes depicted in FIG. 6.

User interface 600 may include area 612 which may be configured to present any suitable combination of attributes and corresponding values from skill version data structure 412. Option 613 may be select to expand an area of user interface 600 to present the data of areas 616 and 622. Area 616 may present a health dependency tree generated with respect to the selected skill. In some embodiments, the health dependency tree (e.g., a directed acyclic graph, a portion of the Build Dependency Graph 338, etc.) may be generated and/or by the Puffin Service in response to receiving indication (e.g., from an alarm service) that one or more alarms associated with the selected skill has been triggered. As a non-limiting example, BSCP Skill 2 may be identified by the Puffin Service as being unhealthy (e.g., due to receiving an indication that a particular alarm has been triggered). The health dependency tree presented in area 616 may be generated based at least in part on traversing upwards or downwards in a dependency graph generated based on all of the service metadata 402 instances and skill metadata 404 instances corresponding to every service and skill associated with the same build, run, or region associated with BSCP Skill 2.

Through traversing upward and downwards in the dependency graph and determining the corresponding health state of nodes of the graph corresponding to other skills, one or more skills may be identified as being the probable cause of the health state of BSCP Skill 2. By way of example, the Puffin Service may traverse the dependency graph upwards to identify IDDP Skill 1, v.1.0.0.1 is also unhealthy, but a skill (or all skills) higher up the graph and consumed by IDDP Skill 1 (meaning a skill on which IDDP Skill 1 depends) is/are healthy. Based at least in part on determining that IDDP Skill 1 is unhealthy and the highest skill in the dependency graph starting from a node corresponding to BSCP Skill 2, IDDP Skill 1 may be identified as the probable cause for the current health state associated with BSCP Skill 2. Similarly, additional affected skills may be determined lower in the dependency graph (e.g., based on health states that consume (depend on) one or more of the skills (e.g., BSCP Skill 2) which depend on the skill identified as being the probable cause of the health state indicated at user interface element 606. Area 616 may identify any suitable number of skill consumers (skills which depend on probable cause skill, IDDP Skill 1, v. 1.0.0.1) as "level 1 Impacts" indicating skills which directly depend on the probable cause skill. Area 616 may further identify any suitable number of skill consumers (e.g., skills which ultimately and indirectly depend on the probable cause skill) within area 616. The skills which are further downstream than the level 1 impacts may be referred to as "level 2 Impacts."

In some embodiments, area 622 may include any suitable additional data related to contributing cause analysis (e.g., identifying a probable cause or probable causes) for the unhealthy state of the currently selected skill. In some embodiments, the user may select option 614 to rerun the trace (e.g., the operations performed by the Puffin Service for traversing the dependency graph and checking each nodes health status to determine one or more skills which are likely a contributing cause of the current health state of the selected skill). In some embodiments, area 622 may enable any suitable portion of contact information corresponding to one or more entities (e.g., a service team lead, a software engineer associated with the service, etc.). Selecting one of the options provided within area 622 may cause contact information to be copied and/or utilized for communicating the unhealthy status and/or any suitable portion of the contributing cause analysis data. By way of example, selecting option 624 may cause previously specified contact information to be utilized to request a service team associated with IDDP Skill 1, v.1.0.0.1 to report to a designated location for troubleshooting the current state of their corresponding skill.

In some embodiments, additional options are provided within area 626. These additional options may correspond to tracking alarms, viewing a dependency graph (e.g., a graph similar to the one generated and presented within areas 616 of FIG. 6), presenting skill metadata corresponding to direct consumers (e.g., skills that directly depend on the selected skill), and migrated capabilities associated with the selected skill. By way of example, expanding the migrated capabilities section of area 626 may present one or more capabilities that correspond to the skill. This data may be maintained within skill data structure 410 of FIG. 4 under the capabilities attribute. In some embodiments, the capabilities listed may correspond to the capabilities to be published (by Puffin Regional) when an indication that the skill is available (e.g., an indication that the skill has transitioned to a particular skill state) is received (e.g., by Orchestrator 310 of FIG. 3).

Figure 7:
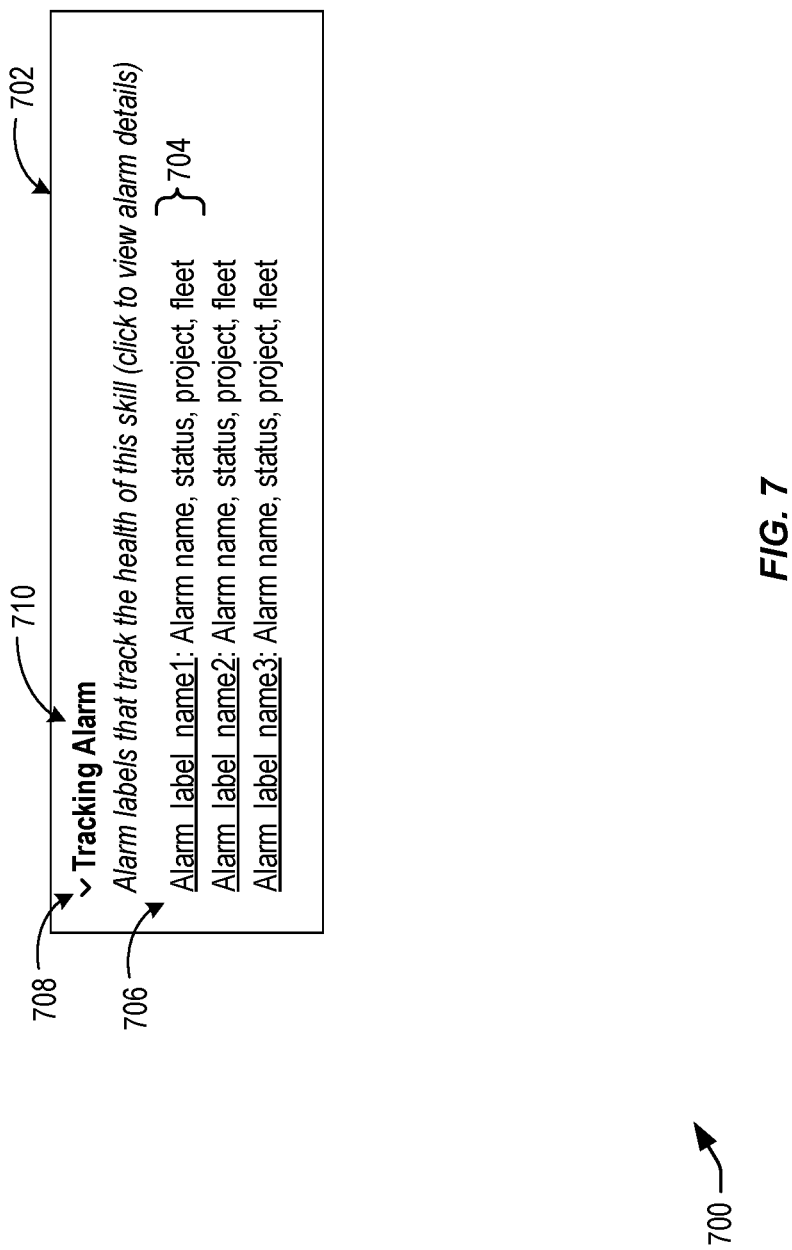
FIG. 7 is a schematic depicting an example user interface presenting alarm metadata, in accordance with at least one embodiment.

FIG. 7 is a schematic depicting an example user interface 700 presenting alarm metadata, in accordance with at least one embodiment. In some embodiments, user interface 700 may be presented upon selection of user interface element 628 of FIG. 6. In some embodiments, upon selecting user interface element 628, area 626 of FIG. 6 may be expanded to present area 702. Area 702 may include any suitable number of entries (e.g., entry 704) that present any suitable combination of attributes associated with an alarm. As depicted, entry 704 may correspond to an alarm. The attributes associated with the alarm may be stored in an instance of health check data structure 414 of FIG. 4. In some embodiments, the user may select link 706 to be navigated to a user interface that presents any suitable combination of attributes associated with the alarm corresponding to the link 706. The attributes displayed upon selecting link 706 may be any suitable alarm data attribute obtained from the alarm service(s) 122 of FIG. 1, alarm service(s) 344 of FIG. 3, etc. Selecting user interface element 708 (e.g., the user interface element 628) may cause area 702 to be collapsed such that header 710 is displayed as depicted in FIG. 6, while the alarm data (e.g., the entries including entry 704) are hidden from view.

Figure 8:
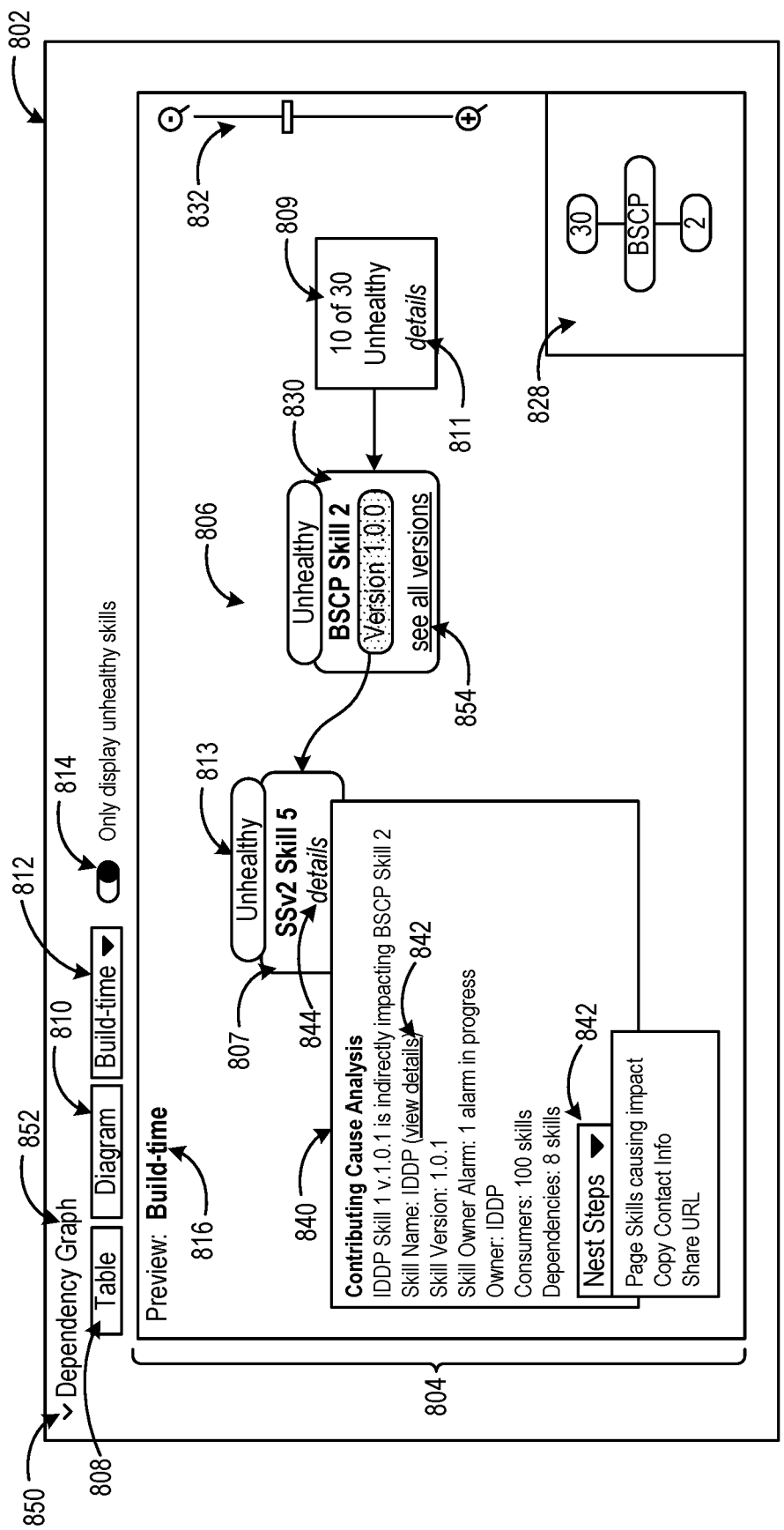
FIG. 8 is a schematic depicting an example user interface presenting dependency information corresponding to a skill, in accordance with at least one embodiment.

FIG. 8 is a schematic depicting an example user interface 800 presenting dependency information corresponding to a skill, in accordance with at least one embodiment. In some embodiments, user interface 800 may be presented upon selection of user interface element 630 of FIG. 6. In some embodiments, upon selecting user interface element 630, area 626 of FIG. 6 may be expanded to present area 802.

User interface 800 may include area 804 within which dependency graph 806 (e.g., any suitable portion of Build Dependency Graph 338 of FIG. 3, a directed acyclic graph generated based at least in part on skill metadata 404 of FIG. 4 (including any suitable number and combination of the data structure describe therein corresponding to a skill) etc.) may be displayed. In the example depicted, the dependency graph 806 presents at least some dependencies associated with to the Block Storage Control Plane (BSCP) Skill 2 corresponding to user interface 600 of FIG. 6. In some embodiments, dependency graph 806 may be configured to indicate direct consumers and direct upstream dependencies of the skill for which the dependency graph 806 is associated (e.g., BSCP Skill 2). As depicted, upstream skills (e.g., SSv2 Skill 5 corresponding to user interface element 807) may be specifically identified within area 804, while one or more consumers of the skill may be grouped as depicted with element 809. In some embodiments, selecting option 811 may present data indicating the specific skills which are consumers of the selected skill (BSCP Skill 2). These consumers may correspond instances of skill consumer data structure 418 of FIG. 4 which indicate a consumingSkillID corresponding to BSCP Skill 2.

User interface 800 may include a variety of options with area 802 such as table option 808, a diagram option 810, a dependencies drop-down menu 812, and a toggle 814 for filtering healthy skills from the data displayed within area 804. In some embodiments, one option (e.g., diagram option 810) may be selected by default. Although not depicted, selection of table option 808 may present the same corresponding skill metadata depicted in area 804 in tabular form (e.g., as entries in a table). In some embodiments, the dependency graph 806 may be one generated from skills metadata that defines build-time dependencies. A selection may be made via dependencies drop-down menu 812 to select run-time dependencies to present a different dependency graph generated for the skill (BSCP Skill 2, in this instance) from previously provided skill metadata. Indicator 816 may be used to indicate whether build-time or run-time dependencies are currently being presented within area 804. Using the toggle 814 in one position may cause the dependency graph 806 depicted in area 804 to present indicate all direct upstream dependencies and consumers, while using the toggle 814 in another position (e.g., the position depicted) may filter healthy skills (e.g., healthy direct upstream skills on which BSCP Skill 2 depends). As depicted in FIG. 8, toggle 814 is used in a position which filters from view healthy direct upstream skills from view. In some embodiments, unhealthy skills may be presented with an indicator that visually distinguishes unhealthy skills from healthy skills. By way of example, indicator 813 may be presented with user interface element 807 to indicate that SSv2 Skill 5 is unhealthy.

In some embodiments, dependency graph 806 may be a portion of a larger graph (e.g., Build Dependency Graph 338) generated (e.g., by Puffin Central 118 of FIG. 1) based at least in part on the skills metadata of various services associated with the region. In some embodiments, dependency graph 806 The selections made with user interface elements 604-610 may therefore limit the data presented within area to skills metadata associated with the Foundry service (and indications of a number or particular skills which depend on one or more of the skills associated with the Foundry service), or the area 616 may be capable of presented additional skills data associated with one or more other services, but is initially focused on the skills metadata associated with the Foundry service. In some embodiments, the larger diagram may include elements/nodes corresponding to every skill associated with each service to be deployed within the selected region.

Element 828 may be presented within area 804. Element 828 may be used to a number of upstream and downstream dependencies. The number of upstream/downstream dependencies may differ from the unhealthy ones presented or indicated within area 804. As depicted, element 828 indicates that there are 2 upstream dependencies for BSCP Skill 2 and 30 downstream dependencies or, in other words, there are 2 skills (e.g., including SSv2 Skill 5) on which BSCP Skill 2 depend and thirty skills that consume/depend on the BSCP Skill 2 skill. Element 830 may present any suitable skill metadata associated with the selected skill (BSCP Skill 2).

Some embodiments, one or more skills may be indicated (e.g., via user interface element 809) but initially hidden from view depending on a default or selected viewing scope. By way of example, user interface element 809 indicates that the 30 skills depend on BSCP Skill 2. In some embodiments, user interface element 832 may be used to modify the viewing scope of area 804. For example, the slider of user interface element 832 may be shifted upward to increase the scope of the viewing area (e.g., to zoom out to present a larger portion of the diagram/graph) or shifted downward to decrease the scope of the viewing area (e.g., to zoom in to present fewer elements corresponding to a fewer number of skills, to present additional skills which were previously grouped when zoomed out). By way of example, if user interface element 832 were to be shifted downward from the position depicted in FIG. 8, the user interface element 809 may be expanded to present or replaced with (e.g., 10) unhealthy skills corresponding to user interface element 809. These unhealthy skills may be presented via individual elements similar to element 807. In some embodiments, the healthy skills may be hidden from view or visible depending on the current position of toggle 814. In some embodiments, zooming outward may cause less information to be presented via a presented element, while zooming inward may cause an element to present additional information.

In some embodiments, contributing cause analysis data may be presented with area 840. In some embodiments, contributing cause analysis data (e.g., any suitable combination of the data presented within area 622) may be generated by the Puffin Service based at least in part on tracking the health of each of the skills associated with the various preregistered services. Selecting link 842 may navigate the user to a user interface similar to user interface 600 for another skill (e.g., IDDP). In some embodiments, area 840 may be presented by default at any suitable placement within area 804. In some embodiments, area 840 may be presented in response to selecting user interface element 844.

Area 840 may include drop-down menu 846 or any suitable interface element for presenting one or more options. As depicted, the options may include paging one or more teams/team members associated with the skill identified as causing the negative impact (e.g., IDDP), copying the contact information into memory (e.g., for a subsequent paste action), copying a URL corresponding to user interface 600 of FIG. 6, user interface 800, or the like (e.g., for a subsequent paste action).

Selecting user interface element 850 (e.g., the user interface element 630) may cause area 802 to be collapsed such that header 852 is displayed as depicted in FIG. 6, while the remaining elements and data depicted in FIG. 8 are hidden from view.

Figure 9:
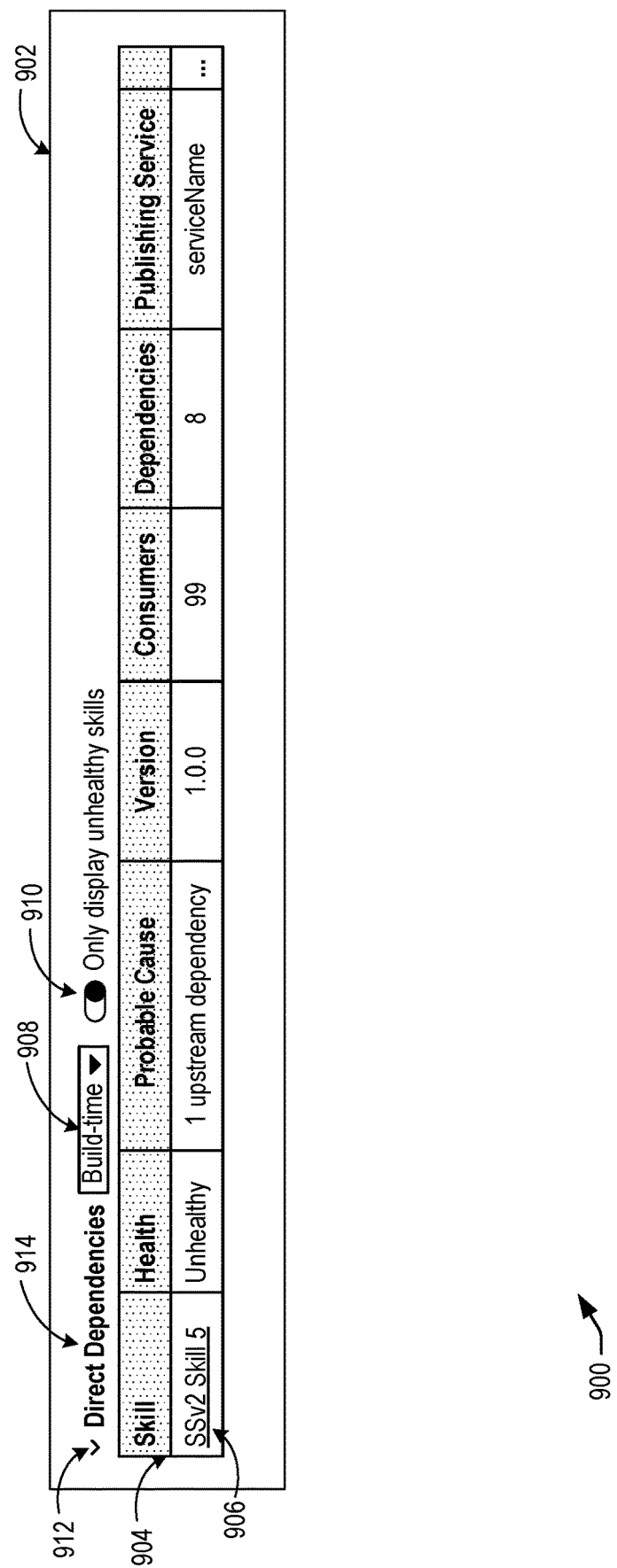
FIG. 9 is a schematic depicting an example user interface presenting direct consumer information, in accordance with at least one embodiment.

FIG. 9 is a schematic depicting an example user interface 900 presenting direct consumer information, in accordance with at least one embodiment. In some embodiments, user interface 900 may be presented upon selection of user interface element 632 of FIG. 6. In some embodiments, upon selecting user interface element 632, area 626 of FIG. 6 may be expanded to present area 902.

User interface 900 may include table 904 within which any suitable number of entries may be presented. Each entry may correspond to an individual skill on which the selected skill (in the ongoing example, BSCP Skill 2 of FIG. 6) depends. Each entry may include a link (e.g., link 906) that, when selected, may navigate the user to a user interface similar to user interface 600 and corresponding to the skill associated with the entry that included the selected link. As depicted in FIG. 9, the table 904 includes a skill name, health (e.g., corresponding to the status of health check data structure 414 of FIG. 4), probable cause (e.g., indicating one or more skills further upstream which have been identified as being a likely cause of the current skill's health status (e.g., BSCP Skill 2's unhealthy health status), a number of consumers, a number of dependencies, and a publishing service. However, each entry with table 904 may include any suitable skill metadata associated with a given skill.

User interface 800 may dependencies drop-down menu 908 and a toggle 910 for filtering healthy skills from the data displayed within table 904. In some embodiments, the table 904 may be one generated from skills metadata that defines build-time dependencies. A selection may be made via dependencies drop-down menu 812 to select run-time dependencies to present a different table generated from skills metadata corresponding to run-time dependencies. Using the toggle 910 in one position may cause the table 904 to present all upstream dependencies regardless of health status, while using the toggle 910 in another position (e.g., the position depicted) may filter healthy skills from the table 904. As depicted in FIG. 9, toggle 910 is used in a position which filters from view healthy direct upstream skills from view (indicating that SSv2 Skill 5 is the only unhealthy skill of the skills on which BSCP Skill 2 directly depends).

Selecting user interface element 912 (e.g., the user interface element 632) may cause area 902 to be collapsed such that header 914 is displayed as depicted in FIG. 6, while the remaining elements and data depicted in FIG. 9 are hidden from view.

Figure 10:
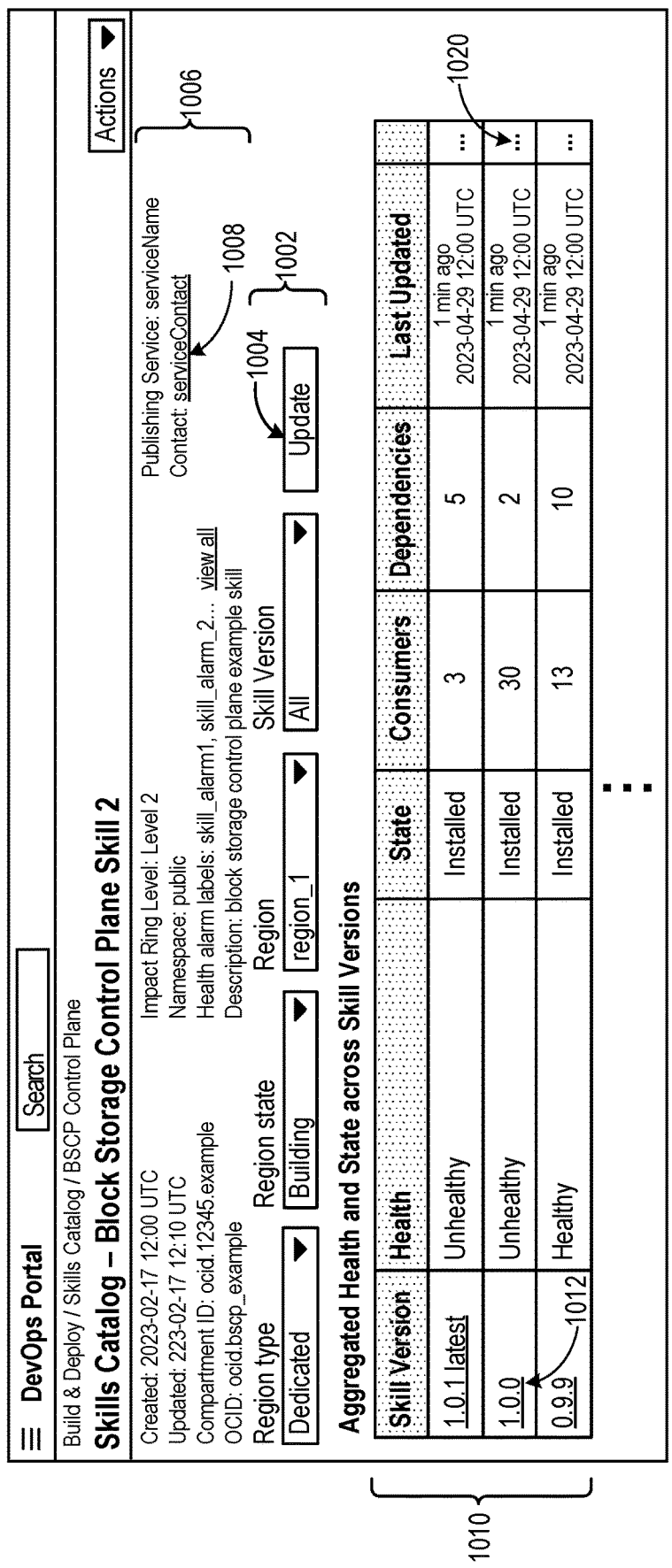
FIG. 10 is a schematic depicting an example user interface presenting skill health information corresponding to multiple skill versions, in accordance with at least one embodiment.

FIG. 10 is a schematic depicting an example user interface 1000 presenting skill health information corresponding to multiple skill versions, in accordance with at least one embodiment. User interface 1000 may be presented based at least in part on selection of user interface option 854 of FIG. 8. As another example, user interface 1000 may be presented based at least in part on selecting the values depicted via user interface options of area 1002 (e.g., each an example of one of the user interface elements of area 604 of FIG. 6). Area 1002 may further include an update option (update option 1004). Selecting update option 1004 may cause the data presented within area 1010 to be updated according to the values provided within the user interface elements within area 1002, when the update option 1004 was selected.

Area 1006 may present any suitable combination of attributes and corresponding values according to a predefined format. The data presented within area 1006 may correspond to any suitable attribute associated with service metadata 402 and/or skills metadata 404 of FIG. 4 (e.g., any suitable combination of the attributes of service data structure 406 skill data structure 410, skill version data structure 412, and/or skill metadata data structure 416). As a non-limiting example, area 1006 includes a created date, an updated data, a compartment identifier, a unique system identifier (e.g., OCID), an impact ring level, a namespace type, one or more health alarm labels associated with the selected skill, a description, a service owner, and contact information. In some embodiments, the publishing service data depicted in area 1006 may correspond to the service name attribute of service data structure 406 and the contact information to which link 1008 relates may correspond to the ownerContact attribute (or any suitable attribute) of skill metadata data structure 416. Selection of link 1008 may cause any suitable attribute of skill metadata data structure 416 to be displayed (e.g., via a popup window, via another user interface configured to display such information, or the like).

User interface 1000 may include area 1010 which may include any suitable data corresponding to the version of the selected skill, in this example, Block Storage Control Plane (BSCP) Skill 2. As depicted in FIG. 10, BSCP Skill 2 may be associated with three skill versions (e.g., 0.9.9, 1.0.0, and 1.0.1 (the latest version)). In some embodiments, each skill version may be presented with corresponding attributes including state (e.g., corresponding to the health state attribute of skill version data structure 412 of FIG. 4 corresponding to the particular skill version. As depicted, each skill version may be presented with a consumer number corresponding to the number of consumers that depend on the skill, a number of dependencies (e.g., other skills on which the skill version depends), and a last updated time stamp/time period at which the health of the skill version was last assessed/updated. Selecting link 1012 may navigate the user to a user interface configured to present data corresponding to the skill version to which the selected link relates. By way of example, selecting link 1012 may cause the user to be navigated to user interface 1100 of FIG. 11.

FIG. 11 is a schematic depicting an example user interface 1100 presenting skill health information corresponding to a skill version as utilized within multiple regions, in accordance with at least one embodiment. User interface 1100 may be presented based at least in part on selection of link 1012 of FIG. 10, corresponding to the Block Storage Control Plane (BSCP) Skill 2, and specifically, version 1.0.0 of BSCP Skill 2. As another example, user interface 1100 may be presented based at least in part on selecting the values depicted via user interface options of area 1102 (e.g., each an example of one of the user interface elements of area 604 of FIG. 6, the user interface elements of area 1002 of FIG. 10, etc.). Area 1102 may further include an update option (e.g., the update option 1004 of FIG. 10). Selecting the update option within area 1102 may cause the data presented within area 1104 to be updated according to the values provided within the user interface elements within area 1002, when the update option was selected.

Area 1104 may present any suitable combination of attributes and corresponding values according to a predefined format. The data presented within area 1104 may correspond to any suitable attribute associated with service metadata 402 and/or skills metadata 404 of FIG. 4 that correspond to the skill version selected. In this example, the entries within area 1104 depict version 1.0.0 of BSCP Skill 2 across Regions 1, 2, and 3.

Area 1104 may include any suitable data corresponding a particular version of a particular skill, in this case, version 1.0.0 of Block Storage Control Plane (BSCP) Skill 2. As depicted in FIG. 11, version 1.0.0 of BSCP Skill 2 may be associated with three regions (e.g., Region 1, Region 2, and Region 3). In some embodiments, each any suitable combination of service metadata 402 and/or skills metadata 404 may be associated with a given region. In the example depicted, a corresponding set of data structures corresponding to service metadata 402 and skills metadata 404 may be associated with each of regions 1, 2, and 3. Any suitable attribute of the set of data structures corresponding to a given region may be presented within area 1104. As depicted, the skill version 1.0.0 of BSCP Skill 2 in region 1 may be presented as being associated with attributes including fleet (e.g., corresponding to the fleet attribute of skill data structure 410 of FIG. 4), a type (e.g., corresponding to the namespaceType of skill data structure 410 of FIG. 4), health (e.g., corresponding to the healthState attribute of skill version data structure 412 of FIG. 4), state (e.g., corresponding to the installationState attribute of skill data structure 410 of FIG. 4), or the like. As depicted, an entry of area 1104 corresponding to a given region may include a consumer number corresponding to the number of consumers that depend on version 1.0.0 of the skill, a number of dependencies (e.g., other skills on which the version 1.0.0 of the skill depends), and a last updated time stamp/time period at which the health of the version 1.0.0 of the skill was last assessed/updated.

Figure 12:
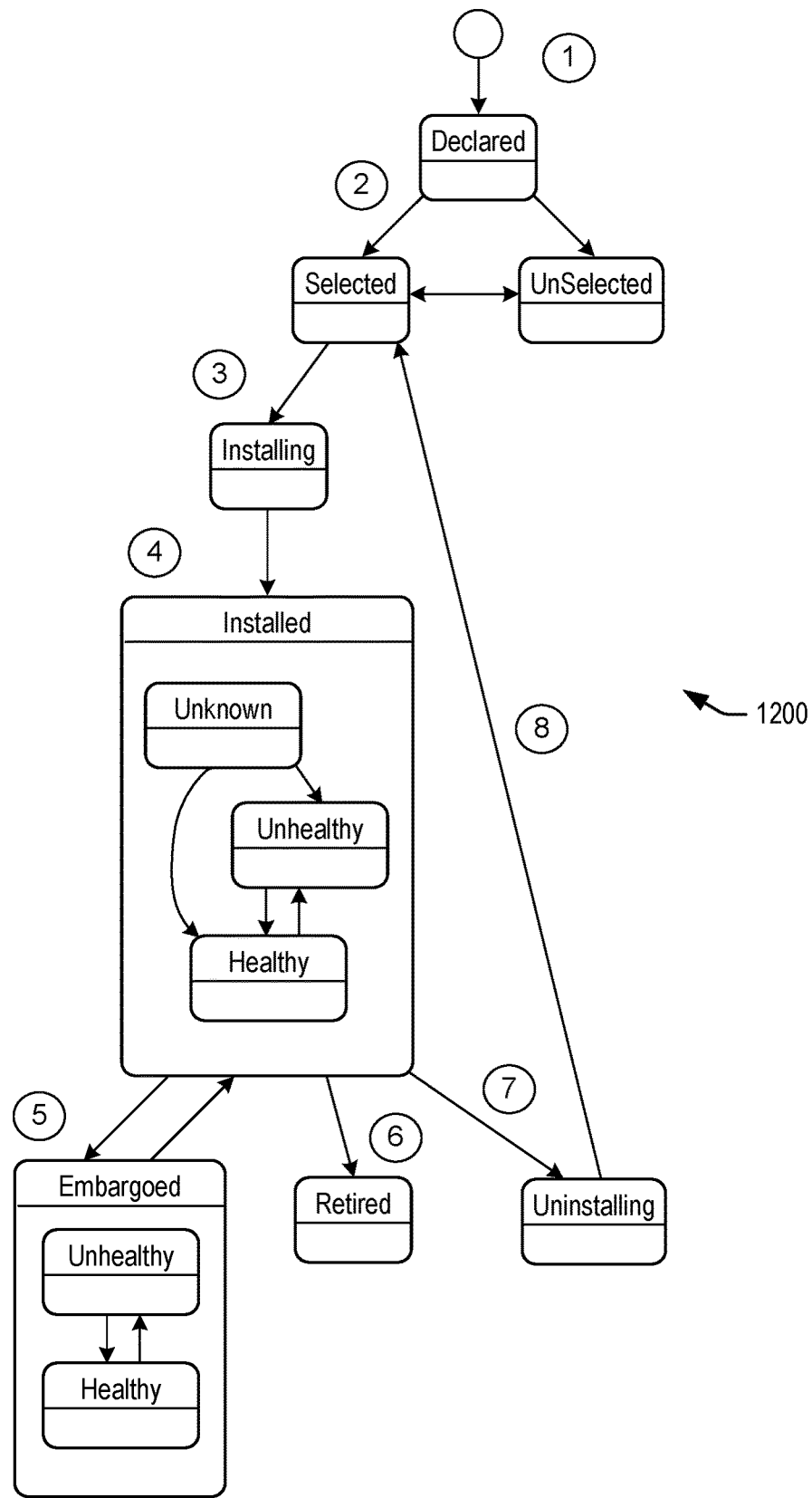
FIG. 12 is a block diagram depicting an example lifecycle for a skill, in accordance with at least one embodiment.

FIG. 12 is a block diagram depicting an example lifecycle 1200 for a skill, in accordance with at least one embodiment. Lifecycle 1200 may include any suitable number of states. As depicted, lifecycle 1200 includes states such as declared, selected, unselected, installing, installed, embargoed, retired, and uninstalling, although other combinations of lifecycle states are contemplated. A lifecycle state may correspond to the installationState attribute of the skill data structure 410 of FIG. 4. In some embodiments, a lifecycle state may be associated with any suitable number of substates. Each of these substates may correspond to the healthState of skill version data structure 412 of FIG. 4. As depicted in FIG. 12, a skill that is associated with a lifecycle state of "installed" may be associated with one of three substates (e.g., "unknown," "unhealthy," and "healthy"). Likewise, a skill associated with an "embargoed" state may be associated with a "healthy" or and "unhealthy" substate. Descriptions for the conditions indicated by each state are provided below.

| State | Health Monitored | Description |
| --- | --- | --- |
| Declared | | A skill version resource (e.g., skill version data structure 412 of FIG. 4) has been created by the Puffin Service and is known to the system (e.g., stored in a database and accessible by any suitable component of CIOS 102 of FIG. 1) |
| Selected | | The skill version resource is selected (e.g., by orchestrator 106 of FIG. 1) for installation into the target region |
| Unselected | | The skill version resource is unselected (e.g., by orchestrator 106 of FIG. 1) to ensure the skill version is not (or never) installed in the target region |
| Installing | | Installation of the Service producing the associated Skill is currently underway in the target region. |
| Installed | Y | Installation of the Service producing the associated Skill has completed successfully. Puffin begins/continues periodic health monitoring of the Skill. |
| Uninstalling | | Uninstallation of the Service producing the associated Skill is currently underway in the target region. |
| Retired | | The skill version is installed in the target region but no longer provides any meaningful value to any consumers.<br>This state may be utilized by ephemeral Skills in the context and utility of region build. |
| Embargoed | Y | Installation of the Service producing the associated Skill has completed successfully.<br>Puffin begins/continues periodic health monitoring of the skill but the skill version should be treated as Installed only by Skill dependencies of the same producing Service. |

In some embodiments, at step 1, upon selecting the option publish a skill an instance of skill version data structure 412 of FIG. 4 corresponding to the skill may be created and updated to indicate an installation state of "declared." At step 2, the orchestrator 106 may select the skill for installation within the target region (e.g., target region 114) and transmit data indicating the selection (or a state transition to "selected"). Upon receipt of this data, the Puffin Service may update the skill version data structure 412 to "selected." At step 3, the Orchestrator 106 of FIG. 1 may begin deploying a resource of the service producing the associated skill and may transmit a new indication that the installation state of the skill is to be set to "installing." Upon receipt, the Puffin Service may update the skill version data structure 412 to "installing." At step 4, the installation state of the skill may be updated to "installed" when the installation of the Service producing the associated skill has been successfully completed. Generally, any of the state transitions described herein may be initiated by the Orchestrator 106 (on receiving indications from CIOS Regional or CIOS Central that one or more releases have been successfully executed). Receipt of any suitable indication of a state transition occurring may cause the Puffin Service to update the installation state of the skill version data structure 412. While the skill is associated with an "installed" state, the Puffin Service may monitor the health of the skill.

In some embodiments, monitoring the health of a skill may include monitoring for indications that one or more alarms associated with the skill (e.g., alarms indicated with the alarmLabelName attribute of health check data structure 414 of FIG. 4) have been triggered (e.g., by an alarm service such as a telemetry service and/or a sentinel service, each an example of one of the services of cloud services 2056 of FIG. 20). In some embodiments, if an alarm service (e.g., a telemetry service) configured to provide these alarms is unavailable, a substate corresponding to the "healthState" attribute of skill version data structure 412 may be updated to indicate an "unknown" health state of an installed skill. If no alarm has been triggered for at least a threshold period of time, the healthState attribute of the skill version may be set to a value to indicate a "healthy" state of the installed skill. Receipt of an indication that an alarm that is associated with the skill has been triggered may cause the Puffin Service to update the healthState attribute of the skill version to an "unhealthy" state for the installed skill.

At step 5, the installation state may be updated to an "embargoed" state (e.g., by the Orchestrator, the Puffin Service, and/or based on user input) to indicate that health monitoring should continue but that only skills of the same producing service should treat the embargoed skill as being installed. In some embodiments, the installation state of the skill may revert to "installed."

In some embodiments, a skill version may be retired (e.g., via user input) at step 6. While in the retired state, the skill version may not (or cannot) be utilized by other skills and/or in any build or run. In some embodiments, the skill version's installation state may not be modified once the skill has transitioned to the retired state.

In some embodiments, a skill version's installation state may transition from an "installed" state" to an "uninstalling" state based at least in part on operations performed by the orchestrator and/or by user input. In some embodiments, the orchestrator 106 may determine service deployments are to be reversed. In these situations, the orchestrator 106 may "unwind" installation of one or more services. During these operations, when the service is being uninstalled at step 7, the skill version associated may be updated to indicate a state of "uninstalling." When the service associated with the skill version has been successfully uninstalled, the skill version's installation state may be updated to "selected" at step 8.

A number of transitions between the various states and substates are contemplated. The lifecycle states and transitions depicted in FIG. 12 are illustrative and are not intended to limit the scope of the disclosure.

Figure 13:
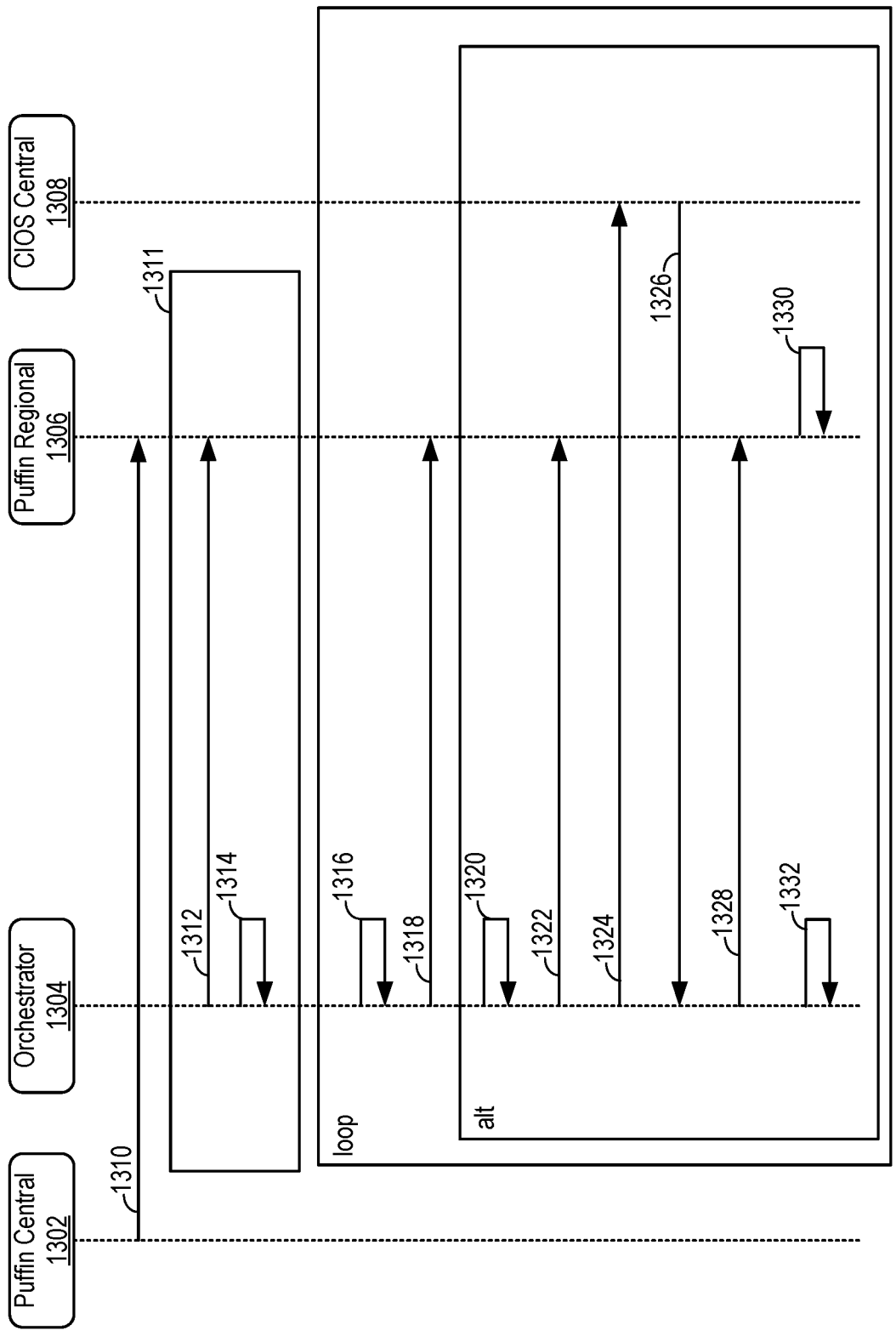
FIG. 13 is a flow diagram depicting an example method for managing skill states, in accordance with at least one embodiment.

FIG. 13 is a flow diagram depicting an example method 1300 for managing skill states, in accordance with at least one embodiment. The method 1300 may be performed with any suitable combination of Puffin Central 1302 (e.g., Puffin Central 118 of FIG. 1), Orchestrator 1304 (e.g., Orchestrator 106 of FIG. 1), Puffin Regional 1306 (e.g., Puffin Regional 120 of FIG. 1), and CIOS Central 1308 (e.g., CIOS Central 108 of FIG. 1). More or fewer operations may be included in method 1300 than the ones described in connection with FIG. 13. The operations of method 1300 may be performed in any suitable order.

Method 1300 may begin at 1310, where Puffin Regional 1306 may be seeded by Puffin Central 1302 with all predefined skills, versions, and consumers. In some embodiments, Puffin Central 1302 may utilize an application programming interface, function call, or another suitable method for communicating the metadata corresponding to each skill that has been previously defined (e.g., user-generated and/or system generated skills, the latter being referred to herein as "shadow skills") to Puffin Regional 1306. In some embodiments, Puffin Central 1302 may send identifiers corresponding to each skill (and their skill version) with which the corresponding instance(s) of skills metadata may be retrieved by Puffin Regional 1306. In some embodiments, Puffin Central 1302 may be configured to identify and transmit skills metadata and/or identifiers (e.g., skill ID, major version, minor version, etc.) for skills which are to be utilized for building a region corresponding to Puffin Regional 1306. In some embodiments, the skill state for each of these skills may indicate that the skills are selected, but not yet installed. The state of a skill may be expressed with any suitable combination of the installationState and/or healthState attributes of a corresponding skill version data structure (e.g., the skill version data structure 412 of FIG. 4). By way of example, the "installationState" attribute may be set to a predefined value associated with the selected state.

Operations 1311 may include any suitable operations for building a target set and ordered execution plan. By way of example, at 1312, Orchestrator 106 may perform any suitable operations for identifying respective skill states for every skill, version, and consumer for the region. This may include identifying installation and/or health states of each skill (e.g., based at least in part on the installationState and healthState attributes of skill version data structure 412 of FIG. 4), version identifiers corresponding to each skill (e.g., based at least in part on major and/or minor version attributes of skill data structure 410 of FIG. 4), and/or identifiers of each consumer of the identified skills. Consumers of the identified skill may be identified based at least in part on determining all instances of skill consumer data structure 418 that indicate, via any suitable combination of consumingSkillID and/or consumingServiceID attributes, an ID of skill data structure 410 and/or service ID of service data structure 406 corresponding to an identified skill.

At 1314, a target set and/or ordered execution plan may be generated. In some embodiments, building a target set may include any suitable combination of identifying and/or obtaining 1) a version set of flock configs (a "golden set"

corresponding to a specific set of flock configs individually identified by specific version identifiers and corresponding to a set of services to be deployed in the region), 2) a Service Plan and Manifest (SPAM) set (e.g., aggregate particular SPAMs, associated with specific version identifiers and corresponding to a set of services to be deployed in the region), 3) a set of artifacts (e.g., program code associated with specific version identifiers, to be utilized/executed for provisioning infrastructure and/or deploying software within the region), or the like. As described above in connection with FIG. 3, building an ordered execution plan may include parsing the flock configs and/or SPAMs to determine dependencies between execution units, dependencies between services, dependencies between execution units of a single service, or the like. In some embodiments, building an ordered execution plan may include performing the above-described static flock analysis to identify cyclic dependencies. The Build Dependency Graph 338 of FIG. 3 (or another suitable ordered list indicating operations to be executed for the region build) may be considered an example of an ordered execution plan generated by orchestrator 1304 at 1314.

Once built, the ordered execution plan may be utilized by Orchestrator 1304 to execute a region build. By way of example, at 1316, the Orchestrator 1304 may identify, for a current step, all skills on which the current step depends. As described below, Puffin Regional 1306 may maintain compatibility between skills and capabilities. Thus, in embodiments in which at least some capabilities are used to indicate availability of a particular service, resource, or functionality, Puffin Regional 1306 may generate shadow skills for those capabilities (e.g., prior to a region build) with which corresponding skill states may be used to track the current state of the capabilities represented by those shadow skills. In some embodiments, Puffin Regional 1306 may be configured to obtain capabilities data from storage, from Capabilities Service 112 of FIG. 1, from Orchestrator 1304, or any suitable combination of the above. Puffin Regional 1306 may be configured to update skill state for any suitable skill state based on data received from Orchestrator 1304, Capabilities Service 112, and/or an alarm service (e.g., one of cloud services 2056 of FIG. 20), or any suitable combination of the above. If a skill (e.g., a user defined or system defined skill) is associated with multiple capabilities, the skill may not be considered installed or transitioned to a particular state (e.g., an "INSTALLED" state) until Puffin Regional 1306 determines that each capability has been published or otherwise indicated as available.

At 1318, Orchestrator 1304 may query Puffing Regional 1306 for a current state corresponding to each skill on which the current step depends. A skill may be identified based at least in part on any suitable combination of skill ID, major version identifier, and/or minor version identifier, and/or according to any suitable combination of attribute values that are configured to be unique across skills. At the start of region build (e.g., at a first step, a first node of the Build Dependency Graph 338, a first operation of an ordered list of operations, etc.), the current step may lack association to any upstream skill. If no dependencies are identified for the current step, the method 1300 may continue to 1320 without executing the operations at 1318.

At 1320, in scenarios in which the Orchestrator 106 is returned corresponding skill states for one or more upstream skills (e.g., skills on which the current step depends) that indicate one or more upstream skills are not in a particular state (e.g., "INSTALLED") and/or substate (e.g., "HEALTHY"), the Orchestrator 106 may execute operations to indicate a failure. In some embodiments, the current state of these skills may be viewed at similar user interfaces as the one depicted in FIG. 6 to enable root cause analysis to be performed (e.g., by the system or user). In some embodiments, a sub-state of "UNHEALTHY" of one or more of the upstream skills may cause Puffin Regional 1306 to trace or otherwise traverse the ordered execution plan (and/or Build Dependency Graph 338) upward (e.g., from the current step and upstream), to identify a highest upstream skill (first to occur in the ordered execution plan) that is associated with an "UNHEALTHY" state. An example of the information obtained from this trace is depicted in area 616 of FIG. 6. In some embodiments, Orchestrator 106 may be configured to wait and periodically resubmit its query according to a predefined frequency or schedule, waiting on an indication that the upstream skills are associated with an installation state of "INSTALLED," and a sub-state of "HEALTHY."

At 1322, at any suitable time, the Orchestrator 1304 may identify the upstream skills are installed and healthy based on the skill states obtained from Puffin Regional 1306. In response to identifying all upstream skills are installed and healthy, Orchestrator 1304 may transmit data for the skill(s) associated with the current step indicating the current state of those skill(s) is "INSTALLING." Transmitting such data may cause Puffin Regional 1306 to update the installation state attribute of the skills version data structure 412 of FIG. 4 that is associated with that skill to indicate a skill state of "INSTALLING."

At 1324, Orchestrator 1304 may execute operations to cause CIOS Central 1308 to initiate one or more releases. In some embodiments, CIOS Central 1308 may instruct an instance of CIOS Regional within the region (e.g., CIOS Regional 110 of FIG. 1, a CIOS Regional 110 deployed within the target region being built, etc.) to perform operations for a given release. Examples of the operations executed by CIOS Central 1308 and CIOS Regional 110 are described in more detail with respect to FIG. 3 and are not repeated here, for brevity. At 1326, CIOS Central 1308 may transmit an indication that the release was successful or unsuccessful. If unsuccessful, Orchestrator 1304 may execute operations to instruct CIOS Central 1308 once again, to attempt the release again. This retry process may be executed any suitable number of times and according to any suitable predefined protocol.

At 1328, if the release was successful, Orchestrator 1304 may transmit data to Puffin Regional 1306 indicating that the skill(s) associated with the current step are now installed. Any suitable operations executed (e.g., by Orchestrator 1304) to update (e.g., via Puffin Regional 1306) a skill state to indicate that the skill was installed may be referred to as "publishing a skill." In response to receiving this data, Puffin Region 1306 may update the skill(s)' installation state to a value corresponding to the "INSTALLED" state. In some embodiments, Puffin Regional 1306 may be configured to transmit any suitable data (e.g., to Capabilities Service 112 of FIG. 1) for any suitable combination (e.g., all) of the capabilities associated with the skill that was transitioned to the "INSTALLED" state (e.g., the capabilities identified with the capabilities attribute of skill data structure 410 of FIG. 4).

At 1330, in some embodiments, Puffin Regional 1306 may be configured to commence operations for monitoring the installed skill(s)' health state. In some embodiments, this may include monitoring for one or more alarms (indicated by the alarm labels of health check data structure 414 of FIG. 4. Puffin Regional 1306 may update a sub-state (e.g., the healthState attribute of the health check data structure 414)

in accordance with its monitoring. For example, Puffin Regional 1306 may update the sub-state of a skill to indicate an "UNHEALTHY" state if, through its monitoring, it determines that an alarm has been triggered which is associated with a given skill. Puffin Region 1306 may be configured to update set or leave a sub-state of the skill as indicating "HEALTHY" when it determines that no alarm associated with the skill has been triggered (ever, or at least for a predefined threshold time period).

At 1332, Orchestrator 1304 may transition to the next step in the ordered execution plan (e.g., to a next node of the Build Dependency Graph 338). The operations described at 1316-1332 may be performed any suitable number of times, corresponding to each step in the ordered execution plan. When a last step has already been reached in the plan, the Orchestrator 1304 may conclude the region build at 1332.

Figure 14:
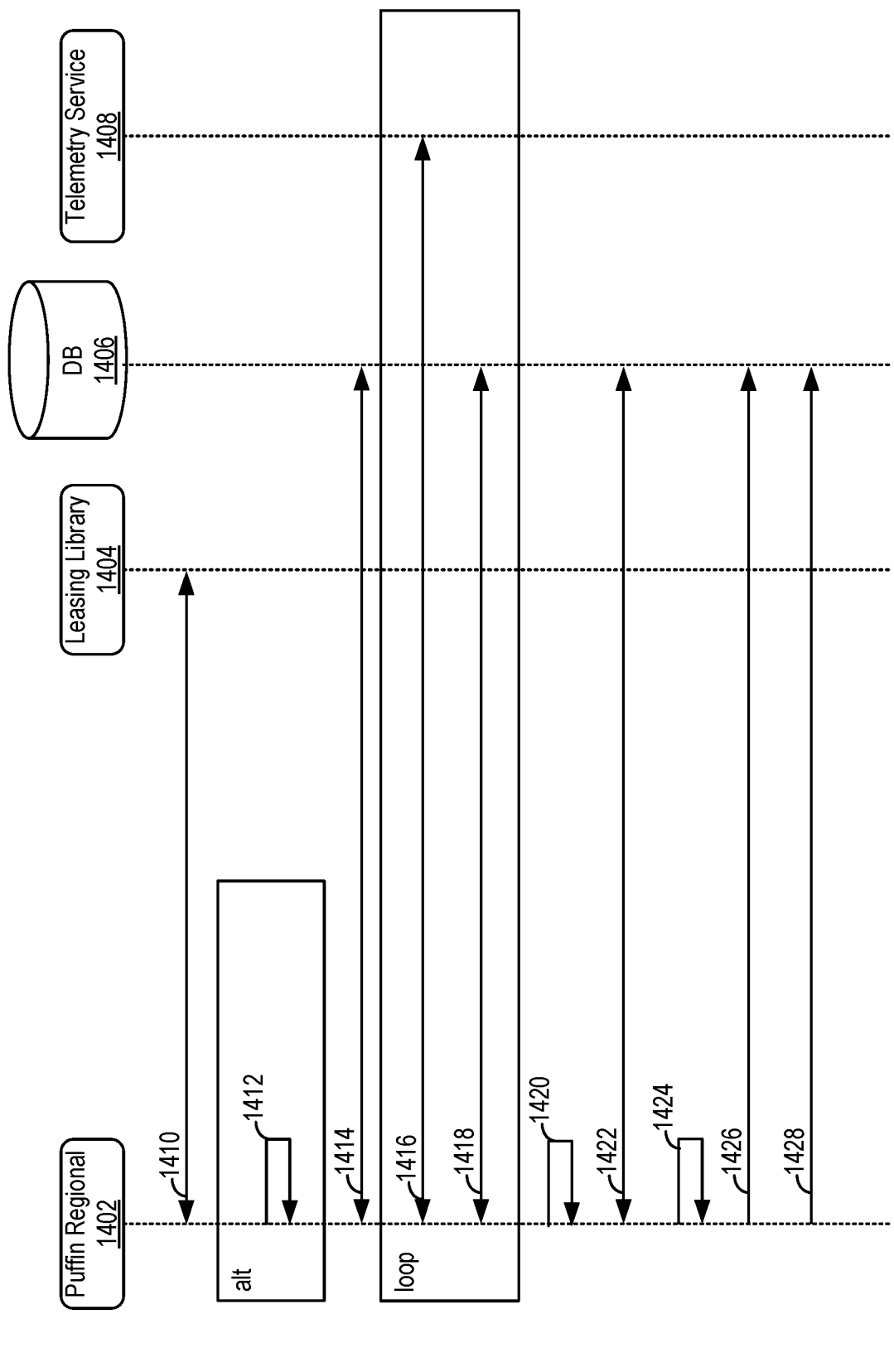
FIG. 14 is a flow diagram depicting an example method for calculating and updating skill health utilizing a telemetry service, in accordance with at least one embodiment.

FIG. 14 is a flow diagram depicting an example method 1400 for calculating and updating skill health utilizing a telemetry service, in accordance with at least one embodiment. The method 1400 may be performed with any suitable combination of Puffin Regional 1402 (e.g., Puffin Regional 120 of FIG. 1), Leasing Library 1404 (e.g., a component of Puffin Service), Database 1406 (e.g., a database accessible to Puffin Region 1402), and Telemetry Service 1408 (e.g., an example of alarm service(s) 122 of FIG. 1). More or fewer operations may be included in method 1400 than the ones described in connection with FIG. 14. The operations of method 1400 may be performed in any suitable order. In some embodiments, Puffin Regional 1402 may execute any suitable number of worker(s) and/or health check jobs/processes that individually may execute some or all of the operations of method 1400. In some embodiments, the operations described below with respect to Puffin Regional 1402 may be performed by a process initiated by or associated with Puffin Regional 1402. In some embodiments, Telemetry Service 1408 may maintain all alarm transition history (e.g., deltas indicating alarm transitions from OK to FIRING or vice versa). Each transition may be associated with a time or a transaction number indicating a relative point within the historical transitions associated with each alarm.

Method 1400 may begin at 1410, a process executed by Puffin Regional 1402 may request a lease from leasing library 1404 (e.g., via a lease request). In some embodiments, leasing library 1404 may be a component of Puffin Regional 1402 or a separate process or service that is configured to assign a single process to a health update. In some embodiments, leasing library 1404 may maintain a record of a process that has been assigned to execute a particular health update. In some embodiments, leasing library 1404 may be configured to ensure only a single process is assigned to perform a particular health update. For each compartmentID, leasing library 1404 may return a token (e.g., continuation token of health check data structure 414 of FIG. 4) that indicates a time or alarm transaction identifier that indicates the last alarm transaction received from the Telemetry Service 1408. If no alarm data has been obtained from the Telemetry Service, the token may be defaulted to a predefined value to obtain all history, or some portion of the alarm history (e.g., alarm data corresponding to transitions occurring within the last 24 hours, 12, hours, 1 hour, 10 minutes, etc.).

The leasing library 1404 may be configured with any suitable protocol sets defining a periodicity, frequency, or schedule by which health checks are to be performed. As a non-limiting example, this protocol set may identify that Puffin is to update the health states of all skills once every minute (or five minutes, 2 hours, or any suitable time period). In some embodiments, the first process which requests a lease may be assigned as the executor of that health check and leasing library 1404 may store a record indicating that the health check was requested and assigned and a time at which the health check was requested and/or assigned. If another process associated with Puffin Regional 1402 requests a lease from leasing library 1404, leasing library 1404 may check its records to identify that the current request is within a time period the last process was assigned and therefore another health check is not yet needed and the leasing library 1404 may deny the request. The leasing library 1404 may be configured to assign a new process to a health check when the first lease request is received after a predefined time period since the last health check was assigned has elapsed. In this manner, the leasing library 1404 may be utilized to ensure only one process performs the health check to avoid duplicate processing and to ensure that health checks are performed according to the predefined periodicity, frequency, and/or schedule.

If a lease cannot be acquired, the method may cease at 1412. If a lease is obtained, the method 1400 may continue to 1414.

At 1414, Puffin Regional 1402 may obtain compartmentID and corresponding continuation tokens from database 1406. Database 1406 may be configured to store any suitable combination of the data structures of FIG. 4. By way of example, database 1406 may store each instance of the health check data structure 414 of FIG. 4. Database 1406 (or a manager of database 1406 may be configured to return each compartmentID/continuation token pair obtained from the health check data structures stored there.

At 1416, Puffin Regional 1402 may request (e.g., from the Telemetry Service 1408) alarm data (e.g., alarm transition history for an alarm) using the compartmentID and continuation obtained at 1414. Telemetry Service 1408 may respond with every alarm transition or a subset of the historical alarm transitions corresponding to the compartmentID. In some embodiments, the Telemetry Service 1408 selects the subset of the historical alarm transitions based at least in part the continuation token provided. By way of example, the continuation token may indicate a time and/or transaction of the historical alarm history which was last obtained. Using this information, the Telemetry Service 1408 may be configured to provide alarm historical transitions that occurred after the time/transaction indicated by the continuation token. In some embodiments, the alarm historical transitions may be stored in health check data structure 414 or Puffin Regional 1402 may process the transitions according to a predefined protocol set to identify a status of a given alarm based at least in part on the particular alarm transitions indicated by the alarm data obtained from Telemetry Service 1408.

At 1418, Puffin Regional 1402 may update the alarm status for the alarm within an instance of the health check data structure 414 stored in database 1406. By way of example, Puffin Regional 1402 may update the status attribute within an instance of health check data structure 414 that corresponds to the alarm based on the status identified from the data obtained at 1416. The operations described at 1416 and 1418 may be repeated for each compartmentID/continuation token obtained at 1414.

At 1420, Puffin Regional 1402 may execute any suitable operations to calculate all unique alarm labels from the alarm transition history obtained at 1416.

At 1422, Puffin Regional 1402 may identify skills corresponding to the unique alarm labels identified at 1420. By way of example, Puffin Regional 1402 may request and receive from database 1406 corresponding skill IDs/names that are associated (directly, or indirectly) with each instance of health check data structure 414 that corresponds to one of the unique alarm labels identified at 1420.

At 1424, Puffin Regional 1402 may group the alarm transition history for a skill using the alarm transition history only from alarm labels associated with that skill. In some embodiments, Puffin Regional 1402 may determine whether a skill is healthy, unhealthy, or the health state is unknown based at least in part on processing the alarm transition history of the alarms associated with that skill to identify a current status for each alarm. A skill may be identified as being healthy when the no alarm associated with the skill is identified (e.g., based on the alarm transition history and/or current status of the alarm) as firing. A skill may be identified as being unhealthy when any of the alarms associated with the skill are identified (e.g., based on the alarm transition history and/or current status of the alarm) as firing.

At 1426, Puffin Regional 1402 may store new health states (e.g., corresponding to HEALTHY, UNHEALTHY, UNKNOWN) within the healthState attribute of the skill version data structure corresponding to the alarms and skill. In some embodiments, Puffin Regional 1402 may execute any suitable operations to transmit data indicating the health state (e.g., when the health state of a skill is identified as UNHEALTHY).

As a side, in some embodiments, identifying a skill as being unhealthy may cause Puffin Regional 1402 to transmit data to Puffin Central (e.g., Puffin Central 118 of FIG. 1) to trigger a process for identifying root cause. In some embodiments, Puffin Central may access a dependency graph (e.g., the Build Dependency Graph 338 of FIG. 3) and traverse the dependency graph upstream (e.g., backwards from the direction normally taken during execution), starting from a node corresponding to the unhealthy skill. The traversal may continue upward/backwards within the dependency graph until the most-upstream unhealthy node is identified (e.g., by traversing until a healthy node is reached and identifying an immediate downstream node corresponding to the most-upstream node corresponding to an unhealthy skill). Puffin Central 118 may present data indicating the identification of the most-upstream unhealthy node and indicate that the corresponding skill is identified as the root cause the skill that was initially identified as unhealthy. FIG. 6 provides an example of the data presented by Puffin Central 118 to indicate the health of the skill as well as its root cause.

At 1428, Puffin Regional 1402 may store new continuation tokens for each compartmentID that indicate the last transaction and/or time for which alarm transition history was obtained. The continuation token may be stored within an instance of health check data structure 414 that includes the corresponding alarm data.

As described above, Puffin Regional 1402 may perform method 1400 any suitable number of times, at any suitable periodicity, frequency, or according to a predefined schedule to track and maintain record of skill health over time.

Figure 15:
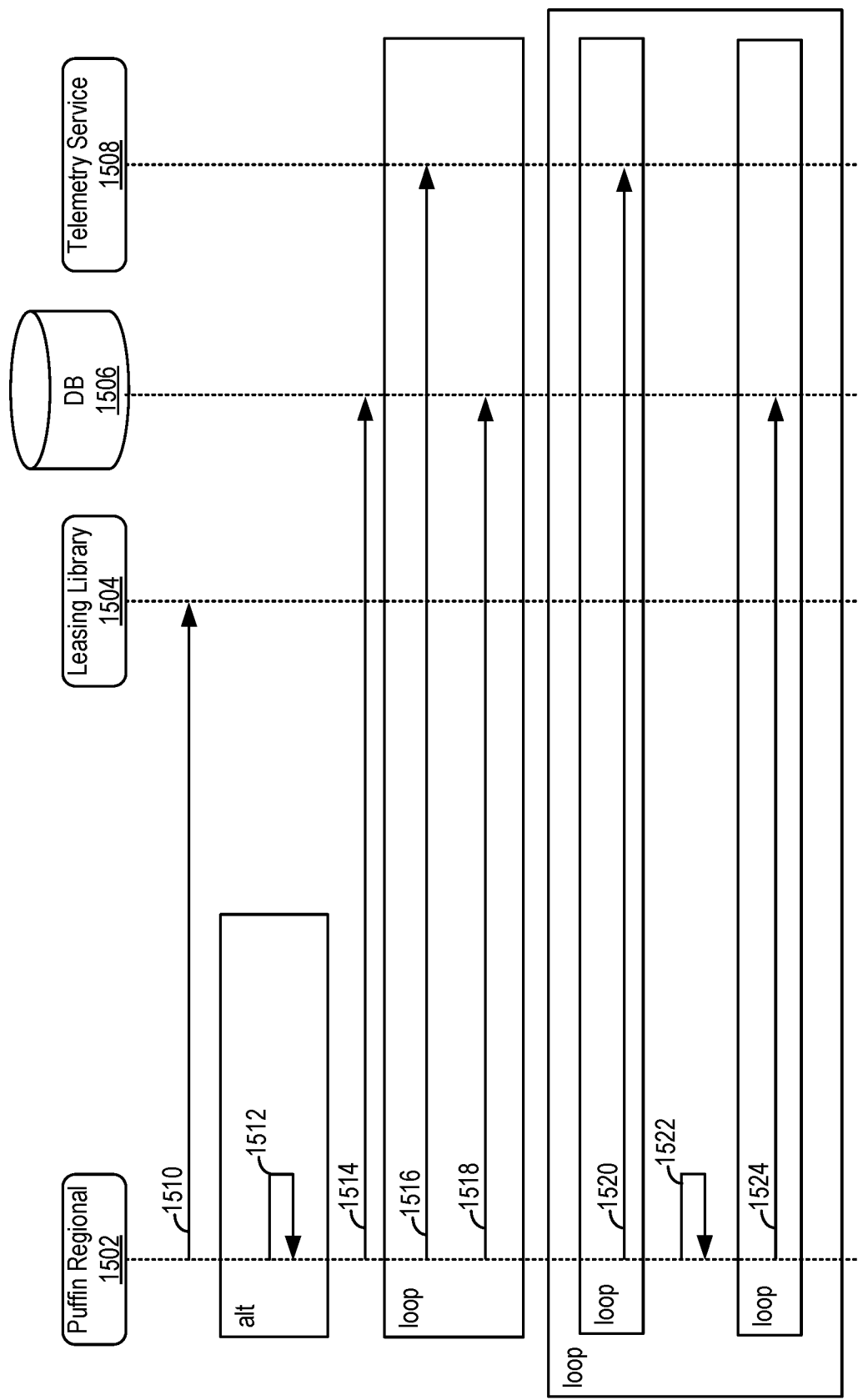
FIG. 15 is a flow diagram depicting an example method for synchronizing health data, in accordance with at least one embodiment.

FIG. 15 is a flow diagram depicting an example method for synchronizing health related data, in accordance with at least one embodiment. The method 1500 may be performed with any suitable combination of Puffin Regional 1502 (e.g., Puffin Regional 120 of FIG. 1), Leasing Library 1504 (e.g., a component of Puffin Service, the Leasing Library 1404 of FIG. 14), Database 1506 (e.g., a database accessible to Puffin Region 1502, Database 1406 of FIG. 14), and Telemetry Service 1508 (e.g., an example of alarm service(s) 122 of FIG. 1, Telemetry Service 1408 of FIG. 14). More or fewer operations may be included in method 1500 than the ones described in connection with FIG. 15. The operations of method 1500 may be performed in any suitable order. In some embodiments, Puffin Regional 1502 may execute any suitable number of worker(s) and/or health check jobs/processes that individually may execute some or all of the operations of method 1500. In some embodiments, the operations described below with respect to Puffin Regional 1502 may be performed by a process initiated by or associated with Puffin Regional 1502. In some embodiments, Telemetry Service 1508 may maintain all alarm transition history (e.g., deltas indicating alarm transitions from OK to FIRING or vice versa). Each transition may be associated with a time or a transaction number indicating a relative point within the historical transitions associated with each alarm.

Method 1500 may begin at 1510, a process executed by Puffin Regional 1402 may request a lease from leasing library 1504 (e.g., via a lease request). In some embodiments, leasing library 1504 may be a component of Puffin Regional 1502 or a separate process or service that is configured to assign a single process to a health update. In some embodiments, leasing library 1504 may maintain a record of a process that has been assigned to execute a particular health update. In some embodiments, leasing library 1504 may be configured to ensure only a single process is assigned to perform a particular health update. For each compartmentID, leasing library 1504 may return a token (e.g., continuation token of health check data structure 414 of FIG. 4) that indicates a time or alarm transaction identifier that indicates the last alarm transaction received from the Telemetry Service 1508. If no alarm data has been obtained from the Telemetry Service, the token may be defaulted to a predefined value to obtain all history, or some portion of the alarm history (e.g., alarm data corresponding to transitions occurring within the last 24 hours, 12, hours, 1 hour, 10 minutes, etc.).

The leasing library 1504 may be configured with any suitable protocol sets defining a periodicity, frequency, or schedule by which health checks are to be performed. As a non-limiting example, this protocol set may identify that Puffin Regional is to update the health states of all skills once every minute (or five minutes, 2 hours, or any suitable time period). In some embodiments, the first process which requests a lease may be assigned as the executor of that health check and leasing library 1504 may store a record indicating that the health check was requested and assigned and a time at which the health check was requested and/or assigned. If another process associated with Puffin Regional 1502 requests a lease from leasing library 1504, leasing library 1504 may check its records to identify that the current request is within a time period the last process was assigned and therefore another health check is not yet needed and the leasing library 1504 may deny the request. The leasing library 1504 may be configured to assign a new process to a health check when the first lease request is received after a predefined time period since the last health check was assigned has elapsed. In this manner, the leasing library 1504 may be utilized to ensure only one process performs the health check to avoid duplicate processing and to ensure that health checks are performed according to the predefined periodicity, frequency, and/or schedule.

If a lease cannot be acquired, the method may cease at 1512. If a lease is obtained, the method 1500 may continue to 1514.

At 1514, Puffin Regional 1402 may obtain all alarm labels (e.g., alarm label names) from database 1506. Database 1506 may be configured to store any suitable combination of the data structures of FIG. 4. By way of example, database 1506 may store each instance of the health check data structure 414 of FIG. 4. Database 1506 (or a manager of database 1506 may be configured to return Puffin Regional 1502 may submit a request (e.g., a query) for the health check data structures corresponding to skills and skill versions being utilized within the region/data center corresponding to the instant region build. Database 1506 may be configured to provide all health check data structures and/or alarm label names corresponding to each of those data structure in response to the request at 1514.

At 1516, Puffin Regional 1502 may request (e.g., from the Telemetry Service 1508) the compartment IDs corresponding to an alarm label name. Telemetry Service 1508 may be configured to maintain a mapping of compartment IDs corresponding to each alarm label name. In response to the request, Telemetry Service 1508 may respond with the compartment IDs associated with each alarm label name.

At 1518, Puffin Regional 1502 may update the compartmentID attribute corresponding to each alarm label name within each instance of health check data structure 414. The operations described at 1516 and 1518 may be repeated for each alarm label name obtained at 1514. In some embodiments, all of the alarm label names may be provided in a single request at 1516 and all corresponding compartmentIDs corresponding to those alarm label names may be provided at 1518.

At 1520, Puffin Regional 1502 may execute any suitable operations to delete any compartment ID that is not associated with the current set of alarm label names from database 1506. Through the operations performed at 1514-1520, Puffin Regional 1502 may update every health check data structure stored within database 1506 to include the current compartment IDs associated with each alarm within the given region.

In some embodiments, Puffin Regional 1502 may be configured to determine whether health state synchronization is enabled for a given skill. As a non-limiting example, Puffin Regional 1502 may identify from the installation state whether health state synchronization is enabled for a given skill. By way of example, if the installation state is set to "INSTALLING" or "EMBARGOED," Puffin Regional 1502 may be configured to identify that health state synchronization is enabled. In some embodiments, determining whether health state synchronization is enabled may depend on previously received user input and/or one or more variables indicating health state synchronization is enabled/disabled.

At 1522, Puffin Regional 1502 may request alarm status data from Telemetry Service 1508. In some embodiments, the alarm status data may be requested by compartmentID (e.g., corresponding to a particular alarm, skill, and/or a particular service). In some embodiments, a request of each compartmentID may be separately transmitted and the alarm status data for that compartmentID may be returned by the Telemetry Service 1508. In some embodiments, all of the compartmentIDs may be transmitted together and the alarm status data for those compartmentIDs may be returned. In some embodiments, At 1524, Puffin Regional 1502 may group the alarm status data based at least in part on the associated alarm labels. As a non-limiting example, the alarm status data corresponding to alarms corresponding to the same skill may be grouped.

At 1526, Puffin Regional 1502 may calculate and store an updated health state for each skill (e.g., via the healthState attribute of skill version data structure 412 of FIG. 4). As a non-limiting example, Puffin Regional 1502 may be configured to identify a skill as being healthy if the skill is not associated with any alarm that is firing. A skill may be identified as unhealthy if it is associated with one or more firing alarms. A skill may be identified as having an unknown health state if it does not map to any alarm label name provided by Telemetry Service 1508.

As described above, Puffin Regional 1502 may perform method 1500 any suitable number of times, at any suitable periodicity, frequency, or according to a predefined schedule to synchronize health related data over time. In some embodiments, method 1500 may be executed less frequently than the method 1400 described above in connection with FIG. 14. By way of example, method 1400 may be executed every minute while method 1500 is executed every six hours. It should be appreciated that, at any suitable time, an API exposed by Puffin Regional may be utilized to update a skill health state without waiting for the methods 1400 and/or 1500 to be executed.

Figure 16:
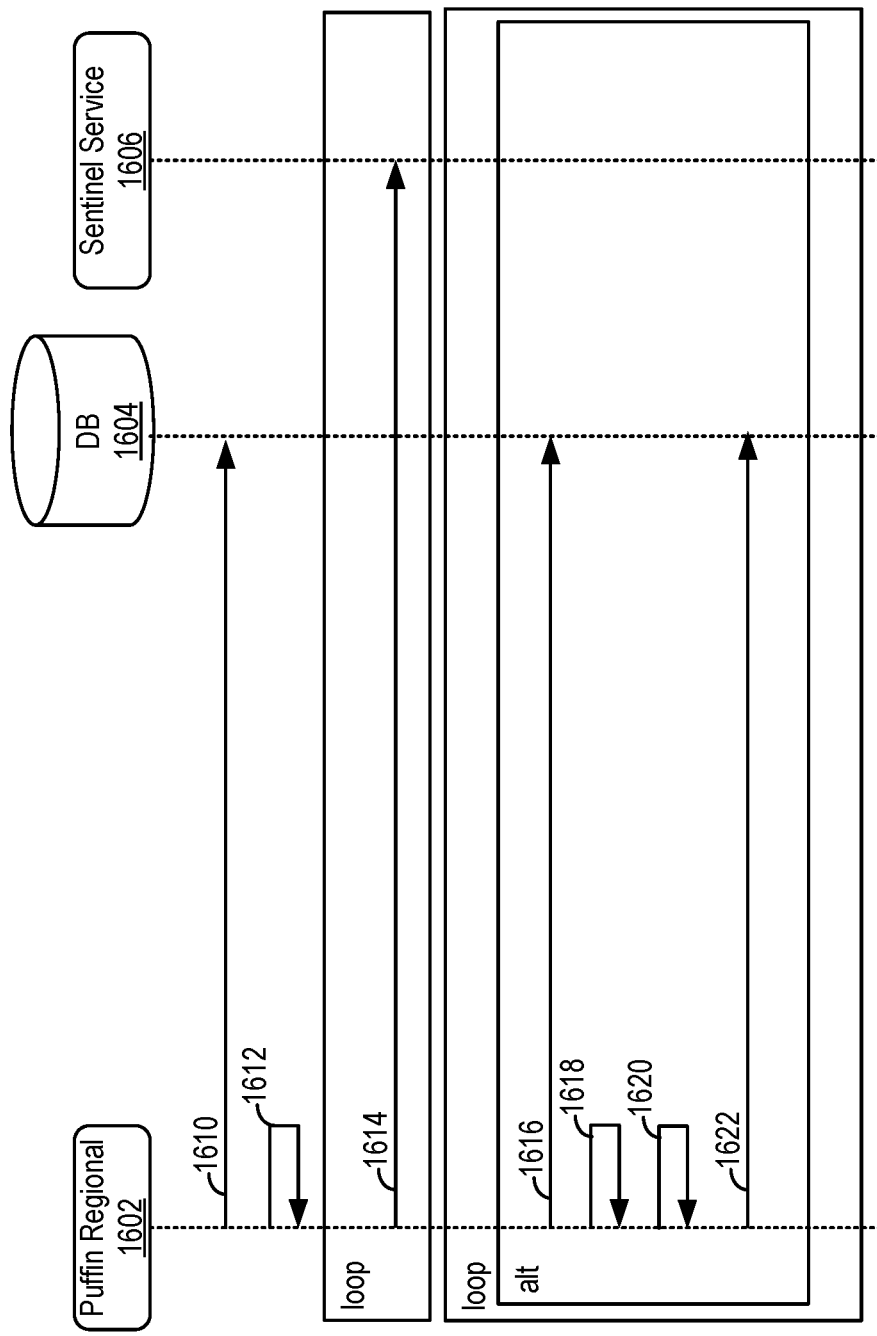
FIG. 16 is a flow diagram depicting another example method for tracking skill health using a sentinel service, in accordance with at least one embodiment.

FIG. 16 is a flow diagram depicting another example method 1600 for tracking skill health using a sentinel service, in accordance with at least one embodiment. The method 1600 may be performed with any suitable combination of Puffin Regional 1602 (e.g., Puffin Regional 120 of FIG. 1), Database 1604 (e.g., a database accessible to Puffin Region 1602, Database 1506 of FIG. 15, Database 312 of FIG. 3, etc.), and Sentinel Service 1606 (e.g., an example of alarm service(s) 122 of FIG. 1). More or fewer operations may be included in method 1600 than the ones described in connection with FIG. 16. The operations of method 1600 may be performed in any suitable order. In some embodiments, Puffin Regional 1602 may execute any suitable number of worker(s) and/or health check jobs/processes that individually may execute some or all of the operations of method 1600. In some embodiments, the operations described below with respect to Puffin Regional 1602 may be performed by a process initiated by or associated with Puffin Regional 1602. In some embodiments, Sentinel Service 1606 may maintain binary values indicating whether a skill is healthy or unhealthy. These binary values may be published by the service during execution of a service build.

The method 1600 may begin at 1610, where Puffin Regional 1602 (e.g., a health check process initiated/executed by Puffin Regional 1602) may request health data corresponding to every active skill version (e.g., for all skills/skill versions associated with a given region build). In some embodiments, Database 1604 may store any suitable combinations of the data structures of FIG. 4. The skill and/or skill version data structures corresponding to all active skills may be used to obtain the health data for every health check data structure corresponding to a given skill version.

At 1612, Puffin Region 1602 may generate a list of sentinel namespaces from the health data obtained at 1610 based at least in part on aggregating the namespaceIDs of the health data obtained from each health check data structure corresponding to each active skill version. In some embodiments, the sentinel namespace list may be deduplicated such that only one instance of a given sentinel namespace occurs in the list.

At 1614, Puffin Regional 1602 may request a datagram from Sentinel Service 1606 for every sentinel namespace identified in the list generated at 1612.

At 1616, Puffin Regional 1602 may update the healthState of the skill version data structure of a skill to unknown for all skill version data structures that are not associated (e.g., via one or more corresponding health check data structures) with any sentinel namespaces.

At 1618, Puffin Regional 1602 may build a map of datagram values for namespaces corresponding to the instance(s) of health check data structure corresponding to a particular skill version.

At 1620, Puffin Regional 1602 may evaluate the map based at least in part on a predefined protocol set to identify a health state for the skill (e.g., the skill corresponding to that skill version).

At 1622, Puffin Regional 1602 may transmit data to database 1604 to update the healthState of the skill version data structure corresponding to the health state identified at 1620 and corresponding to the active skill for which the sentinel namespaces were evaluated.

In some embodiments, Puffin Regional 1602 may utilize any suitable combination of the methods 1400-1600, together, or separately to update health states of various skills at any suitable time. In some embodiments, methods 1400 and 1500 may be utilized when a corresponding Telemetry Service is available. In some embodiments, Puffin Regional 1602 may be configured to transition to utilizing method 1600 if and when it determined that the Telemetry Service is unavailable. Method 1600 may be utilized in some embodiments, for as long as the Telemetry Service is unavailable. Subsequently, if and when the Telemetry Service becomes available again, Puffin Regional 1602 may be configured to transition back to utilizing methods 1400 and 1500 in lieu of method 1600. Transitioning between methods 1400/1500 and 1600 may occur any suitable number of times.

Figure 17:
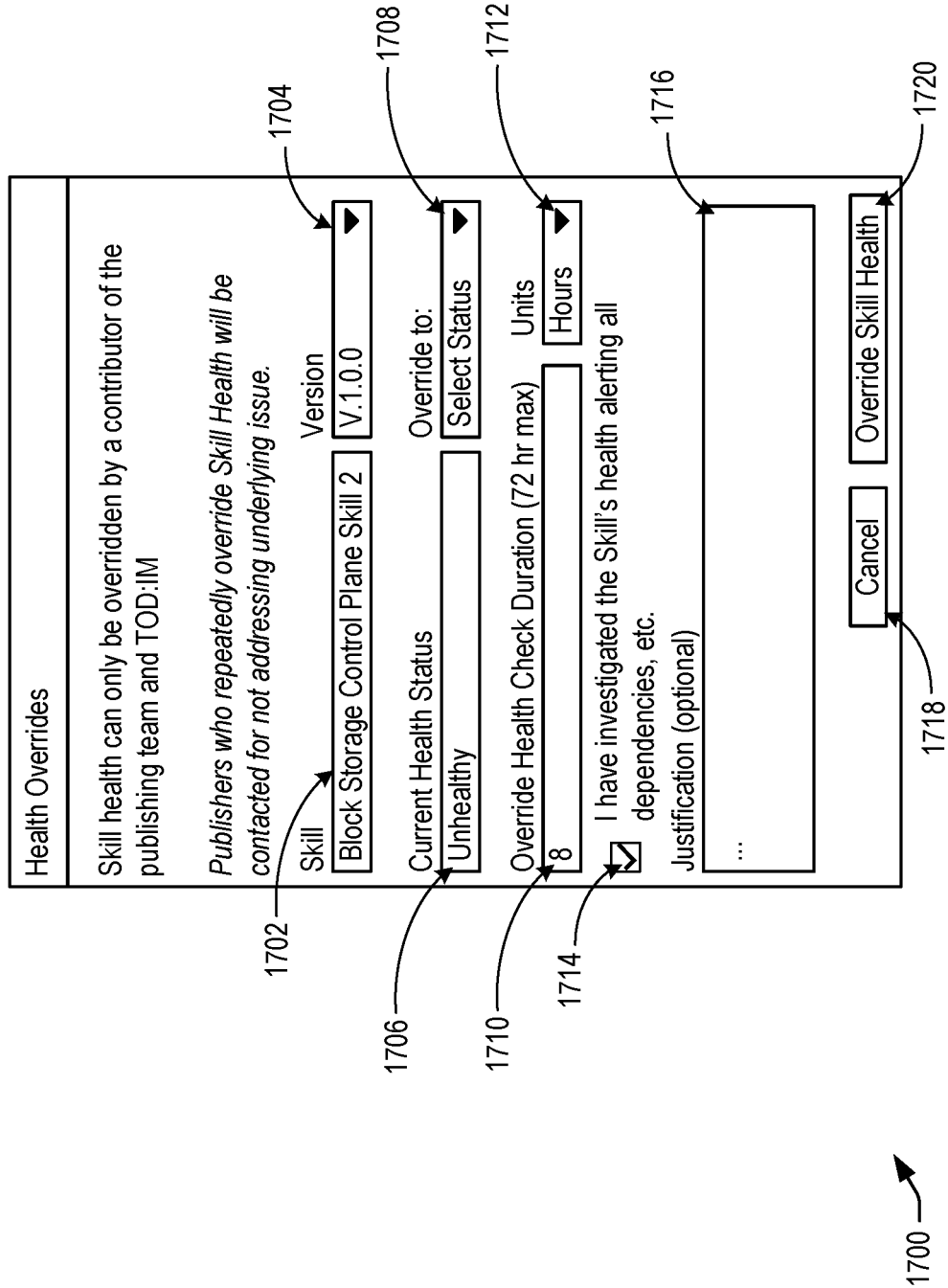
FIG. 17 is a schematic depicting an example user interface for overriding skill health, in accordance with at least one embodiment.

FIG. 17 is a schematic depicting an example user interface 1700 for overriding skill health, in accordance with at least one embodiment. In some embodiments, user interface 1700 may be presented based at least in part on selecting user interface element 640 of FIG. 6 (accessible from the actions drop-down menu depicted in FIG. 6). User interface 1700 may be presented as a pop-up window, as part of the user interface 600 of FIG. 6, and/or as a separate user interface altogether.

User interface 1700 may include user interface elements 1702 and 1704 which may be utilized to enter a skill name and skill version, respectively. In some embodiments, the elements may be any suitable user interface elements such as an edit box, a check box, a drop-down menu, etc., or any suitable element with which a skill name and a skill version may be provided as input or selected. In some embodiments, the values provided within user interface elements 1702 and 1704 may correspond to the corresponding values selected via user interface 600 (e.g., the skill name and skill version presented at the user interface from which the user interface element 640 was selected).

User interface 1700 may include user interface element 1706 which may be configured to present a current health status of the skill corresponding to the skill name and skill version selected via user interface elements 1702 and 1704. In some embodiments, the current health status presented may correspond to the healthState attribute of the skill version data structure 412 of FIG. 4.

As depicted, user interface 1700 may include an override option 1708. In some embodiments, the override option 1708 may be a drop-down menu from which a number of override values may be selected. The override option 1708 may be used to override the current health state of the skill with a health state selected via override option 1708. By way of example, health states of healthy, unhealthy, or unknown, or the like may be selected via override option 1708. In the example depicted, since the current health status is "unhealthy" the override option 1708 may provide "healthy" and "unknown" as options (e.g., excluding the health state corresponding to the current health state of the skill).

In some embodiments, user interface 1700 includes user interface element 1710 which may be utilized to provide user input indicating a duration for which the override value corresponding to override option 1708 is to be applied. User interface element 1712 may be used to indicate a unit of time measurement (e.g., hours, minutes, days, weeks, etc.) for the numerical input provided via user interface element 1710.

In some embodiments, the user interface 1700 may include user interface element 1714 that, among other things, may be used to indicate the user has investigated other causes for the current health status of the skill. In some embodiments, selecting (e.g., checking) user interface element 1714 may be required to submit the input provided via any suitable combination of user interface elements 1702-1712. As a non-limiting example, selecting user interface element 1714 may be required for the button 1720 to be enabled, when button 1720 is configured to indicate submission of the input provided via the user interface elements of FIG. 17.

In some embodiments, user interface 1700 may include text box 1716 which may be configured to receive user input indicating a justification/reason for the override. In some embodiments, text box 1716 may be optional. User interface 1700 may include button 1718. Selecting button 1718 may cause the input within the user interface elements of FIG. 17 to be discarded and the user interface 1700 to be removed/discarded. As a non-limiting example, selecting button 1718 may cause user interface 600 from which navigation to the user interface 1700 was initiated, to be presented once again. As discussed above, button 1720 may be used to indicate a submission of the input via the user interface elements of FIG. 17. In some embodiments, selecting the button 1720 may cause the override defined by the user interface elements 1708-1712 to be applied to the skill and skill version identified via user interface elements 1702 and 1704, respectively.

Once applied, the override value may be presented via the user interface 600 with an indication that the value is user-selected (an override, rather than a health status assessed by the system in the manner discussed above in connection with FIGS. 14-16. By way of example, user interface element 606 may be updated to indicate a state of "Healthy-Override" based on input provided via the user interface 1700. When the time period identified with user interface elements 1710 and 1712 elapses, the Puffin Service may be configured to update the health state of the skill (of the version selected via user interface element 1704) to a health state based at least in part on the methods 1400-1600 discussed above. In some embodiments, when the time period elapses, the Puffin Service may initiate an update of the skill's health state automatically without waiting for the next execution of the methods 1400-1600.

Figure 18:
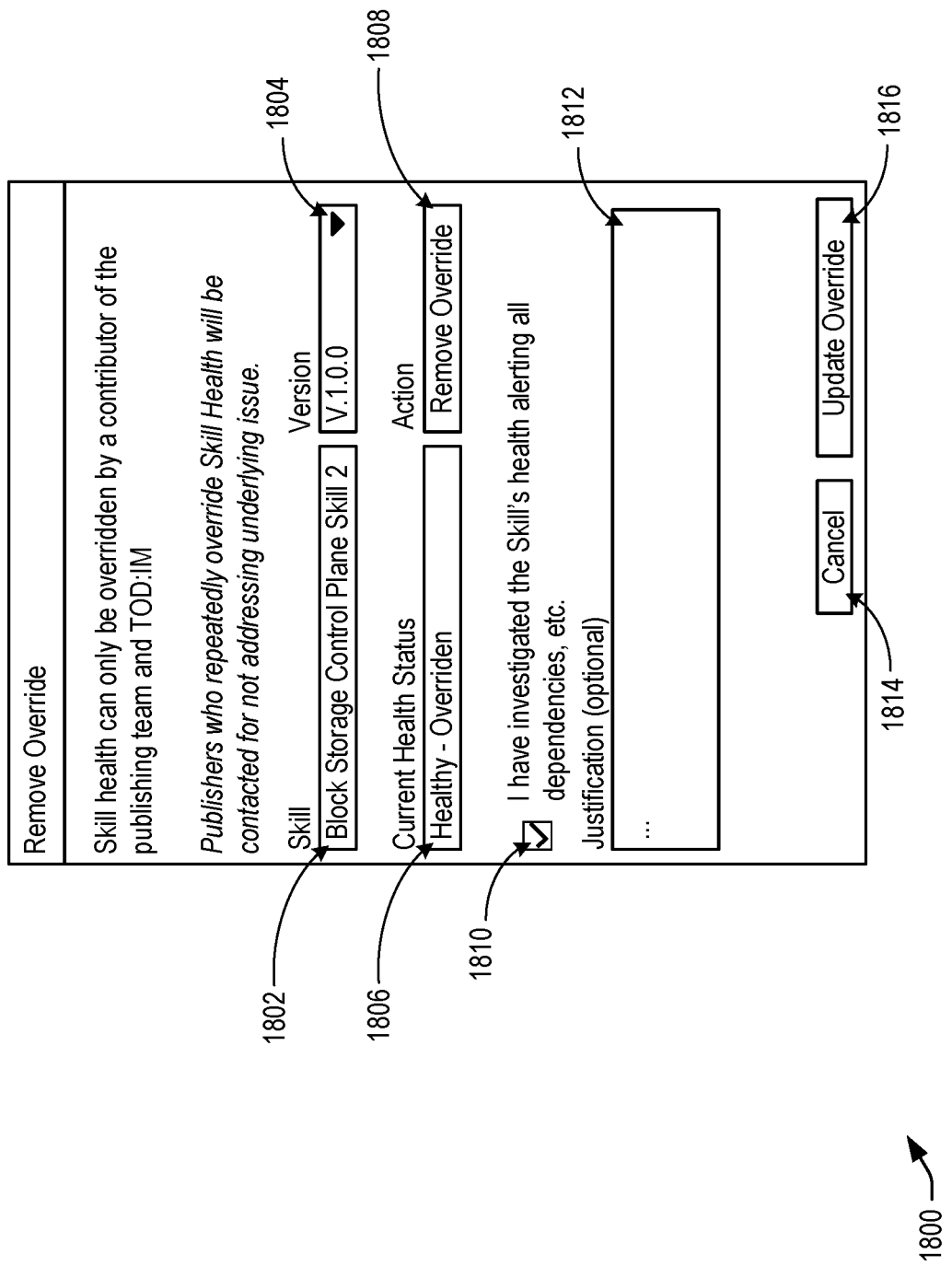
FIG. 18 is a schematic depicting an example user interface for removing a skill health override, in accordance with at least one embodiment.

FIG. 18 is a schematic depicting an example user interface 1800 for removing a skill health override, in accordance with at least one embodiment. In some embodiments, when the health state of a skill of a particular skill version has been overridden, the user may select an option (e.g., the user interface element 606 of FIG. 6, presenting "Healthy-Override" to navigate to the user interface 1800. As another example, an option may be presented via any suitable portion of user interface 600, user interface 1000, user interface 1100, etc., that, if selected, causes the user interface 1800 to be presented (e.g., as a pop-up, a separate interface window, within the user interface from which user interface 1800 was initiated, etc.). As a non-limiting example, selecting user interface 1020 of FIG. 10 may cause user interface 1800 to be presented.

User interface 1800 may include user interface elements 1802 and 1804 which may be utilized to enter a skill name and skill version, respectively. In some embodiments, the elements may be any suitable user interface elements such as an edit box, a check box, a drop-down menu, etc., or any suitable element with which a skill name and a skill version may be provided as input or selected. In some embodiments, the values provided within user interface elements 1802 and 1804 may correspond to the corresponding values selected via user interface 600 (e.g., the skill name and skill version presented at the user interface from which the user interface 1800 was initiated).

User interface 1800 may include user interface element 1806 which may be configured to present a current health status (e.g., "Healthy-Override") of the skill corresponding to the skill name and skill version selected via user interface elements 1802 and 1804. In some embodiments, the override value may be stored (e.g., based at least in part on the user input provided via user interface 1700) within the healthStateOverride attribute of skill version data structure 412 of FIG. 4.

User interface element 1808 may present an action indicating a removal of the override. User interface elements 1810 and 1812 may be similar to the user interface element 1714 and text box 1716, respectively, and may be used in a similar manner. Selecting button 1814 may cause the input within the user interface elements of FIG. 18 to be discarded and the user interface 1800 to be removed/discarded. As a non-limiting example, selecting button 1814 may cause user interface 600 from which navigation to the user interface 1800 was initiated, to be presented once again. Button 1816 may be used to indicate a submission of the input via the user interface elements of FIG. 18. In some embodiments, selecting the button 1816 may cause the override value indicated with user interface element 1806 to be deleted/removed and the healthState of the skill/skill version identified via user interface elements 1802 and 1804 to be updated by the system in the manner described in connection with FIGS. 14-16. The healthState update by the system (e.g., by Puffin Service) may occur upon the next execution of methods 1400-1600 (e.g., according to a predefined periodicity and/or schedule) or the update may be triggered by the system based at least in part on selection of the button 1816.

Figure 19:
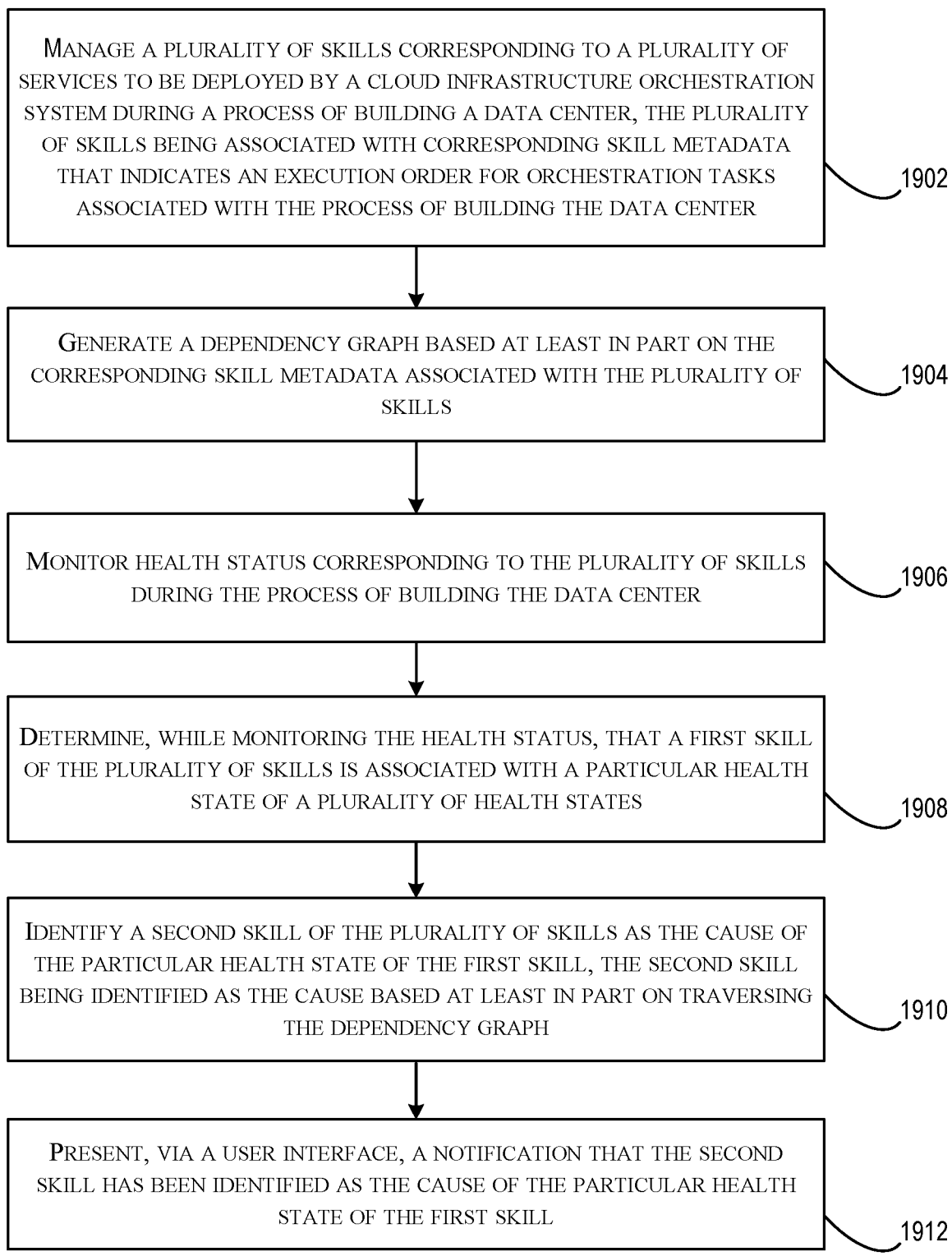
FIG. 19 is a block diagram depicting an example method for tracking skill health, in accordance with at least one embodiment.

FIG. 19 is a block diagram depicting an example method 1900 for tracking skill health, in accordance with at least one embodiment. The operations of method 1900 may be performed in any suitable order by any suitable combination of components of CIOS 102 of FIG. 1. By way of example only, method 1900 may be performed by the Puffin Service comprising Puffin Regional 120 of FIG. 1 and Puffin Central 118 of FIG. 1. It is contemplated that method 1900 may include more or fewer operations than the number shown in FIG. 19.

The method 1900 may begin at 1902, where a plurality of skills corresponding to a plurality of services may be managed (e.g., by Puffin Central 118). In some embodiments, the plurality of services may be ones that are to be deployed by a cloud infrastructure orchestration system during a process of building a data center. In some embodiments, the plurality of skills may be associated with corresponding skill metadata (e.g., skill metadata 404 of FIG. 4) that indicates an execution order for orchestration tasks associated with the process of building the data center. By way of example, the dependencies (upstream dependencies, consumers, etc.) defined by the associations between data structures corresponding to one skill and data structures corresponding to another skill may be processed by the system (e.g., by Puffin Central 118, by Orchestrator 106 of FIG. 1, etc.).

At 1904, a dependency graph may be generated (e.g., by Puffin Central 118, by Orchestrator 106, etc.) based at least in part on the corresponding skill metadata associated with the plurality of skills. An example of the dependency graph may include Build Dependency Graph 338 of FIG. 3. Portions of this graph are depicted in connection with FIGS. 6 and 8.

At 1906, health status corresponding to the plurality of skills may be monitored during the process of building the data center. The methods 1400, 1500, and 1600 of FIGS. 14-16 are some example methods by which the health status of a skill may be monitored.

At 1908, while monitoring the health status, it may be determined (e.g., by Puffin Central 118, Puffin Regional 120, etc.) that a first skill of the plurality of skills is associated with a particular health state of a plurality of health states. By way of example, the first skill may be identified as being in an unhealthy state.

At 1910, a second skill of the plurality of skills may be identified (e.g., by Puffin Central 118) as the cause of the particular health state of the first skill. In some embodiments, the second skill may be identified as the cause based at least in part on traversing the dependency graph. As discussed above, a traversal of the dependency graph may be initiated from a node corresponding to the first skill. The dependency graph may be traversed upward (e.g., backwards, in a reverse order from the order in which execution was occurring, in a reverse order from which traversal of the dependency graph was occurring to drive the order of operations of building the data center, etc.) to identify a highest node (furthest back node in the execution order) that is identified as being unhealthy. This highest node (e.g., the IDDP Skill 1 v.1.0.1 identified in FIG. 6 and again in FIG. 8) may be identified by the system (e.g., by Puffin Central 118, by Orchestrator 106) as the root cause of the particular health state of the first skill.

At 1912, a notification that the second skill has been identified as the cause of the particular health state of the first skill may be presented via a user interface (e.g., user interface 600 of FIG. 6, user interface 800 of FIG. 8). The data discussed above as being part of the contributing cause analysis data may be one example of a notification, although others are contemplated.

In some embodiments, the process for building the data center may be paused (e.g., by the Orchestrator 106 based on the particular health state of the skill, by user input, based on receiving an indication from the Puffin Service that the skill is unhealthy, or the like) while a resolution is identified. In some embodiments, the user interface elements with area 622 may be used, or the system may identify a contact (e.g., from skill metadata data structure 416 such as an email address or phone number), and a communication may be sent (e.g., a user-initiated communication, a system-initiated communication) to cause an entity (e.g., a service team member corresponding to the service that owns the skill that was identified as the root cause of the particular health state of the first skill) to report to troubleshoot the issue.

At any suitable time, the health of the first skill may be overridden (e.g., utilizing the user interface 1700 of FIG. 17). By way of example, if the first skill is unhealthy, the health state may be overridden to a "healthy" state. In some embodiments, the override (e.g., by Puffin Central 118 and/or Orchestrator 106) may cause the Orchestrator 106 to resume traversal of the dependency graph to continue with executing the operations associated with building the data center. The Orchestrator 106 may attempt to proceed with the process until such time as another unhealthy skill is identified. In some embodiments, the Puffin Service may utilize a number of criteria in addition to the health state of a skill to identify whether or not to pause a region build (e.g., the process for building a data center currently being orchestrated by the Orchestrator 106 and tracked by Puffin Service). By way of example, a number of consumers and/or dependencies associated with a given unhealthy skill (or consumers/dependencies of the skill identified as being the root cause). While a skill with a large number of consumers may cause the region build to be paused, a skill with no, or fewer consumers, may not cause the region build to be paused. Puffin Central may be configured to execute a predefined rule set that indicates particular criteria (e.g., particular values, ranges, etc.) corresponding to skill metadata values that, when identified, result in a particular corresponding action (e.g., send instructions to the Orchestrator 106 to pause region build, send instructions to the Orchestrator 106 to resume the region build, automatically override the health state to a particular override value for a predefined period of time, etc.). Puffin Central may maintain a record or mapping between particular skill metadata values and corresponding actions to be taken and may execute various actions based at least in part on matching the current skill metadata values associated with a skill to the mapping and identifying the corresponding action associated with those values.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 20 is a block diagram 2000 illustrating an example pattern of an IaaS architecture, according to at least one embodiment. Service operators 2002 can be communicatively coupled to a secure host tenancy 2004 that can include a virtual cloud network (VCN) 2006 and a secure host subnet 2008. In some examples, the service operators 2002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2006 and/or the Internet.

The VCN 2006 can include a local peering gateway (LPG) 2010 that can be communicatively coupled to a secure shell (SSH) VCN 2012 via an LPG 2010 contained in the SSH VCN 2012. The SSH VCN 2012 can include an SSH subnet 2014, and the SSH VCN 2012 can be communicatively coupled to a control plane VCN 2016 via the LPG 2010 contained in the control plane VCN 2016. Also, the SSH VCN 2012 can be communicatively coupled to a data plane VCN 2018 via an LPG 2010. The control plane VCN 2016 and the data plane VCN 2018 can be contained in a service tenancy 2019 that can be owned and/or operated by the IaaS provider.

The control plane VCN 2016 can include a control plane demilitarized zone (DMZ) tier 2020 that acts as a perimeter network (e.g., portions of a corporate network between the corporate intranet and external networks). The DMZ-based servers may have restricted responsibilities and help keep breaches contained. Additionally, the DMZ tier 2020 can include one or more load balancer (LB) subnet(s) 2022, a control plane app tier 2024 that can include app subnet(s) 2026, a control plane data tier 2028 that can include database (DB) subnet(s) 2030 (e.g., frontend DB subnet(s) and/or backend DB subnet(s)). The LB subnet(s) 2022 contained in the control plane DMZ tier 2020 can be communicatively coupled to the app subnet(s) 2026 contained in the control plane app tier 2024 and an Internet gateway 2034 that can be contained in the control plane VCN 2016, and the app subnet(s) 2026 can be communicatively coupled to the DB subnet(s) 2030 contained in the control plane data tier 2028 and a service gateway 2036 and a network address translation (NAT) gateway 2038. The control plane VCN 2016 can include the service gateway 2036 and the NAT gateway 2038.

The control plane VCN 2016 can include a data plane mirror app tier 2040 that can include app subnet(s) 2026. The app subnet(s) 2026 contained in the data plane mirror app tier 2040 can include a virtual network interface controller (VNIC) 2042 that can execute a compute instance 2044. The compute instance 2044 can communicatively couple the app subnet(s) 2026 of the data plane mirror app tier 2040 to app subnet(s) 2026 that can be contained in a data plane app tier 2046.

The data plane VCN 2018 can include the data plane app tier 2046, a data plane DMZ tier 2048, and a data plane data tier 2050. The data plane DMZ tier 2048 can include LB subnet(s) 2022 that can be communicatively coupled to the app subnet(s) 2026 of the data plane app tier 2046 and the Internet gateway 2034 of the data plane VCN 2018. The app subnet(s) 2026 can be communicatively coupled to the service gateway 2036 of the data plane VCN 2018 and the NAT gateway 2038 of the data plane VCN 2018. The data plane data tier 2050 can also include the DB subnet(s) 2030 that can be communicatively coupled to the app subnet(s) 2026 of the data plane app tier 2046.

The Internet gateway 2034 of the control plane VCN 2016 and of the data plane VCN 2018 can be communicatively coupled to a metadata management service 2052 that can be communicatively coupled to public Internet 2054. Public Internet 2054 can be communicatively coupled to the NAT gateway 2038 of the control plane VCN 2016 and of the data plane VCN 2018. The service gateway 2036 of the control plane VCN 2016 and of the data plane VCN 2018 can be communicatively couple to cloud services 2056.

In some examples, the service gateway 2036 of the control plane VCN 2016 or of the data plane VCN 2018 can make application programming interface (API) calls to cloud services 2056 without going through public Internet 2054. The API calls to cloud services 2056 from the service gateway 2036 can be one-way: the service gateway 2036 can make API calls to cloud services 2056, and cloud services 2056 can send requested data to the service gateway 2036. But, cloud services 2056 may not initiate API calls to the service gateway 2036.

In some examples, the secure host tenancy 2004 can be directly connected to the service tenancy 2019, which may be otherwise isolated. The secure host subnet 2008 can communicate with the SSH subnet 2014 through an LPG 2010 that may enable two-way communication over an otherwise isolated system. Connecting the secure host subnet 2008 to the SSH subnet 2014 may give the secure host subnet 2008 access to other entities within the service tenancy 2019.

The control plane VCN 2016 may allow users of the service tenancy 2019 to set up or otherwise provision desired resources. Desired resources provisioned in the control plane VCN 2016 may be deployed or otherwise used in the data plane VCN 2018. In some examples, the control plane VCN 2016 can be isolated from the data plane VCN 2018, and the data plane mirror app tier 2040 of the control plane VCN 2016 can communicate with the data plane app tier 2046 of the data plane VCN 2018 via VNICs 2042 that can be contained in the data plane mirror app tier 2040 and the data plane app tier 2046.

In some examples, users of the system, or customers, can make requests, for example create, read, update, or delete (CRUD) operations, through public Internet 2054 that can communicate the requests to the metadata management service 2052. The metadata management service 2052 can communicate the request to the control plane VCN 2016 through the Internet gateway 2034. The request can be received by the LB subnet(s) 2022 contained in the control plane DMZ tier 2020. The LB subnet(s) 2022 may determine that the request is valid, and in response to this determination, the LB subnet(s) 2022 can transmit the request to app subnet(s) 2026 contained in the control plane app tier 2024. If the request is validated and requires a call to public Internet 2054, the call to public Internet 2054 may be transmitted to the NAT gateway 2038 that can make the call to public Internet 2054. Metadata that may be desired to be stored by the request can be stored in the DB subnet(s) 2030.

In some examples, the data plane mirror app tier 2040 can facilitate direct communication between the control plane VCN 2016 and the data plane VCN 2018. For example, changes, updates, or other suitable modifications to configuration may be desired to be applied to the resources contained in the data plane VCN 2018. Via a VNIC 2042, the control plane VCN 2016 can directly communicate with, and can thereby execute the changes, updates, or other suitable modifications to configuration to, resources contained in the data plane VCN 2018.

In some embodiments, the control plane VCN 2016 and the data plane VCN 2018 can be contained in the service tenancy 2019. In this case, the user, or the customer, of the system may not own or operate either the control plane VCN 2016 or the data plane VCN 2018. Instead, the IaaS provider may own or operate the control plane VCN 2016 and the data plane VCN 2018, both of which may be contained in the service tenancy 2019. This embodiment can enable isolation of networks that may prevent users or customers from interacting with other users', or other customers', resources. Also, this embodiment may allow users or customers of the system to store databases privately without needing to rely on public Internet 2054, which may not have a desired level of threat prevention, for storage.

In other embodiments, the LB subnet(s) 2022 contained in the control plane VCN 2016 can be configured to receive a signal from the service gateway 2036. In this embodiment, the control plane VCN 2016 and the data plane VCN 2018 may be configured to be called by a customer of the IaaS provider without calling public Internet 2054. Customers of the IaaS provider may desire this embodiment since database(s) that the customers use may be controlled by the IaaS provider and may be stored on the service tenancy 2019, which may be isolated from public Internet 2054.

Figure 21:
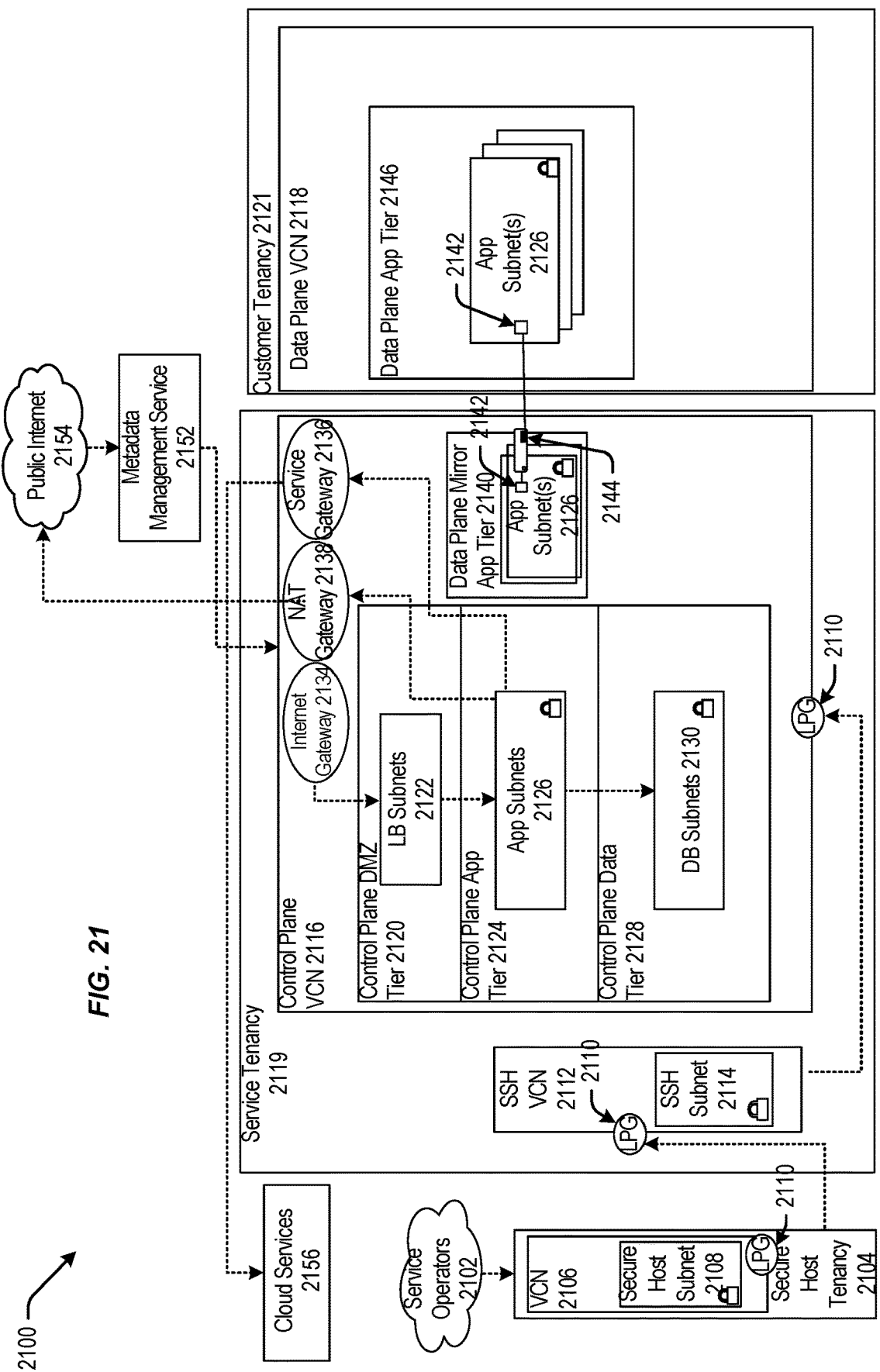
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g., service operators 2002 of FIG. 20) can be communicatively coupled to a secure host tenancy 2104 (e.g., the secure host tenancy 2004 of FIG. 20) that can include a virtual cloud network (VCN) 2106 (e.g., the VCN 2006 of FIG. 20) and a secure host subnet 2108 (e.g., the secure host subnet 2008 of FIG. 20). The VCN 2106 can include a local peering gateway (LPG) 2110 (e.g., the LPG 2010 of FIG. 20) that can be communicatively coupled to a secure shell (SSH) VCN 2112 (e.g., the SSH VCN 2012 of FIG. 20) via an LPG 2010 contained in the SSH VCN 2112. The SSH VCN 2112 can include an SSH subnet 2114 (e.g., the SSH subnet 2014 of FIG. 20), and the SSH VCN 2112 can be communicatively coupled to a control plane VCN 2116 (e.g., the control plane VCN 2016 of FIG. 20) via an LPG 2110 contained in the control plane VCN 2116. The control plane VCN 2116 can be contained in a service tenancy 2119 (e.g., the service tenancy 2019 of FIG. 20), and the data plane VCN 2118 (e.g., the data plane VCN 2018 of FIG. 20) can be contained in a customer tenancy 2121 that may be owned or operated by users, or customers, of the system.

The control plane VCN 2116 can include a control plane DMZ tier 2120 (e.g., the control plane DMZ tier 2020 of FIG. 20) that can include LB subnet(s) 2122 (e.g., LB subnet(s) 2022 of FIG. 20), a control plane app tier 2124 (e.g., the control plane app tier 2024 of FIG. 20) that can include app subnet(s) 2126 (e.g., app subnet(s) 2026 of FIG. 20), a control plane data tier 2128 (e.g., the control plane data tier 2028 of FIG. 20) that can include database (DB) subnet(s) 2130 (e.g., similar to DB subnet(s) 2030 of FIG. 20). The LB subnet(s) 2122 contained in the control plane DMZ tier 2120 can be communicatively coupled to the app subnet(s) 2126 contained in the control plane app tier 2124 and an Internet gateway 2134 (e.g., the Internet gateway 2034 of FIG. 20) that can be contained in the control plane VCN 2116, and the app subnet(s) 2126 can be communicatively coupled to the DB subnet(s) 2130 contained in the control plane data tier 2128 and a service gateway 2136 (e.g., the service gateway 2036 of FIG. 20) and a network address translation (NAT) gateway 2138 (e.g., the NAT gateway 2038 of FIG. 20). The control plane VCN 2116 can include the service gateway 2136 and the NAT gateway 2138.

The control plane VCN 2116 can include a data plane mirror app tier 2140 (e.g., the data plane mirror app tier 2040 of FIG. 20) that can include app subnet(s) 2126. The app subnet(s) 2126 contained in the data plane mirror app tier 2140 can include a virtual network interface controller (VNIC) 2142 (e.g., the VNIC of 2042) that can execute a compute instance 2144 (e.g., similar to the compute instance 2044 of FIG. 20). The compute instance 2144 can facilitate communication between the app subnet(s) 2126 of the data plane mirror app tier 2140 and the app subnet(s) 2126 that can be contained in a data plane app tier 2146 (e.g., the data plane app tier 2046 of FIG. 20) via the VNIC 2142 contained in the data plane mirror app tier 2140 and the VNIC 2142 contained in the data plane app tier 2146.

The Internet gateway 2134 contained in the control plane VCN 2116 can be communicatively coupled to a metadata management service 2152 (e.g., the metadata management service 2052 of FIG. 20) that can be communicatively coupled to public Internet 2154 (e.g., public Internet 2054 of FIG. 20). Public Internet 2154 can be communicatively coupled to the NAT gateway 2138 contained in the control plane VCN 2116. The service gateway 2136 contained in the control plane VCN 2116 can be communicatively couple to cloud services 2156 (e.g., cloud services 2056 of FIG. 20).

In some examples, the data plane VCN 2118 can be contained in the customer tenancy 2121. In this case, the IaaS provider may provide the control plane VCN 2116 for each customer, and the IaaS provider may, for each customer, set up a unique compute instance 2144 that is contained in the service tenancy 2119. Each compute instance 2144 may allow communication between the control plane VCN 2116, contained in the service tenancy 2119, and the data plane VCN 2118 that is contained in the customer tenancy 2121. The compute instance 2144 may allow resources, that are provisioned in the control plane VCN 2116 that is contained in the service tenancy 2119, to be deployed or otherwise used in the data plane VCN 2118 that is contained in the customer tenancy 2121.

In other examples, the customer of the IaaS provider may have databases that live in the customer tenancy 2121. In this example, the control plane VCN 2116 can include the data plane mirror app tier 2140 that can include app subnet(s) 2126. The data plane mirror app tier 2140 can reside in the data plane VCN 2118, but the data plane mirror app tier 2140 may not live in the data plane VCN 2118. That is, the data plane mirror app tier 2140 may have access to the customer tenancy 2121, but the data plane mirror app tier 2140 may not exist in the data plane VCN 2118 or be owned or operated by the customer of the IaaS provider. The data plane mirror app tier 2140 may be configured to make calls to the data plane VCN 2118 but may not be configured to make calls to any entity contained in the control plane VCN 2116. The customer may desire to deploy or otherwise use resources in the data plane VCN 2118 that are provisioned in the control plane VCN 2116, and the data plane mirror app tier 2140 can facilitate the desired deployment, or other usage of resources, of the customer.

In some embodiments, the customer of the IaaS provider can apply filters to the data plane VCN 2118. In this embodiment, the customer can determine what the data plane VCN 2118 can access, and the customer may restrict access to public Internet 2154 from the data plane VCN 2118. The IaaS provider may not be able to apply filters or otherwise control access of the data plane VCN 2118 to any outside networks or databases. Applying filters and controls by the customer onto the data plane VCN 2118, contained in the customer tenancy 2121, can help isolate the data plane VCN 2118 from other customers and from public Internet 2154.

In some embodiments, cloud services 2156 can be called by the service gateway 2136 to access services that may not exist on public Internet 2154, on the control plane VCN 2116, or on the data plane VCN 2118. The connection between cloud services 2156 and the control plane VCN 2116 or the data plane VCN 2118 may not be live or continuous. Cloud services 2156 may exist on a different network owned or operated by the IaaS provider. Cloud services 2156 may be configured to receive calls from the service gateway 2136 and may be configured to not receive calls from public Internet 2154. Some cloud services 2156 may be isolated from other cloud services 2156, and the control plane VCN 2116 may be isolated from cloud services 2156 that may not be in the same region as the control plane VCN 2116. For example, the control plane VCN 2116 may be located in "Region 1," and cloud service "Deployment 20," may be located in Region 1 and in "Region 2." If a call to Deployment 20 is made by the service gateway 2136 contained in the control plane VCN 2116 located in Region 1, the call may be transmitted to Deployment 20 in Region 1. In this example, the control plane VCN 2116, or Deployment 20 in Region 1, may not be communicatively coupled to, or otherwise in communication with, Deployment 20 in Region 2.

Figure 22:
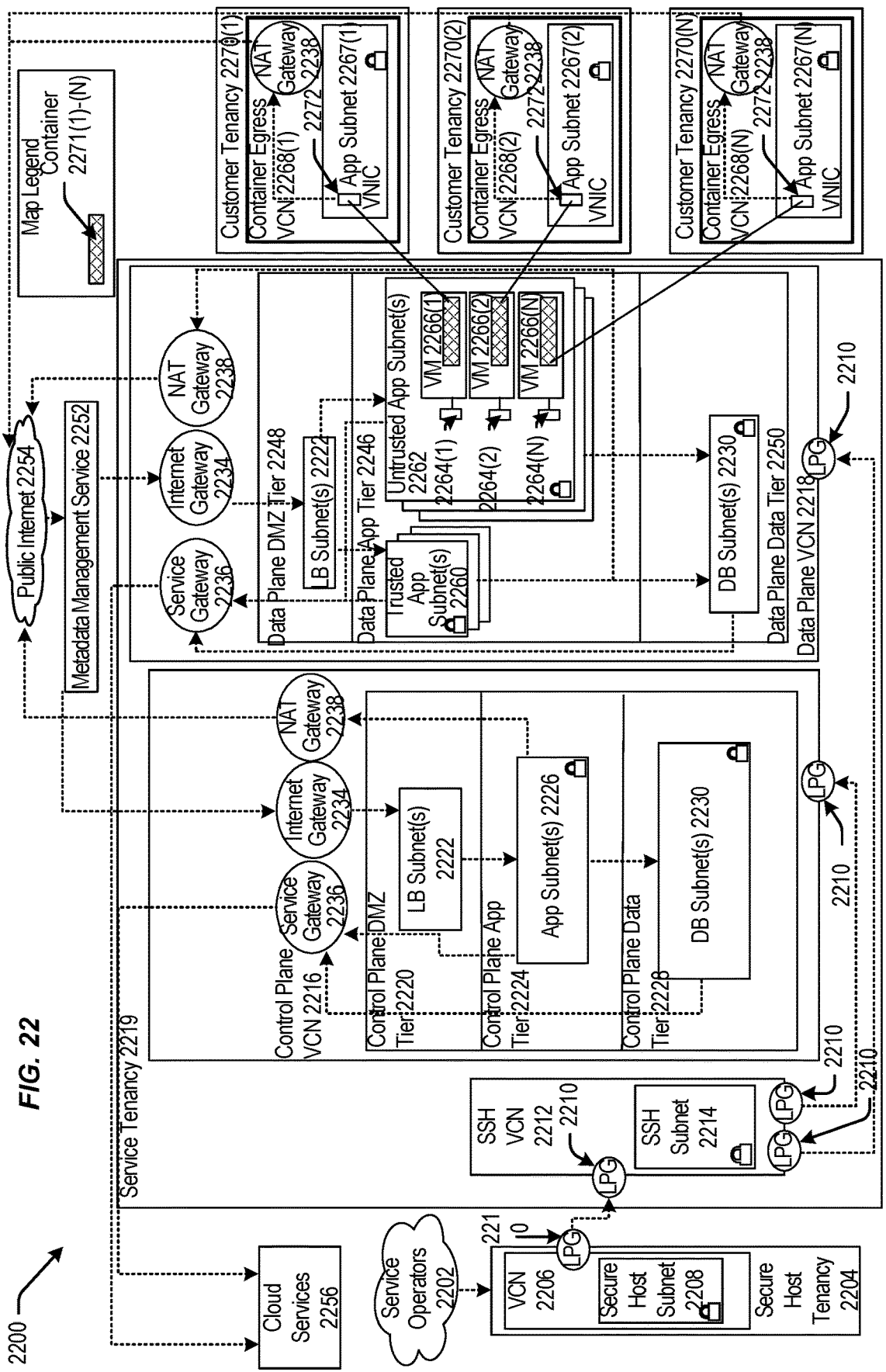
FIG. 22 is a block diagram illustrating another pattern for implementing a cloud infrastructure as a service system, according to at least one embodiment.

FIG. 22 is a block diagram 2200 illustrating another example pattern of an IaaS architecture, according to at least one embodiment. Service operators 2202 (e.g., service operators 2002 of FIG. 20) can be communicatively coupled to a secure host tenancy 2204 (e.g., the secure host tenancy 2004 of FIG. 20) that can include a virtual cloud network (VCN) 2206 (e.g., the VCN 2006 of FIG. 20) and a secure host subnet 2208 (e.g., the secure host subnet 2008 of FIG. 20). The VCN 2206 can include an LPG 2210 (e.g., the LPG 2010 of FIG. 20) that can be communicatively coupled to an SSH VCN 2212 (e.g., the SSH VCN 2012 of FIG. 20) via an LPG 2210 contained in the SSH VCN 2212. The SSH VCN 2212 can include an SSH subnet 2214 (e.g., the SSH subnet 2014 of FIG. 20), and the SSH VCN 2212 can be communicatively coupled to a control plane VCN 2216 (e.g., the control plane VCN 2016 of FIG. 20) via an LPG 2210 contained in the control plane VCN 2216 and to a data plane VCN 2218 (e.g., the data plane 2018 of FIG. 20) via an LPG 2210 contained in the data plane VCN 2218. The control plane VCN 2216 and the data plane VCN 2218 can be contained in a service tenancy 2219 (e.g., the service tenancy 2019 of FIG. 20).

The control plane VCN 2216 can include a control plane DMZ tier 2220 (e.g., the control plane DMZ tier 2020 of FIG. 20) that can include load balancer (LB) subnet(s) 2222 (e.g., LB subnet(s) 2022 of FIG. 20), a control plane app tier 2224 (e.g., the control plane app tier 2024 of FIG. 20) that can include app subnet(s) 2226 (e.g., similar to app subnet(s) 2026 of FIG. 20), a control plane data tier 2228 (e.g., the control plane data tier 2028 of FIG. 20) that can include DB subnet(s) 2230. The LB subnet(s) 2222 contained in the control plane DMZ tier 2220 can be communicatively coupled to the app subnet(s) 2226 contained in the control plane app tier 2224 and to an Internet gateway 2234 (e.g., the Internet gateway 2034 of FIG. 20) that can be contained in the control plane VCN 2216, and the app subnet(s) 2226 can be communicatively coupled to the DB subnet(s) 2230 contained in the control plane data tier 2228 and to a service gateway 2236 (e.g., the service gateway of FIG. 20) and a network address translation (NAT) gateway 2238 (e.g., the NAT gateway 2038 of FIG. 20). The control plane VCN 2216 can include the service gateway 2236 and the NAT gateway 2238.

The data plane VCN 2218 can include a data plane app tier 2246 (e.g., the data plane app tier 2046 of FIG. 20), a data plane DMZ tier 2248 (e.g., the data plane DMZ tier 2048 of FIG. 20), and a data plane data tier 2250 (e.g., the data plane data tier 2050 of FIG. 20). The data plane DMZ tier 2248 can include LB subnet(s) 2222 that can be communicatively coupled to trusted app subnet(s) 2260 and untrusted app subnet(s) 2262 of the data plane app tier 2246 and the Internet gateway 2234 contained in the data plane VCN 2218. The trusted app subnet(s) 2260 can be communicatively coupled to the service gateway 2236 contained in the data plane VCN 2218, the NAT gateway 2238 contained in the data plane VCN 2218, and DB subnet(s) 2230 contained in the data plane data tier 2250. The untrusted app subnet(s) 2262 can be communicatively coupled to the service gateway 2236 contained in the data plane VCN 2218 and DB subnet(s) 2230 contained in the data plane data tier 2250. The data plane data tier 2250 can include DB subnet(s) 2230 that can be communicatively coupled to the service gateway 2236 contained in the data plane VCN 2218.

The untrusted app subnet(s) 2262 can include one or more primary VNICs 2264(1)-(N) that can be communicatively coupled to tenant virtual machines (VMs) 2266(1)-(N). Each tenant VM 2266(1)-(N) can be communicatively coupled to a respective app subnet 2267(1)-(N) that can be contained in respective container egress VCNs 2268(1)-(N) that can be contained in respective customer tenancies 2270(1)-(N). Respective secondary VNICs 2272(1)-(N) can facilitate communication between the untrusted app subnet(s) 2262 contained in the data plane VCN 2218 and the app subnet contained in the container egress VCNs 2268(1)-(N). Each container egress VCNs 2268(1)-(N) can include a NAT gateway 2238 that can be communicatively coupled to public Internet 2254 (e.g., public Internet 2054 of FIG. 20).

The Internet gateway 2234 contained in the control plane VCN 2216 and contained in the data plane VCN 2218 can be communicatively coupled to a metadata management service 2252 (e.g., the metadata management system 2052 of FIG. 20) that can be communicatively coupled to public Internet 2254. Public Internet 2254 can be communicatively coupled to the NAT gateway 2238 contained in the control plane VCN 2216 and contained in the data plane VCN 2218. The service gateway 2236 contained in the control plane VCN 2216 and contained in the data plane VCN 2218 can be communicatively couple to cloud services 2256.

In some embodiments, the data plane VCN 2218 can be integrated with customer tenancies 2270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2246. Code to run the function may be executed in the VMs 2266(1)-(N), and the code may not be configured to run anywhere else on the data plane VCN 2218. Each VM 2266(1)-(N) may be connected to one customer tenancy 2270. Respective containers 2271(1)-(N) contained in the VMs 2266(1)-(N) may be configured to run the code. In this case, there can be a dual isolation (e.g., the containers 2271(1)-(N) running code, where the containers 2271(1)-(N) may be contained in at least the VM 2266(1)-(N) that are contained in the untrusted app subnet(s) 2262), which may help prevent incorrect or otherwise undesirable code from damaging the network of the IaaS provider or from damaging a network of a different customer. The containers 2271(1)-(N) may be communicatively coupled to the customer tenancy 2270 and may be configured to transmit or receive data from the customer tenancy 2270. The containers 2271(1)-(N) may not be configured to transmit or receive data from any other entity in the data plane VCN 2218. Upon completion of running the code, the IaaS provider may kill or otherwise dispose of the containers 2271(1)-(N).

In some embodiments, the trusted app subnet(s) 2260 may run code that may be owned or operated by the IaaS provider. In this embodiment, the trusted app subnet(s) 2260 may be communicatively coupled to the DB subnet(s) 2230 and be configured to execute CRUD operations in the DB subnet(s) 2230. The untrusted app subnet(s) 2262 may be communicatively coupled to the DB subnet(s) 2230, but in this embodiment, the untrusted app subnet(s) may be configured to execute read operations in the DB subnet(s) 2230. The containers 2271(1)-(N) that can be contained in the VM 2266(1)-(N) of each customer and that may run code from the customer may not be communicatively coupled with the DB subnet(s) 2230.

In other embodiments, the control plane VCN 2216 and the data plane VCN 2218 may not be directly communicatively coupled. In this embodiment, there may be no direct communication between the control plane VCN 2216 and the data plane VCN 2218. However, communication can occur indirectly through at least one method. An LPG 2210 may be established by the IaaS provider that can facilitate communication between the control plane VCN 2216 and the data plane VCN 2218. In another example, the control plane VCN 2216 or the data plane VCN 2218 can make a call to cloud services 2256 via the service gateway 2236. For example, a call to cloud services 2256 from the control plane VCN 2216 can include a request for a service that can communicate with the data plane VCN 2218.

Figure 23:
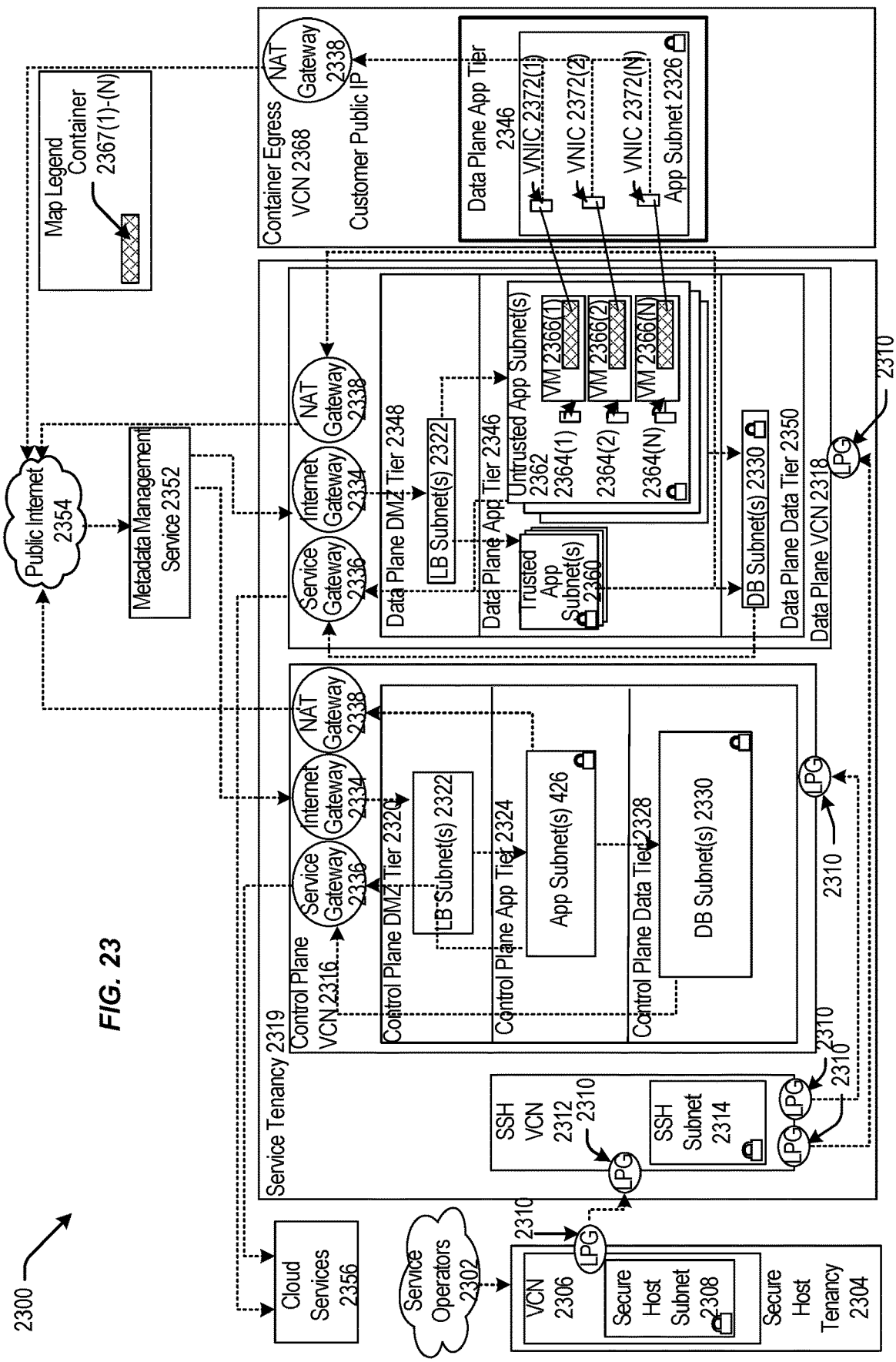
FIG. 23 is a block diagram illustrating another pattern for implementing a cloud infrastructure as a service system, according to at least one embodiment.

FIG. 23 is a block diagram 2300 illustrating another example pattern of an IaaS architecture, according to at least one embodiment. Service operators 2302 (e.g., service operators 2002 of FIG. 20) can be communicatively coupled to a secure host tenancy 2304 (e.g., the secure host tenancy 2004 of FIG. 20) that can include a virtual cloud network (VCN) 2306 (e.g., the VCN 2006 of FIG. 20) and a secure host subnet 2308 (e.g., the secure host subnet 2008 of FIG. 20). The VCN 2306 can include an LPG 2310 (e.g., the LPG 2010 of FIG. 20) that can be communicatively coupled to an SSH VCN 2312 (e.g., the SSH VCN 2012 of FIG. 20) via an LPG 2310 contained in the SSH VCN 2312. The SSH VCN 2312 can include an SSH subnet 2314 (e.g., the SSH subnet 2014 of FIG. 20), and the SSH VCN 2312 can be communicatively coupled to a control plane VCN 2316 (e.g., the control plane VCN 2016 of FIG. 20) via an LPG 2310 contained in the control plane VCN 2316 and to a data plane VCN 2318 (e.g., the data plane 2018 of FIG. 20) via an LPG 2310 contained in the data plane VCN 2318. The control plane VCN 2316 and the data plane VCN 2318 can be contained in a service tenancy 2319 (e.g., the service tenancy 2019 of FIG. 20).

The control plane VCN 2316 can include a control plane DMZ tier 2320 (e.g., the control plane DMZ tier 2020 of FIG. 20) that can include LB subnet(s) 2322 (e.g., LB subnet(s) 2022 of FIG. 20), a control plane app tier 2324 (e.g., the control plane app tier 2024 of FIG. 20) that can include app subnet(s) 2326 (e.g., app subnet(s) 2026 of FIG. 20), a control plane data tier 2328 (e.g., the control plane data tier 2028 of FIG. 20) that can include DB subnet(s) 2330 (e.g., DB subnet(s) 2230 of FIG. 22). The LB subnet(s) 2322 contained in the control plane DMZ tier 2320 can be communicatively coupled to the app subnet(s) 2326 contained in the control plane app tier 2324 and to an Internet gateway 2334 (e.g., the Internet gateway 2034 of FIG. 20) that can be contained in the control plane VCN 2316, and the app subnet(s) 2326 can be communicatively coupled to the DB subnet(s) 2330 contained in the control plane data tier 2328 and to a service gateway 2336 (e.g., the service gateway of FIG. 20) and a network address translation (NAT) gateway 2338 (e.g., the NAT gateway 2038 of FIG. 20). The control plane VCN 2316 can include the service gateway 2336 and the NAT gateway 2338.

The data plane VCN 2318 can include a data plane app tier 2346 (e.g., the data plane app tier 2046 of FIG. 20), a data plane DMZ tier 2348 (e.g., the data plane DMZ tier 2048 of FIG. 20), and a data plane data tier 2350 (e.g., the data plane data tier 2050 of FIG. 20). The data plane DMZ tier 2348 can include LB subnet(s) 2322 that can be communicatively coupled to trusted app subnet(s) 2360 (e.g., trusted app subnet(s) 2260 of FIG. 22) and untrusted app subnet(s) 2362 (e.g., untrusted app subnet(s) 2262 of FIG. 22) of the data plane app tier 2346 and the Internet gateway 2334 contained in the data plane VCN 2318. The trusted app subnet(s) 2360 can be communicatively coupled to the service gateway 2336 contained in the data plane VCN 2318, the NAT gateway 2338 contained in the data plane VCN 2318, and DB subnet(s) 2330 contained in the data plane data tier 2350. The untrusted app subnet(s) 2362 can be communicatively coupled to the service gateway 2336 contained in the data plane VCN 2318 and DB subnet(s) 2330 contained in the data plane data tier 2350. The data plane data tier 2350 can include DB subnet(s) 2330 that can be communicatively coupled to the service gateway 2336 contained in the data plane VCN 2318.

The untrusted app subnet(s) 2362 can include primary VNICs 2364(1)-(N) that can be communicatively coupled to tenant virtual machines (VMs) 2366(1)-(N) residing within the untrusted app subnet(s) 2362. Each tenant VM 2366(1)-(N) can run code in a respective container 2367(1)-(N) and be communicatively coupled to an app subnet 2326 that can be contained in a data plane app tier 2346 that can be contained in a container egress VCN 2368. Respective secondary VNICs 2372(1)-(N) can facilitate communication between the untrusted app subnet(s) 2362 contained in the data plane VCN 2318 and the app subnet contained in the container egress VCN 2368. The container egress VCN can include a NAT gateway 2338 that can be communicatively coupled to public Internet 2354 (e.g., public Internet 2054 of FIG. 20).

The Internet gateway 2334 contained in the control plane VCN 2316 and contained in the data plane VCN 2318 can be communicatively coupled to a metadata management service 2352 (e.g., the metadata management system 2052 of FIG. 20) that can be communicatively coupled to public Internet 2354. Public Internet 2354 can be communicatively coupled to the NAT gateway 2338 contained in the control plane VCN 2316 and contained in the data plane VCN 2318. The service gateway 2336 contained in the control plane VCN 2316 and contained in the data plane VCN 2318 can be communicatively couple to cloud services 2356.

In some examples, the pattern illustrated by the architecture of block diagram 2300 of FIG. 23 may be considered an exception to the pattern illustrated by the architecture of block diagram 2200 of FIG. 22 and may be desirable for a customer of the IaaS provider if the IaaS provider cannot directly communicate with the customer (e.g., a disconnected region). The respective containers 2367(1)-(N) that are contained in the VMs 2366(1)-(N) for each customer can be accessed in real-time by the customer. The containers 2367(1)-(N) may be configured to make calls to respective secondary VNICs 2372(1)-(N) contained in app subnet(s) 2326 of the data plane app tier 2346 that can be contained in the container egress VCN 2368. The secondary VNICs 2372(1)-(N) can transmit the calls to the NAT gateway 2338 that may transmit the calls to public Internet 2354. In this example, the containers 2367(1)-(N) that can be accessed in real-time by the customer can be isolated from the control plane VCN 2316 and can be isolated from other entities contained in the data plane VCN 2318. The containers 2367(1)-(N) may also be isolated from resources from other customers.

In other examples, the customer can use the containers 2367(1)-(N) to call cloud services 2356. In this example, the customer may run code in the containers 2367(1)-(N) that requests a service from cloud services 2356. The containers 2367(1)-(N) can transmit this request to the secondary VNICs 2372(1)-(N) that can transmit the request to the NAT gateway that can transmit the request to public Internet 2354. Public Internet 2354 can transmit the request to LB subnet(s) 2322 contained in the control plane VCN 2316 via the Internet gateway 2334. In response to determining the request is valid, the LB subnet(s) can transmit the request to app subnet(s) 2326 that can transmit the request to cloud services 2356 via the service gateway 2336.

It should be appreciated that IaaS architectures of diagrams 2000, 2100, 2200, 2300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 24:
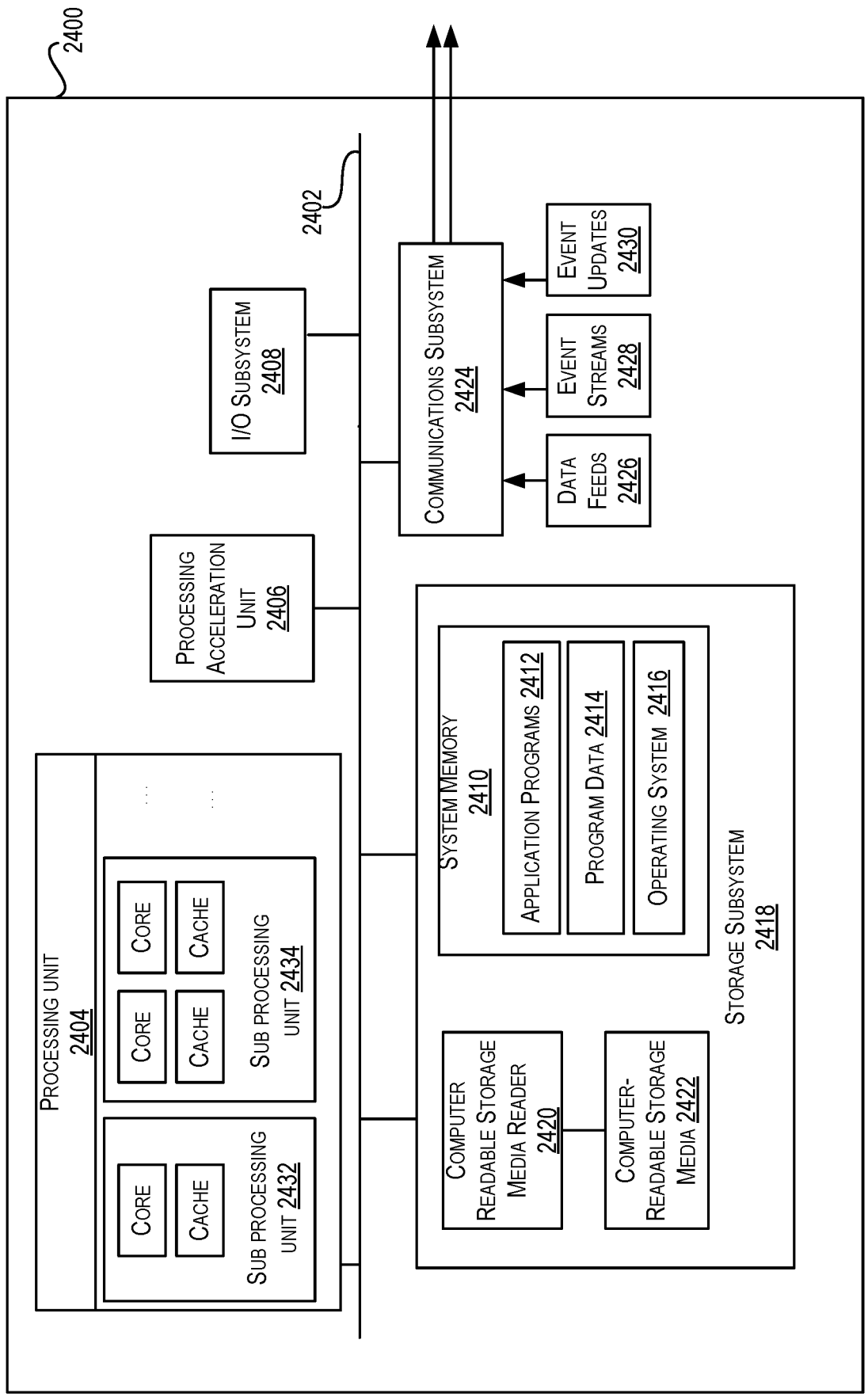
FIG. 24 is a block diagram illustrating an example computer system, according to at least one embodiment.

FIG. 24 illustrates an example computer system 2400, in which various embodiments may be implemented. The system 2400 may be used to implement any of the computer systems described above. As shown in the figure, computer system 2400 includes a processing unit 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 includes tangible computer-readable storage media 2422 and a system memory 2410.

Bus subsystem 2402 provides a mechanism for letting the various components and subsystems of computer system 2400 communicate with each other as intended. Although bus subsystem 2402 is shown schematically as a single bus, alternative embodiments of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2404, which can be implemented as one or more integrated circuits (e.g., a conventional microprocessor or microcontroller), controls the operation of computer system 2400. One or more processors may be included in processing unit 2404. These processors may include single core or multicore processors. In certain embodiments, processing unit 2404 may be implemented as one or more independent processing units 2432 and/or 2434 with single or multicore processors included in each processing unit. In other embodiments, processing unit 2404 may also be implemented as a quad-core processing unit formed by integrating two dual-core processors into a single chip.

In various embodiments, processing unit 2404 can execute a variety of programs in response to program code and can maintain multiple concurrently executing programs or processes. At any given time, some or all of the program code to be executed can be resident in processor(s) 2404 and/or in storage subsystem 2418. Through suitable programming, processor(s) 2404 can provide various functionalities described above. Computer system 2400 may additionally include a processing acceleration unit 2406, which can include a digital signal processor (DSP), a special-purpose processor, and/or the like.

I/O subsystem 2408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2400 may comprise a storage subsystem 2418 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2404 provide the functionality described above. Storage subsystem 2418 may also provide a repository for storing data used in accordance with the present disclosure.

As depicted in the example in FIG. 24, storage subsystem 2418 can include various components including a system memory 2410, computer-readable storage media 2422, and a computer readable storage media reader 2420. System memory 2410 may store program instructions that are loadable and executable by processing unit 2404. System memory 2410 may also store data that is used during the execution of the instructions and/or data that is generated during the execution of the program instructions. Various different kinds of programs may be loaded into system memory 2410 including but not limited to client applications, Web browsers, mid-tier applications, relational database management systems (RDBMS), virtual machines, containers, etc.

System memory 2410 may also store an operating system 2416. Examples of operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2400 executes one or more virtual machines, the virtual machines along with their guest operating systems (GOSs) may be loaded into system memory 2410 and executed by one or more processors or cores of processing unit 2404.

System memory 2410 can come in different configurations depending upon the type of computer system 2400. For example, system memory 2410 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 2410 may include a basic input/output system (BIOS) containing basic routines that help to transfer information between elements within computer system 2400, such as during start-up.

Computer-readable storage media 2422 may represent remote, local, fixed, and/or removable storage devices plus storage media for temporarily and/or more permanently containing, storing, computer-readable information for use by computer system 2400 including instructions executable by processing unit 2404 of computer system 2400.

Computer-readable storage media 2422 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 2400.

Machine-readable instructions executable by one or more processors or cores of processing unit 2404 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2424 provides an interface to other computer systems and networks. Communications subsystem 2424 serves as an interface for receiving data from and transmitting data to other systems from computer system 2400. For example, communications subsystem 2424 may enable computer system 2400 to connect to one or more devices via the Internet. In some embodiments communications subsystem 2424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2424 can provide wired network connectivity (e.g., Ethernet) in addition to or instead of a wireless interface.

In some embodiments, communications subsystem 2424 may also receive input communication in the form of structured and/or unstructured data feeds 2426, event streams 2428, event updates 2430, and the like on behalf of one or more users who may use computer system 2400.

By way of example, communications subsystem 2424 may be configured to receive data feeds 2426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2424 may also be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computer system 2400.

Computer system 2400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    managing, by a computing system, a plurality of skills corresponding to a plurality of services to be deployed by a cloud infrastructure orchestration system during a process of building a data center, the plurality of skills being associated with corresponding skill metadata that indicates an execution order for orchestration tasks associated with the process of building the data center, each of the plurality of skills indicating an availability of a corresponding functional unit of a service of the plurality of services during the process of building the data center, each of the plurality of skills being associated with a respective health state;
    generating, by the computing system, a dependency graph based at least in part on the corresponding skill metadata associated with the plurality of skills;
    monitoring, by the computing system, the respective health state of the plurality of skills during the process of building the data center;
    determining, by the computing system based on the monitoring, that a first skill of the plurality of skills is associated with a particular health state of a plurality of health states;
    identifying, by the computing system, a second skill of the plurality of skills as a cause of the particular health state of the first skill, the second skill being identified as the cause based at least in part on reverse traversing the dependency graph, the dependency graph indicating that the first skill is dependent on the second skill; and
    presenting, by the computing system via a user interface, a notification that the second skill has been identified as the cause of the particular health state of the first skill.

2. The computer-implemented method of claim 1, wherein the corresponding skill metadata indicates interdependencies between the plurality of skills, wherein the interdependencies indicate the execution order for the orchestration tasks associated with the process of building the data center.

3. The computer-implemented method of claim 1, wherein monitoring the respective health state of the plurality of skills comprises:
    identifying, by the computing system, a set of alarms corresponding to the first skill;
    identifying, by the computing system, a status for each alarm of the set of alarms corresponding to the first skill; and
    identifying, by the computing system, the particular health state for the first skill based at least in part on the status for each alarm of the set of alarms corresponding to the first skill.

4. The computer-implemented method of claim 3, wherein the particular health state for the first skill is identified based at least in part on determining that at least one alarm of the set of alarms corresponding to the first skill is associated with a respective status that indicates the at least one alarm has been triggered.

5. The computer-implemented method of claim 3, wherein the set of alarms for the first skill is identified by the corresponding skill metadata that is associated with the first skill.

6. The computer-implemented method of claim 1, further comprising:
    providing, by the computing system, an override option for overriding the particular health state of the first skill; and
    overriding, by the computing system, the particular health state of the first skill with an override value provided via the override option.

7. The computer-implemented method of claim 6, wherein the override value is utilized in lieu of the particular health state of the first skill for a time period specified by user input provided as part of the override option.

8. A cloud-computing system, comprising:
    one or more processors; and
    one or more memories storing computer-executable instructions that, when executed by the one or more processors, cause the one or more processors to:
        manage a plurality of skills corresponding to a plurality of services to be deployed by a cloud infrastructure orchestration system during a process of building a data center, the plurality of skills being associated with corresponding skill metadata that indicates an execution order for orchestration tasks associated with the process of building the data center, each of the plurality of skills indicating an availability of a corresponding functional unit of a service of the plurality of services during the process of building the data center, each of the plurality of skills being associated with a respective health state;
        generate a dependency graph based at least in part on the corresponding skill metadata associated with the plurality of skills;

monitor the respective health state of the plurality of skills during the process of building the data center;

determine, based on the monitoring, that a first skill of the plurality of skills is associated with a particular health state of a plurality of health states;

identify a second skill of the plurality of skills as a cause of the particular health state of the first skill, the second skill being identified as the cause based at least in part on reverse traversing the dependency graph, the dependency graph indicating that the first skill is dependent on the second skill; and present, via a user interface, a notification that the second skill has been identified as the cause of the particular health state of the first skill.

9. The cloud-computing system of claim 8, wherein the corresponding skill metadata indicates interdependencies between the plurality of skills, wherein the interdependencies indicate the execution order for the orchestration tasks associated with the process of building the data center.

10. The cloud-computing system of claim 8, wherein executing the computer-executable instructions to monitor the respective health state of the plurality of skills causes the one or more processors of the computing system to:

identify a set of alarms corresponding to the first skill;

identify a status for each alarm of the set of alarms corresponding to the first skill; and identify the particular health state for the first skill based at least in part on the status for each alarm of the set of alarms corresponding to the first skill.

11. The cloud-computing system of claim 10, wherein the particular health state for the first skill is identified based at least in part on determining that at least one alarm of the set of alarms corresponding to the first skill is associated with a respective status that indicates that the at least one alarm has been triggered.

12. The cloud-computing system of claim 10, wherein the set of alarms for the first skill is identified by the corresponding skill metadata that is associated with the first skill.

13. The cloud-computing system of claim 8, wherein executing the computer-executable instructions further causes the computing system to:

provide an override option for overriding the particular health state of the first skill; and override the particular health state of the first skill with an override value provided via the override option.

14. The cloud-computing system of claim 13, wherein the override value is utilized in lieu of the particular health state of the first skill for a time period specified by user input provided as part of the override option.

15. A non-transitory computer-readable medium storing computer-executable instructions that, when executed by one or more processors corresponding to a cloud-computing system, cause the one or more processors of the cloud-computing system to:

manage a plurality of skills corresponding to a plurality of services to be deployed by a cloud infrastructure orchestration system during a process of building a data center, the plurality of skills being associated with corresponding skill metadata that indicates an execution order for orchestration tasks associated with the process of building the data center, each of the plurality of skills indicating an availability of a corresponding functional unit of a service of the plurality of services during the process of building the data center, each of the plurality of skills being associated with a respective health state;

generate a dependency graph based at least in part on the corresponding skill metadata associated with the plurality of skills;

monitor the respective health state of the plurality of skills during the process of building the data center;

determine, based on the monitoring, that a first skill of the plurality of skills is associated with a particular health state of a plurality of health states;

identify a second skill of the plurality of skills as a cause of the particular health state of the first skill, the second skill being identified as the cause based at least in part on reverse traversing the dependency graph, the dependency graph indicating that the first skill is dependent on the second skill; and present, via a user interface, a notification that the second skill has been identified as the cause of the particular health state of the first skill.

16. The non-transitory computer-readable medium of claim 15, wherein executing the computer-executable instructions to monitor the respective health state of the plurality of skills causes the one or more processors of the computing system to:

identify a set of alarms corresponding to the first skill;

identify a status for each alarm of the set of alarms corresponding to the first skill; and identify the particular health state for the first skill based at least in part on the status for each alarm of the set of alarms corresponding to the first skill.

17. The non-transitory computer-readable medium of claim 16, wherein the particular health state for the first skill is identified based at least in part on determining that at least one alarm of the set of alarms corresponding to the first skill is associated with a respective status that indicates the at least one alarm has been triggered.

18. The non-transitory computer-readable medium of claim 16, wherein the set of alarms for the first skill is identified by the corresponding skill metadata that is associated with the first skill.

19. The non-transitory computer-readable medium of claim 15, wherein executing the computer-executable instructions further causes the computing system to:

provide an override option for overriding the particular health state of the first skill; and override the particular health state of the first skill with an override value provided via the override option, wherein the override value is utilized in lieu of the particular health state of the first skill for a time period specified by user input provided as part of the override option.

20. The non-transitory computer-readable medium of claim 15, wherein the corresponding skill metadata indicates interdependencies between the plurality of skills, wherein the interdependencies indicate the execution order for the orchestration tasks associated with the process of building the data center.

* * * * *